US011240326B1

(12) United States Patent
Khanwalkar et al.

(10) Patent No.: US 11,240,326 B1
(45) Date of Patent: *Feb. 1, 2022

(54) DATA STRUCTURES FOR INTELLIGENTLY RESOLVING DETERMINISTIC AND PROBABILISTIC DEVICE IDENTIFIERS TO DEVICE PROFILES AND/OR GROUPS

(71) Applicant: The 41st Parameter, Inc., Scottsdale, AZ (US)

(72) Inventors: Manoj Khanwalkar, Princeton Junction, NJ (US); Adler Camacho, San Jose, CA (US); Stephen Van Lare, San Jose, CA (US); Omer Winkler, Cupertino, CA (US); Luke David Tuttle, Columbus, OH (US); Surag I. Patel, Portola Valley, CA (US)

(73) Assignee: The 41st Parameter, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/904,003

(22) Filed: Jun. 17, 2020

Related U.S. Application Data

(63) Continuation of application No. 16/114,056, filed on Aug. 27, 2018, now Pat. No. 10,728,350, which is a
(Continued)

(51) Int. Cl.
*H04L 29/08* (2006.01)
*G06F 16/335* (2019.01)
(Continued)

(52) U.S. Cl.
CPC .............. *H04L 67/22* (2013.01); *H04L 67/02* (2013.01); *H04L 67/303* (2013.01);
(Continued)

(58) Field of Classification Search
CPC ....... H04L 67/02; H04L 67/22; H04L 67/306; H04L 63/0876; H04L 63/0823;
(Continued)

(56) References Cited

U.S. PATENT DOCUMENTS

| 4,801,924 A | 1/1989 | Burgmann et al. |
| 4,805,222 A | 2/1989 | Young et al. |

(Continued)

FOREIGN PATENT DOCUMENTS

| EP | 0418144 | 3/1991 |
| EP | 0 645 692 | 3/1995 |

(Continued)

OTHER PUBLICATIONS

U.S. Appl. No. 14/882,340, now U.S. Pat. No. 10,091,312, filed Oct. 13, 2015, Data Structures for Intelligently Resolving Deterministic and Probabilistic Device Identifiers to Device Profiles and/or Groups.
(Continued)

*Primary Examiner* — Jungwon Chang
(74) *Attorney, Agent, or Firm* — Knobbe, Martens, Olson & Bear, LLP

(57) ABSTRACT

An electronic device identifier mapping and resolution system are disclosed which may be used to analyze various device identifiers associated with an online event initiated by a particular device in applying a matching algorithm to determine a unique device identifier and/or device profile for the device. Device identifiers provided from disparate sources (such as web browser cookies, network IP addresses, device-specific identifiers, application-specific identifiers, custom identifiers, probabilistic identifiers, etc.), including both deterministic and/or probabilistic identifiers, may be analyzed according to the matching algorithm to determine a device identifier associated with the device. Matching algorithms may be customized and configured to a high
(Continued)

degree of complexity for respective entities, such as to analyze disparate device identifiers according to a variety of identifier comparison functions and matching tiers. Matching algorithms may include conditional requirements that streamline execution of such algorithms, e.g., which may reduce processor load and increase execution time, such as conditional requirements that bypass portions of the matching algorithm based on particular identifiers associated with the online event that are initially analyzed.

20 Claims, 14 Drawing Sheets

Related U.S. Application Data continuation of application No. 14/882,340, filed on Oct. 13, 2015, now Pat. No. 10,091,312.

(60) Provisional application No. 62/063,567, filed on Oct. 14, 2014.

(51) Int. Cl.
    *G06F 16/2457* (2019.01)
    *H04L 12/24* (2006.01)
    *H04L 29/06* (2006.01)
    *G06F 17/18* (2006.01)

(52) U.S. Cl.
    CPC ...... *H04L 67/306* (2013.01); *G06F 16/24578* (2019.01); *G06F 16/335* (2019.01); *G06F 17/18* (2013.01); *H04L 41/14* (2013.01); *H04L 63/10* (2013.01); *H04L 67/30* (2013.01)

(58) Field of Classification Search
    CPC ....... H04L 67/303; H04L 67/30; H04L 63/10; H04L 41/14; G06F 16/951; G06F 16/335; G06F 16/24578; G06F 17/18
    See application file for complete search history.

(56) References Cited

U.S. PATENT DOCUMENTS

| | | | |
|---|---|---|---|
| 4,912,761 A | 3/1990 | Tan et al. |
| 4,924,387 A | 5/1990 | Jeppesen |
| 5,184,849 A | 2/1993 | Taylor |
| 5,491,735 A | 2/1996 | Hsieh |
| 5,519,827 A | 5/1996 | Mizushima |
| 5,521,907 A | 5/1996 | Ennis, Jr. |
| 5,557,686 A | 9/1996 | Brown et al. |
| 5,583,380 A | 12/1996 | Larsen et al. |
| 5,627,886 A | 5/1997 | Bowman |
| 5,679,940 A | 10/1997 | Templeton et al. |
| 5,721,765 A | 2/1998 | Smith |
| 5,724,424 A | 3/1998 | Giffor |
| 5,748,740 A | 5/1998 | Curry et al. |
| 5,748,780 A | 5/1998 | Stolfo et al. |
| 5,764,275 A | 6/1998 | Lappington et al. |
| 5,802,156 A | 9/1998 | Felger |
| 5,819,226 A | 10/1998 | Gopinathan et al. |
| 5,864,620 A | 1/1999 | Pettitt |
| 5,884,289 A | 3/1999 | Anderson et al. |
| 5,886,334 A | 3/1999 | D'Entremont |
| 5,892,900 A | 4/1999 | Ginter et al. |
| 5,894,510 A | 4/1999 | Felger |
| 5,899,980 A | 5/1999 | Wilf et al. |
| 5,903,646 A | 5/1999 | Rackman |
| 5,903,721 A | 5/1999 | Sixtus |
| 5,933,480 A | 8/1999 | Felger |
| 5,960,069 A | 9/1999 | Felger |
| 6,009,523 A | 12/1999 | Owaki et al. |
| 6,029,154 A | 2/2000 | Pettitt |
| 6,029,159 A | 2/2000 | Zorba et al. |
| 6,062,474 A | 5/2000 | Kroll |
| 6,078,907 A | 6/2000 | Lamm |
| 6,092,053 A | 7/2000 | Boesch et al. |
| 6,094,643 A | 7/2000 | Anderson et al. |
| 6,105,012 A | 8/2000 | Chang et al. |
| 6,112,240 A | 8/2000 | Pogue et al. |
| 6,148,407 A | 11/2000 | Aucsmith |
| 6,151,593 A | 11/2000 | Cho et al. |
| 6,163,604 A | 12/2000 | Baulier et al. |
| 6,163,771 A | 12/2000 | Walker et al. |
| 6,164,528 A | 12/2000 | Hills et al. |
| 6,205,436 B1 | 3/2001 | Rosenberg et al. |
| 6,209,104 B1 | 3/2001 | Jalili |
| 6,216,153 B1 | 4/2001 | Vortriede |
| 6,223,289 B1 | 4/2001 | Wall et al. |
| 6,282,276 B1 | 8/2001 | Felger |
| 6,295,605 B1 | 9/2001 | Dockter et al. |
| 6,327,384 B1 | 12/2001 | Hirao et al. |
| 6,330,546 B1 | 12/2001 | Gopinathan et al. |
| 6,370,648 B1 | 4/2002 | Diep |
| 6,405,922 B1 | 6/2002 | Kroll |
| 6,442,529 B1 | 8/2002 | Krishan et al. |
| 6,442,692 B1 | 8/2002 | Zilberman |
| 6,457,021 B1 | 9/2002 | Berkowitz et al. |
| 6,480,710 B1 | 11/2002 | Laybourn et al. |
| 6,509,847 B1 | 1/2003 | Anderson |
| 6,523,019 B1 | 2/2003 | Borthwick |
| 6,546,493 B1 | 4/2003 | Magdych et al. |
| 6,553,108 B1 | 4/2003 | Felger |
| 6,560,455 B2 | 5/2003 | Amin et al. |
| 6,567,099 B1 | 5/2003 | Dawson |
| 6,597,775 B2 | 7/2003 | Lawyer et al. |
| 6,646,765 B1 | 11/2003 | Barker et al. |
| 6,678,666 B1 | 1/2004 | Boulware |
| 6,687,390 B2 | 2/2004 | Avni et al. |
| 6,687,696 B2 | 2/2004 | Hofmann et al. |
| 6,689,055 B1 | 2/2004 | Mullen et al. |
| 6,718,363 B1 | 4/2004 | Ponte |
| 6,745,333 B1 | 6/2004 | Thomsen |
| 6,803,920 B2 | 10/2004 | Gossett et al. |
| 6,804,624 B2 | 10/2004 | Silverman |
| 6,850,606 B2 | 2/2005 | Lawyer et al. |
| 6,892,307 B1 | 5/2005 | Wood et al. |
| 6,895,507 B1 | 5/2005 | Tepler |
| 6,895,514 B1 | 5/2005 | Kermani |
| 6,898,709 B1 | 5/2005 | Teppler |
| 6,908,030 B2 | 6/2005 | Rajasekaran et al. |
| 6,937,569 B1 | 8/2005 | Sarkar et al. |
| 6,947,978 B2 | 9/2005 | Huffman |
| 6,954,532 B1 | 10/2005 | Handley et al. |
| 6,957,185 B1 | 10/2005 | Labaton |
| 6,957,339 B2 | 10/2005 | Shinzaki |
| 7,002,712 B2 | 2/2006 | Barker et al. |
| 7,003,670 B2 | 2/2006 | Heaven et al. |
| 7,007,174 B2 | 2/2006 | Wheeler et al. |
| 7,013,001 B1 | 3/2006 | Felger |
| 7,027,800 B2 | 4/2006 | Haumont et al. |
| 7,039,505 B1 | 5/2006 | Southard et al. |
| 7,039,699 B1 | 5/2006 | Narin et al. |
| 7,043,640 B2 | 5/2006 | Pritchard et al. |
| 7,089,310 B1 | 8/2006 | Ellerman et al. |
| 7,089,585 B1 | 8/2006 | Dharmarajan |
| 7,096,192 B1 | 8/2006 | Pettitt |
| 7,100,049 B2 | 8/2006 | Gasparini et al. |
| 7,103,570 B1 | 9/2006 | Morea et al. |
| 7,103,668 B1 | 9/2006 | Corley et al. |
| 7,120,590 B1 | 10/2006 | Eisen et al. |
| 7,130,858 B2 | 10/2006 | Ciaramitaro et al. |
| 7,143,095 B2 | 11/2006 | Barrett et al. |
| 7,158,622 B2 | 1/2007 | Lawyer et al. |
| 7,165,051 B2 | 1/2007 | Ronning et al. |
| 7,174,454 B2 | 2/2007 | Roskind |
| 7,191,467 B1 | 3/2007 | Dujari et al. |
| 7,197,646 B2 | 3/2007 | Fritz et al. |
| 7,221,949 B2 | 5/2007 | Clough |
| 7,225,974 B2 | 6/2007 | Yamauchi |
| 7,237,717 B1 | 7/2007 | Rao et al. |
| 7,249,093 B1 | 7/2007 | King |
| 7,251,624 B1 | 7/2007 | Lee et al. |

(56) References Cited

U.S. PATENT DOCUMENTS

| | | |
|---|---|---|
| 7,260,837 B2 | 8/2007 | Abraham et al. |
| 7,263,492 B1 | 8/2007 | Suresh et al. |
| 7,263,506 B2 | 8/2007 | Lee et al. |
| 7,272,610 B2 | 9/2007 | Torres |
| 7,272,728 B2 | 9/2007 | Pierson et al. |
| 7,292,723 B2 | 11/2007 | Tedesco et al. |
| 7,293,096 B1 | 11/2007 | Foltak et al. |
| 7,296,088 B1 | 11/2007 | Padmanabhan et al. |
| 7,328,216 B2 | 2/2008 | Hofmann et al. |
| 7,330,824 B1 | 2/2008 | Kanojia et al. |
| 7,330,871 B2 | 2/2008 | Barber |
| 7,340,045 B2 | 3/2008 | Felger |
| 7,346,551 B2 | 3/2008 | Pe Jimenez et al. |
| 7,346,775 B2 | 3/2008 | Gasparinl et al. |
| 7,349,955 B1 | 3/2008 | Korb et al. |
| 7,359,962 B2 | 4/2008 | Willebeek-LeMair et al. |
| 7,363,170 B2 | 4/2008 | Seul et al. |
| 7,373,669 B2 | 5/2008 | Eisen |
| 7,376,618 B1 | 5/2008 | Anderson et al. |
| 7,379,891 B1 | 5/2008 | Donner et al. |
| 7,404,087 B2 | 6/2008 | Teunen |
| 7,401,082 B2 | 7/2008 | Keene et al. |
| 7,403,922 B1 | 7/2008 | Lewis et al. |
| 7,406,441 B2 | 7/2008 | Kimura et al. |
| 7,428,587 B2 | 9/2008 | Rowland et al. |
| 7,436,780 B2 | 10/2008 | Stephens |
| 7,438,226 B2 | 10/2008 | Helsper et al. |
| 7,447,494 B2 | 11/2008 | Law et al. |
| 7,451,487 B2 | 11/2008 | Oliver et al. |
| 7,457,401 B2 | 11/2008 | Lawyer et al. |
| 7,457,823 B2 | 11/2008 | Shraim et al. |
| 7,475,242 B2 | 1/2009 | Baird et al. |
| 7,478,182 B2 | 1/2009 | Schweig |
| 7,487,350 B2 | 2/2009 | Utin |
| 7,496,752 B2 | 2/2009 | Yamaguchi et al. |
| 7,497,374 B2 | 3/2009 | Helsper et al. |
| 7,502,610 B2 | 3/2009 | Maher |
| 7,502,933 B2 | 3/2009 | Jakobsson et al. |
| 7,526,796 B2 | 4/2009 | Lulich et al. |
| 7,543,740 B2 | 6/2009 | Greene et al. |
| 7,552,090 B1 | 6/2009 | Barber |
| 7,555,458 B1 | 6/2009 | Felger |
| 7,562,221 B2 | 7/2009 | Nyström et al. |
| 7,577,620 B1 | 8/2009 | Donner |
| 7,581,112 B2 | 8/2009 | Brown et al. |
| 7,606,560 B2 | 10/2009 | Labrou et al. |
| 7,630,924 B1 | 12/2009 | Collins et al. |
| 7,631,808 B2 | 12/2009 | Kundu et al. |
| 7,657,626 B1 | 2/2010 | Zwicky |
| 7,660,902 B2 | 2/2010 | Graham et al. |
| 7,665,140 B2 | 2/2010 | Oliver et al. |
| 7,665,658 B2 | 2/2010 | Fields |
| 7,673,793 B2 | 3/2010 | Greene et al. |
| 7,685,629 B1 | 3/2010 | White et al. |
| 7,698,743 B2 | 4/2010 | Ohmori et al. |
| 7,708,200 B2 | 5/2010 | Helsper et al. |
| 7,711,846 B2 | 5/2010 | Padmanabhan et al. |
| 7,735,141 B1 | 6/2010 | Noel et al. |
| 7,739,402 B2 | 6/2010 | Roese et al. |
| 7,739,512 B2 | 6/2010 | Hawkes |
| 7,743,409 B2 | 6/2010 | Gonzalez et al. |
| 7,752,084 B2 | 7/2010 | Pettitt |
| 7,756,783 B2 | 7/2010 | Crooks |
| 7,761,379 B2 | 7/2010 | Zoldi et al. |
| 7,769,032 B1 | 8/2010 | Ou |
| 7,778,846 B2 | 8/2010 | Suresh et al. |
| 7,813,937 B1 | 10/2010 | Pathria et al. |
| 7,813,944 B1 | 10/2010 | Luk et al. |
| 7,814,029 B1 | 10/2010 | Siegel |
| 7,849,029 B2 | 12/2010 | Crooks et al. |
| 7,849,307 B2 | 12/2010 | Roskind |
| 7,853,526 B2 | 12/2010 | Milana |
| 7,853,533 B2 | 12/2010 | Eisen |
| 7,856,372 B2 | 12/2010 | Ullah |
| 7,860,783 B2 | 12/2010 | Yang et al. |
| 7,861,260 B2 | 12/2010 | Shkedi |
| 7,865,427 B2 | 1/2011 | Wright et al. |
| 7,882,217 B2 | 2/2011 | Katzir |
| 7,908,223 B2 | 3/2011 | Klein et al. |
| 7,908,645 B2 | 3/2011 | Varghese et al. |
| 7,930,285 B2 | 4/2011 | Abraham et al. |
| 7,933,984 B1 | 4/2011 | Smith et al. |
| 7,937,467 B2 | 5/2011 | Barber |
| 7,940,929 B1 | 5/2011 | Sengupta |
| 7,945,494 B2 | 5/2011 | Williams |
| 7,945,515 B2 | 5/2011 | Zoldi et al. |
| 7,949,564 B1 | 5/2011 | Hughes et al. |
| 7,958,029 B1 | 6/2011 | Bobich et al. |
| 7,958,246 B2 | 6/2011 | Barber |
| 7,961,857 B2 | 6/2011 | Zoldi et al. |
| 7,970,701 B2 | 6/2011 | Lewis et al. |
| 7,983,490 B1 | 7/2011 | Minter |
| 7,983,691 B1 | 7/2011 | Wong et al. |
| 7,991,716 B2 | 8/2011 | Crooks et al. |
| 7,995,996 B2 | 8/2011 | Link, II et al. |
| 8,001,376 B2 | 8/2011 | Utin |
| 8,001,597 B2 | 8/2011 | Crooks |
| 8,015,614 B2 | 9/2011 | Matsuzaki et al. |
| 8,015,921 B2 | 9/2011 | Leppanen et al. |
| 8,019,678 B2 | 9/2011 | Wright et al. |
| 8,020,763 B1 | 9/2011 | Kowalchyk et al. |
| 8,024,266 B1 | 9/2011 | Barber |
| 8,025,220 B2 | 9/2011 | Zoldi et al. |
| 8,027,439 B2 | 9/2011 | Zoldi et al. |
| 8,032,448 B2 | 10/2011 | Anderson et al. |
| 8,037,097 B2 | 10/2011 | Guo et al. |
| 8,037,511 B1 | 10/2011 | Lundy et al. |
| 8,041,597 B2 | 10/2011 | Li et al. |
| 8,042,164 B2 | 10/2011 | Sheynblat et al. |
| 8,046,271 B2 | 10/2011 | Jimenez et al. |
| 8,060,922 B2 | 11/2011 | Crichton et al. |
| 8,065,233 B2 | 11/2011 | Lee et al. |
| 8,090,648 B2 | 1/2012 | Zoldi et al. |
| 8,108,378 B2 | 1/2012 | Ott, IV et al. |
| 8,121,962 B2 | 2/2012 | Vaiciulis et al. |
| 8,122,082 B2 | 2/2012 | Klein |
| 8,126,816 B2 | 2/2012 | Mu et al. |
| 8,131,615 B2 | 3/2012 | Diev et al. |
| 8,140,689 B2 | 3/2012 | Barber |
| 8,141,148 B2 | 3/2012 | Thomas et al. |
| 8,145,560 B2 | 3/2012 | Kulkarni et al. |
| 8,145,762 B2 | 3/2012 | Barber |
| 8,150,968 B2 | 4/2012 | Barber |
| 8,151,327 B2 | 4/2012 | Eisen |
| 8,166,068 B2 | 4/2012 | Stevens |
| 8,175,897 B2 | 5/2012 | Lee et al. |
| 8,176,178 B2 | 5/2012 | Thomas et al. |
| 8,180,686 B2 | 5/2012 | Ryu et al. |
| 8,181,015 B2 | 5/2012 | Roskind |
| 8,185,953 B2 | 5/2012 | Rothstein et al. |
| 8,190,513 B2 | 5/2012 | Felger |
| 8,190,529 B2 | 5/2012 | Abe et al. |
| 8,191,148 B2 | 5/2012 | Oliver et al. |
| 8,201,099 B1 | 6/2012 | Osbourn et al. |
| 8,204,833 B2 | 6/2012 | Mu et al. |
| 8,209,744 B2 | 6/2012 | Zhu et al. |
| 8,209,760 B1 | 6/2012 | Hardman |
| 8,213,898 B2 | 7/2012 | Choti et al. |
| 8,214,232 B2 | 7/2012 | Tyler et al. |
| 8,214,285 B2 | 7/2012 | Hu et al. |
| 8,219,415 B2 | 7/2012 | Tyler et al. |
| 8,224,308 B1 | 7/2012 | Gavrylyako et al. |
| 8,224,348 B2 | 7/2012 | Bolon et al. |
| 8,229,844 B2 | 7/2012 | Felger |
| 8,250,631 B2 | 8/2012 | Iyengar et al. |
| 8,266,295 B2 | 9/2012 | Klein et al. |
| 8,271,891 B1 | 9/2012 | Osbourn et al. |
| 8,280,833 B2 | 10/2012 | Miltonberger |
| 8,290,838 B1 | 10/2012 | Thakur et al. |
| 8,295,898 B2 | 10/2012 | Ashfield et al. |
| 8,296,228 B1 | 10/2012 | Kloor |
| 8,296,229 B1 | 10/2012 | Yellin et al. |
| 8,296,245 B2 | 10/2012 | Barber et al. |
| 8,296,250 B2 | 10/2012 | Crooks et al. |

(56) References Cited

U.S. PATENT DOCUMENTS

| | | | |
|---|---|---|---|
| 8,306,933 B2 | 11/2012 | Kawai et al. |
| 8,307,430 B1 | 11/2012 | Chen et al. |
| 8,311,907 B2 | 11/2012 | Klein et al. |
| 8,321,269 B2 | 11/2012 | Linden et al. |
| 8,326,759 B2 | 12/2012 | Hammad |
| 8,326,760 B2 | 12/2012 | Ma et al. |
| 8,326,763 B2 | 12/2012 | Zuili |
| 8,332,338 B2 | 12/2012 | Vaiciulis et al. |
| 8,332,522 B2 | 12/2012 | Barber |
| 8,370,253 B1 | 2/2013 | Grossman et al. |
| 8,370,638 B2 | 2/2013 | Duane et al. |
| 8,380,831 B2 | 2/2013 | Barber |
| 8,392,987 B2 | 3/2013 | Sasamura et al. |
| 8,407,112 B2 | 3/2013 | Walter |
| 8,407,798 B1 | 3/2013 | Lotem et al. |
| 8,417,587 B2 | 4/2013 | Jimenez et al. |
| 8,423,458 B2 | 4/2013 | Barber |
| 8,424,061 B2 | 4/2013 | Rosenor |
| 8,429,070 B2 | 4/2013 | Hu et al. |
| 8,438,184 B1 * | 5/2013 | Wang | H04L 67/306 707/780 |
| 8,443,202 B2 | 5/2013 | White et al. |
| 8,452,715 B2 | 5/2013 | Barber |
| 8,453,226 B2 | 5/2013 | Hammad |
| 8,462,161 B1 | 6/2013 | Barber |
| 8,464,290 B2 | 6/2013 | Beyda et al. |
| 8,468,582 B2 | 6/2013 | Kuang et al. |
| 8,484,470 B2 | 7/2013 | Sakakihara et al. |
| 8,495,714 B2 | 7/2013 | Jones et al. |
| 8,516,439 B2 | 8/2013 | Brass et al. |
| 8,539,070 B2 | 9/2013 | Barber |
| 8,543,522 B2 | 9/2013 | Ryman-Tubb et al. |
| 8,548,137 B2 | 10/2013 | Zoldi et al. |
| 8,559,607 B2 | 10/2013 | Zoldi et al. |
| 8,567,669 B2 | 10/2013 | Griegel et al. |
| 8,588,816 B2 | 11/2013 | Collins |
| 8,601,109 B2 | 12/2013 | Johannsen |
| 8,611,856 B2 | 12/2013 | Yan et al. |
| 8,612,854 B2 | 12/2013 | Eisen et al. |
| 8,620,942 B1 | 12/2013 | Hoffman et al. |
| 8,631,006 B1 | 1/2014 | Haveliwala et al. |
| 8,660,539 B2 | 2/2014 | Khambete et al. |
| 8,661,119 B1 | 2/2014 | Jindal et al. |
| 8,676,684 B2 | 3/2014 | Newman et al. |
| 8,677,398 B2 | 3/2014 | Shkedi |
| 8,683,561 B2 | 3/2014 | Utin |
| 8,688,543 B2 | 4/2014 | Dominquez |
| 8,701,168 B2 * | 4/2014 | Sastry | H04L 63/0823 726/6 |
| 8,701,170 B1 | 4/2014 | Barber |
| 8,725,570 B2 | 5/2014 | Doughty et al. |
| 8,751,815 B2 | 6/2014 | Lunde et al. |
| 8,762,283 B2 | 6/2014 | Gerber et al. |
| 8,762,574 B2 | 6/2014 | Barber |
| 8,763,113 B2 | 6/2014 | Thomas et al. |
| 8,776,225 B2 | 7/2014 | Pierson et al. |
| 8,779,981 B2 | 7/2014 | Eisen et al. |
| 8,781,975 B2 | 7/2014 | Bennett et al. |
| 8,782,783 B2 | 7/2014 | Thomas et al. |
| 8,799,458 B2 | 8/2014 | Barber |
| 8,817,984 B2 | 8/2014 | Miller et al. |
| 8,826,393 B2 | 9/2014 | Eisen |
| 8,838,478 B2 | 9/2014 | Kretz et al. |
| 8,838,967 B1 | 9/2014 | Mills et al. |
| 8,862,514 B2 | 10/2014 | Eisen |
| 8,862,526 B2 | 10/2014 | Miltonberger |
| 8,874,735 B2 | 10/2014 | Barber |
| 8,880,097 B1 | 11/2014 | Xu et al. |
| 8,881,288 B1 | 11/2014 | Levy et al. |
| 8,938,671 B2 | 1/2015 | Eisen et al. |
| 8,954,560 B2 | 2/2015 | Johannsen |
| 8,966,276 B2 | 2/2015 | Nanopoulos et al. |
| 9,038,153 B2 | 5/2015 | Barber |
| 9,060,012 B2 | 6/2015 | Eisen |
| 9,075,896 B2 | 7/2015 | Barber |
| 9,083,735 B2 | 7/2015 | Reumann et al. |
| 9,098,617 B1 | 8/2015 | Pauley, Jr. et al. |
| 9,112,850 B1 | 8/2015 | Eisen |
| 9,118,646 B2 | 8/2015 | Pierson et al. |
| 9,172,691 B2 | 10/2015 | Barber |
| 9,177,293 B1 | 11/2015 | Gagnon et al. |
| 9,183,567 B2 | 11/2015 | Barber |
| 9,191,370 B2 | 11/2015 | Barber et al. |
| 9,196,004 B2 | 11/2015 | Eisen |
| 9,202,039 B2 | 12/2015 | Dandu et al. |
| 9,203,837 B2 | 12/2015 | Pierson et al. |
| 9,294,448 B2 | 3/2016 | Miller et al. |
| 9,298,677 B2 | 3/2016 | Tollinger et al. |
| 9,332,020 B2 | 5/2016 | Thomas et al. |
| 9,361,597 B2 | 6/2016 | Britton et al. |
| 9,378,500 B2 | 6/2016 | Jimenez et al. |
| 9,390,384 B2 | 7/2016 | Eisen |
| 9,396,331 B2 | 7/2016 | Eisen et al. |
| 9,412,123 B2 | 8/2016 | Eisen |
| 9,477,968 B2 | 10/2016 | Barber |
| 9,514,248 B2 | 12/2016 | Guan et al. |
| 9,514,446 B1 | 12/2016 | Rajkumar et al. |
| 9,521,161 B2 | 12/2016 | Reumann et al. |
| 9,521,551 B2 | 12/2016 | Eisen et al. |
| 9,559,852 B2 | 1/2017 | Miller et al. |
| 9,603,016 B1 | 3/2017 | Mills et al. |
| 9,633,201 B1 | 4/2017 | Katz |
| 9,699,164 B2 | 7/2017 | Barber |
| 9,702,961 B2 | 7/2017 | Shields |
| 9,703,983 B2 | 7/2017 | Eisen et al. |
| 9,712,497 B2 | 7/2017 | Barber et al. |
| 9,722,968 B2 | 8/2017 | Barber |
| 9,754,256 B2 | 9/2017 | Britton et al. |
| 9,754,311 B2 | 9/2017 | Eisen |
| 9,781,151 B1 | 10/2017 | McCorkendale et al. |
| 9,785,973 B2 | 10/2017 | Tollinger et al. |
| 9,916,393 B2 | 3/2018 | Barber |
| 9,948,629 B2 | 4/2018 | Eisen |
| 9,990,631 B2 | 6/2018 | Eisen |
| 10,021,099 B2 | 7/2018 | Eisen et al. |
| 10,037,529 B2 | 7/2018 | Barber |
| 10,089,679 B2 | 10/2018 | Eisen |
| 10,091,312 B1 * | 10/2018 | Khanwalkar | H04L 67/22 |
| 10,290,017 B2 | 5/2019 | Traasdahl et al. |
| 10,305,880 B2 | 5/2019 | Barber |
| 10,339,306 B1 | 7/2019 | Katz |
| 10,341,344 B2 | 7/2019 | Eisen et al. |
| 10,395,252 B2 | 8/2019 | Eisen |
| 10,402,854 B2 | 9/2019 | Barber |
| 10,417,637 B2 | 9/2019 | Eisen |
| 10,425,379 B2 | 9/2019 | Barber |
| 10,453,066 B2 | 10/2019 | Eisen |
| 10,535,093 B2 | 1/2020 | Eisen |
| 10,616,201 B2 | 4/2020 | Eisen |
| 10,642,899 B2 | 5/2020 | Barber |
| 10,679,216 B2 | 6/2020 | Barber |
| 10,691,751 B2 | 6/2020 | Atlas et al. |
| 10,726,151 B2 | 7/2020 | Eisen et al. |
| 10,728,350 B1 * | 7/2020 | Khanwalkar | H04L 67/02 |
| 10,754,913 B2 | 8/2020 | Liodden et al. |
| 10,853,813 B2 | 12/2020 | Eisen |
| 10,862,889 B2 | 12/2020 | Eisen et al. |
| 10,902,327 B1 | 1/2021 | Yalov et al. |
| 10,999,298 B2 | 5/2021 | Eisen |
| 11,010,468 B1 | 5/2021 | Katz |
| 2001/0011243 A1 | 8/2001 | Dembo et al. |
| 2001/0011304 A1 | 8/2001 | Wesigner et al. |
| 2001/0016840 A1 | 8/2001 | Hijikata et al. |
| 2001/0016876 A1 | 8/2001 | Kurth et al. |
| 2001/0018739 A1 | 8/2001 | Anderson et al. |
| 2001/0034712 A1 | 10/2001 | Colvin |
| 2001/0046096 A1 | 11/2001 | Worden |
| 2002/0035622 A1 | 3/2002 | Barber |
| 2002/0041328 A1 | 4/2002 | LeCompte et al. |
| 2002/0046157 A1 | 4/2002 | Solomon |
| 2002/0052852 A1 | 5/2002 | Bozeman |
| 2002/0056042 A1 | 5/2002 | van der Kaay et al. |
| 2002/0073046 A1 | 6/2002 | David |
| 2002/0073327 A1 | 6/2002 | Vellandi |

(56) References Cited

U.S. PATENT DOCUMENTS

| | | |
|---|---|---|
| 2002/0083079 A1 | 6/2002 | Meier et al. |
| 2002/0107853 A1 | 8/2002 | Hofmann et al. |
| 2002/0112171 A1 | 8/2002 | Ginter et al. |
| 2002/0128917 A1 | 9/2002 | Grounds |
| 2002/0138335 A1 | 9/2002 | Palmer et al. |
| 2002/0138577 A1 | 9/2002 | Teng et al. |
| 2002/0153424 A1 | 10/2002 | Li |
| 2002/0156724 A1 | 10/2002 | Levchin et al. |
| 2002/0156836 A1 | 10/2002 | Janosik, Jr. et al. |
| 2002/0166063 A1 | 11/2002 | Lachman et al. |
| 2002/0167965 A1 | 11/2002 | Beasley et al. |
| 2003/0002732 A1 | 1/2003 | Gossett et al. |
| 2003/0002740 A1 | 1/2003 | Melikian et al. |
| 2003/0014327 A1 | 1/2003 | Skantze |
| 2003/0033161 A1 | 2/2003 | Walker et al. |
| 2003/0033356 A1 | 2/2003 | Tran et al. |
| 2003/0070080 A1 | 4/2003 | Rosen |
| 2003/0074301 A1 | 4/2003 | Solomon |
| 2003/0076242 A1 | 4/2003 | Burns et al. |
| 2003/0105707 A1 | 6/2003 | Audebert et al. |
| 2003/0105854 A1 | 6/2003 | Thorsteinsson et al. |
| 2003/0113033 A1 | 6/2003 | Huang |
| 2003/0115334 A1 | 6/2003 | Bhat et al. |
| 2003/0115481 A1 | 6/2003 | Baird et al. |
| 2003/0120543 A1 | 6/2003 | Carey |
| 2003/0120586 A1 | 6/2003 | Litty |
| 2003/0140258 A1 | 7/2003 | Nelson et al. |
| 2003/0140283 A1 | 7/2003 | Nishio |
| 2003/0154214 A1 | 8/2003 | Tu et al. |
| 2003/0158751 A1 | 8/2003 | Suresh et al. |
| 2003/0163359 A1 | 8/2003 | Kanesaka |
| 2003/0163398 A1 | 8/2003 | Yoshioka et al. |
| 2003/0163413 A1 | 8/2003 | Wiczkowski |
| 2003/0172036 A1 | 9/2003 | Feigenbaum |
| 2003/0182551 A1 | 9/2003 | Frantz et al. |
| 2003/0208684 A1 | 11/2003 | Camacho et al. |
| 2003/0212618 A1 | 11/2003 | Keyes et al. |
| 2003/0233553 A1 | 12/2003 | Parks et al. |
| 2003/0237000 A1 | 12/2003 | Denton et al. |
| 2004/0001044 A1 | 1/2004 | Lucian et al. |
| 2004/0004733 A1 | 1/2004 | Barker et al. |
| 2004/0006553 A1 | 1/2004 | de Vries et al. |
| 2004/0010682 A1 | 1/2004 | Foster et al. |
| 2004/0027385 A1 | 2/2004 | Rekimoto et al. |
| 2004/0030912 A1 | 2/2004 | Merkle, Jr. et al. |
| 2004/0034652 A1 | 2/2004 | Hofmann et al. |
| 2004/0034794 A1 | 2/2004 | Mayer et al. |
| 2004/0066023 A1 | 4/2004 | Joseph |
| 2004/0073809 A1 | 4/2004 | Wing Keong |
| 2004/0088313 A1 | 5/2004 | Torres |
| 2004/0098618 A1 | 5/2004 | Kim et al. |
| 2004/0105431 A1 | 6/2004 | Monjas-Llorente et al. |
| 2004/0111621 A1 | 6/2004 | Himberger et al. |
| 2004/0111632 A1 | 6/2004 | Halperin |
| 2004/0117321 A1 | 6/2004 | Sancho |
| 2004/0139008 A1 | 7/2004 | Mascavaage, III |
| 2004/0153644 A1 | 8/2004 | McCorkendale et al. |
| 2004/0159699 A1 | 8/2004 | Nelson et al. |
| 2004/0166857 A1 | 8/2004 | Shim et al. |
| 2004/0171381 A1 | 9/2004 | Inselberg |
| 2004/0181598 A1 | 9/2004 | Paya et al. |
| 2004/0187023 A1 | 9/2004 | Alagna et al. |
| 2004/0203750 A1 | 10/2004 | Cowdrey et al. |
| 2004/0230820 A1 | 11/2004 | Hui Hsu et al. |
| 2004/0236696 A1 | 11/2004 | Aoki et al. |
| 2004/0236702 A1 | 11/2004 | Fink et al. |
| 2004/0254890 A1 | 12/2004 | Sancho et al. |
| 2004/0260876 A1 | 12/2004 | Singh et al. |
| 2004/0260922 A1 | 12/2004 | Goodman et al. |
| 2005/0008148 A1 | 1/2005 | Jacobson |
| 2005/0015601 A1 | 1/2005 | Tabi |
| 2005/0022020 A1 | 1/2005 | Fremberg et al. |
| 2005/0033653 A1 | 2/2005 | Eisenberg et al. |
| 2005/0033703 A1 | 2/2005 | Holdsworth |
| 2005/0039034 A1 | 2/2005 | Doyle et al. |
| 2005/0039219 A1 | 2/2005 | Cooper et al. |
| 2005/0074015 A1 | 4/2005 | Chari et al. |
| 2005/0076230 A1 | 4/2005 | Redenbaugh et al. |
| 2005/0085931 A1 | 4/2005 | Willeby |
| 2005/0097320 A1 | 5/2005 | Golan et al. |
| 2005/0108177 A1 | 5/2005 | Sancho |
| 2005/0111054 A1 | 5/2005 | Umeda |
| 2005/0113092 A1 | 5/2005 | Coppinger et al. |
| 2005/0131826 A1 | 6/2005 | Cook |
| 2005/0165643 A1 | 7/2005 | Wilson et al. |
| 2005/0185225 A1 | 8/2005 | Brawn et al. |
| 2005/0188423 A1 | 8/2005 | Motsinger et al. |
| 2005/0204159 A1 | 9/2005 | Davis et al. |
| 2005/0210533 A1 | 9/2005 | Copeland et al. |
| 2005/0216278 A1 | 9/2005 | Eisen |
| 2005/0246551 A1 | 11/2005 | Dondl et al. |
| 2005/0278542 A1 | 12/2005 | Pierson et al. |
| 2006/0008779 A1 | 1/2006 | Shand et al. |
| 2006/0010072 A1 | 1/2006 | Eisen |
| 2006/0026669 A1 | 2/2006 | Zakas |
| 2006/0031938 A1 | 2/2006 | Choi |
| 2006/0048211 A1 | 3/2006 | Pierson et al. |
| 2006/0064346 A1 | 3/2006 | Steenstra et al. |
| 2006/0069619 A1 | 3/2006 | Walker et al. |
| 2006/0075492 A1 | 4/2006 | Golan et al. |
| 2006/0080263 A1 | 4/2006 | Willis et al. |
| 2006/0126829 A1 | 6/2006 | Lai |
| 2006/0130132 A1 | 6/2006 | Dharmarajan |
| 2006/0136294 A1 | 6/2006 | Linden et al. |
| 2006/0155985 A1 | 7/2006 | Canard et al. |
| 2006/0161501 A1 | 7/2006 | Waserstein et al. |
| 2006/0176984 A1 | 8/2006 | Lee et al. |
| 2006/0190331 A1 | 8/2006 | Tollinger et al. |
| 2006/0190489 A1 | 8/2006 | Vohariwatt et al. |
| 2006/0200855 A1 | 9/2006 | Willis |
| 2006/0200856 A1 | 9/2006 | Salowey et al. |
| 2006/0224898 A1 | 10/2006 | Ahmed |
| 2006/0237531 A1 | 10/2006 | Heffez et al. |
| 2006/0253327 A1 | 11/2006 | Morris et al. |
| 2006/0253328 A1 | 11/2006 | Kohli et al. |
| 2006/0264202 A1 | 11/2006 | Hagmeier et al. |
| 2006/0281541 A1 | 12/2006 | Nguyen et al. |
| 2006/0282660 A1 | 12/2006 | Varghese et al. |
| 2006/0284838 A1 | 12/2006 | Tsatalos et al. |
| 2006/0287902 A1 | 12/2006 | Helsper et al. |
| 2007/0011078 A1 | 1/2007 | Jain et al. |
| 2007/0026942 A1 | 2/2007 | Kinsley et al. |
| 2007/0030528 A1 | 2/2007 | Quaeler et al. |
| 2007/0038568 A1 | 2/2007 | Greene et al. |
| 2007/0043837 A1 | 2/2007 | Kruse et al. |
| 2007/0061211 A1 | 3/2007 | Ramer et al. |
| 2007/0061273 A1 | 3/2007 | Greene et al. |
| 2007/0073630 A1 | 3/2007 | Greene et al. |
| 2007/0094594 A1 | 4/2007 | Matichuk et al. |
| 2007/0097076 A1 | 5/2007 | Gross |
| 2007/0097976 A1 | 5/2007 | Wood et al. |
| 2007/0101405 A1 | 5/2007 | Engle et al. |
| 2007/0107059 A1 | 5/2007 | Chasin et al. |
| 2007/0118892 A1 | 5/2007 | Sastry et al. |
| 2007/0124246 A1 | 5/2007 | Lawyer et al. |
| 2007/0162763 A1 | 7/2007 | Bender et al. |
| 2007/0198410 A1 | 8/2007 | Labgold et al. |
| 2007/0199054 A1 | 8/2007 | Florencio et al. |
| 2007/0204044 A1 | 8/2007 | Rice et al. |
| 2007/0208619 A1 | 9/2007 | Branam et al. |
| 2007/0214151 A1 | 9/2007 | Scott et al. |
| 2007/0220594 A1 | 9/2007 | Tulsyan |
| 2007/0233599 A1 | 10/2007 | Ganesan et al. |
| 2007/0233759 A1 | 10/2007 | Tomlinson et al. |
| 2007/0234070 A1 | 10/2007 | Horning et al. |
| 2007/0234409 A1 | 10/2007 | Eisen |
| 2007/0239604 A1 | 10/2007 | O'Connell et al. |
| 2007/0239606 A1 | 10/2007 | Eisen |
| 2007/0255821 A1 | 11/2007 | Ge et al. |
| 2007/0266257 A1 | 11/2007 | Camaisa et al. |
| 2007/0271466 A1 | 11/2007 | Mak |
| 2007/0294401 A1 | 12/2007 | Shkedi |
| 2007/0297459 A1 | 12/2007 | Cucos et al. |
| 2008/0002725 A1 | 1/2008 | Alicherry et al. |

(56) References Cited

U.S. PATENT DOCUMENTS

| | | |
|---|---|---|
| 2008/0005394 A1 | 1/2008 | Crooks |
| 2008/0010367 A1 | 1/2008 | Cheng et al. |
| 2008/0010678 A1 | 1/2008 | Burdette et al. |
| 2008/0015988 A1 | 1/2008 | Brown et al. |
| 2008/0021801 A1 | 1/2008 | Song et al. |
| 2008/0040653 A1 | 2/2008 | Levine |
| 2008/0040802 A1 | 2/2008 | Pierson et al. |
| 2008/0043634 A1 | 2/2008 | Wang et al. |
| 2008/0045201 A1 | 2/2008 | Kies |
| 2008/0046562 A1 | 2/2008 | Butler |
| 2008/0049779 A1 | 2/2008 | Hopmann et al. |
| 2008/0052629 A1 | 2/2008 | Phillips et al. |
| 2008/0098222 A1 | 4/2008 | Zilberman |
| 2008/0101277 A1 | 5/2008 | Taylor |
| 2008/0104070 A1 | 5/2008 | Lonchar |
| 2008/0104672 A1 | 5/2008 | Lunde et al. |
| 2008/0104684 A1 | 5/2008 | Lunde et al. |
| 2008/0109307 A1 | 5/2008 | Ullah |
| 2008/0120195 A1 | 5/2008 | Shakkarwar |
| 2008/0120214 A1 | 5/2008 | Steele et al. |
| 2008/0121690 A1 | 5/2008 | Carani et al. |
| 2008/0126180 A1 | 5/2008 | Ullah |
| 2008/0133420 A1 | 6/2008 | Barber |
| 2008/0162200 A1 | 7/2008 | O'Sullivan et al. |
| 2008/0162202 A1 | 7/2008 | Khanna et al. |
| 2008/0162475 A1 | 7/2008 | Meggs |
| 2008/0163128 A1 | 7/2008 | Callanan et al. |
| 2008/0184355 A1 | 7/2008 | Walrath et al. |
| 2008/0184372 A1 | 7/2008 | Hoshina |
| 2008/0189790 A1 | 8/2008 | Park |
| 2008/0191007 A1 | 8/2008 | Keay |
| 2008/0201214 A1 | 8/2008 | Aaron |
| 2008/0204788 A1 | 8/2008 | Kelly et al. |
| 2008/0222706 A1 | 9/2008 | Renaud et al. |
| 2008/0235623 A1 | 9/2008 | Li |
| 2008/0239365 A1 | 10/2008 | Salgado et al. |
| 2008/0249820 A1 | 10/2008 | Pathria et al. |
| 2008/0255944 A1 | 10/2008 | Shah et al. |
| 2008/0281606 A1 | 11/2008 | Kitts |
| 2008/0281941 A1 | 11/2008 | Park et al. |
| 2008/0288299 A1 | 11/2008 | Schultz |
| 2008/0301281 A1 | 12/2008 | Wang et al. |
| 2008/0306830 A1 | 12/2008 | Lasa et al. |
| 2008/0313079 A1 | 12/2008 | Van Bosch et al. |
| 2008/0319774 A1 | 12/2008 | O'Sullivan et al. |
| 2008/0319841 A1 | 12/2008 | Oliver et al. |
| 2009/0017805 A1 | 1/2009 | Sarukkai et al. |
| 2009/0018940 A1 | 1/2009 | Wang et al. |
| 2009/0024971 A1 | 1/2009 | Willner et al. |
| 2009/0044279 A1 | 2/2009 | Crawford et al. |
| 2009/0044282 A1 | 2/2009 | Govindaraju |
| 2009/0055398 A1 | 2/2009 | Zhu et al. |
| 2009/0055929 A1 | 2/2009 | Lee et al. |
| 2009/0070664 A1 | 3/2009 | Gavin et al. |
| 2009/0083184 A1 | 3/2009 | Eisen |
| 2009/0089869 A1 | 4/2009 | Varghese |
| 2009/0106413 A1 | 4/2009 | Salo |
| 2009/0138590 A1 | 5/2009 | Lee et al. |
| 2009/0138593 A1 | 5/2009 | Kalavade |
| 2009/0157417 A1 | 6/2009 | Bradley et al. |
| 2009/0164269 A1 | 6/2009 | Gupta et al. |
| 2009/0171760 A1 | 7/2009 | Aarnio et al. |
| 2009/0177692 A1 | 7/2009 | Chagoly et al. |
| 2009/0183010 A1 | 7/2009 | Schnell et al. |
| 2009/0187625 A1 | 7/2009 | Blackstock et al. |
| 2009/0205031 A1 | 8/2009 | Sato et al. |
| 2009/0222308 A1 | 9/2009 | Zoldi et al. |
| 2009/0228585 A1 | 9/2009 | Kosbab et al. |
| 2009/0234738 A1 | 9/2009 | Britton et al. |
| 2009/0241174 A1 | 9/2009 | Rajan et al. |
| 2009/0254430 A1 | 10/2009 | Cherenson |
| 2009/0260064 A1 | 10/2009 | Mcdowell et al. |
| 2009/0265773 A1 | 10/2009 | Schultz |
| 2009/0271306 A1 | 10/2009 | Pierson |
| 2009/0307141 A1 | 10/2009 | Kongalath et al. |
| 2009/0280777 A1 | 11/2009 | Doherty |
| 2009/0292568 A1 | 11/2009 | Khosravani et al. |
| 2009/0293128 A1 | 11/2009 | Lippmann et al. |
| 2009/0296907 A1 | 12/2009 | Vendrow et al. |
| 2009/0298480 A1 | 12/2009 | Khambete et al. |
| 2009/0307119 A1 | 12/2009 | Ahles et al. |
| 2009/0313134 A1 | 12/2009 | Faith et al. |
| 2009/0327333 A1 | 12/2009 | Diener et al. |
| 2010/0004965 A1 | 1/2010 | Eisen |
| 2010/0005013 A1 | 1/2010 | Uriarte |
| 2010/0030641 A1 | 2/2010 | Ibenforth |
| 2010/0030777 A1 | 2/2010 | Panwar et al. |
| 2010/0057623 A1 | 3/2010 | Kapur et al. |
| 2010/0057843 A1* | 3/2010 | Landsman .......... H04L 63/0876 709/203 |
| 2010/0070606 A1 | 3/2010 | Shenfield et al. |
| 2010/0082136 A1 | 4/2010 | Rosenblatt et al. |
| 2010/0082972 A1 | 4/2010 | Benco et al. |
| 2010/0094767 A1 | 4/2010 | Miltonberger |
| 2010/0094768 A1 | 4/2010 | Miltonberger |
| 2010/0106611 A1 | 4/2010 | Paulsen et al. |
| 2010/0107225 A1 | 4/2010 | Spencer et al. |
| 2010/0121716 A1 | 5/2010 | Golan |
| 2010/0138299 A1 | 6/2010 | Preston et al. |
| 2010/0145960 A1 | 6/2010 | Casteel et al. |
| 2010/0153540 A1 | 6/2010 | Li et al. |
| 2010/0157848 A1 | 6/2010 | Das et al. |
| 2010/0161424 A1 | 6/2010 | Sylvain |
| 2010/0161566 A1 | 6/2010 | Adair et al. |
| 2010/0161728 A1 | 6/2010 | Drozt et al. |
| 2010/0169157 A1 | 7/2010 | Muhonen et al. |
| 2010/0169192 A1 | 7/2010 | Zoldi et al. |
| 2010/0192082 A1 | 7/2010 | Sodah |
| 2010/0199332 A1 | 8/2010 | Bachmann et al. |
| 2010/0199338 A1 | 8/2010 | Craddock et al. |
| 2010/0211464 A1 | 8/2010 | Zhu et al. |
| 2010/0223105 A1 | 9/2010 | Gassewitz et al. |
| 2010/0223145 A1 | 9/2010 | Dragt |
| 2010/0228625 A1 | 9/2010 | Priyadarshan et al. |
| 2010/0228638 A1 | 9/2010 | Mikan et al. |
| 2010/0235220 A1 | 9/2010 | Guha et al. |
| 2010/0257065 A1 | 10/2010 | Gupta et al. |
| 2010/0274678 A1 | 10/2010 | Rolf et al. |
| 2010/0293094 A1 | 11/2010 | Kolkowitz et al. |
| 2010/0306827 A1 | 12/2010 | Esteve Balducci et al. |
| 2010/0313009 A1 | 12/2010 | Combet et al. |
| 2010/0321296 A1 | 12/2010 | Gross |
| 2010/0333170 A1 | 12/2010 | Cox et al. |
| 2011/0015497 A1 | 1/2011 | Eggenberger et al. |
| 2011/0022483 A1 | 1/2011 | Hammad |
| 2011/0022517 A1 | 1/2011 | Hammad |
| 2011/0023115 A1 | 1/2011 | Wright |
| 2011/0029339 A1 | 2/2011 | Callahan |
| 2011/0035302 A1 | 2/2011 | Martell et al. |
| 2011/0047072 A1 | 2/2011 | Ciurea |
| 2011/0055627 A1 | 3/2011 | Zawacki et al. |
| 2011/0082768 A1 | 4/2011 | Eisen |
| 2011/0082858 A1 | 4/2011 | Yu et al. |
| 2011/0106610 A1 | 5/2011 | Landis et al. |
| 2011/0112901 A1 | 5/2011 | Fried et al. |
| 2011/0119267 A1 | 5/2011 | Forman et al. |
| 2011/0153426 A1 | 6/2011 | Reddy et al. |
| 2011/0161228 A1 | 6/2011 | Suzuki et al. |
| 2011/0173281 A1 | 7/2011 | Smith |
| 2011/0184778 A1 | 7/2011 | Graepel et al. |
| 2011/0194679 A1 | 8/2011 | Patisaul et al. |
| 2011/0218860 A1 | 9/2011 | Barber |
| 2011/0225091 A1 | 9/2011 | Plastina et al. |
| 2011/0238575 A1 | 9/2011 | Nightengale et al. |
| 2011/0251951 A1 | 10/2011 | Kolkowitz et al. |
| 2011/0258118 A1 | 10/2011 | Ciurea |
| 2011/0264612 A1 | 10/2011 | Ryman-Tubb et al. |
| 2011/0282778 A1 | 11/2011 | Wright et al. |
| 2011/0288932 A1 | 11/2011 | Marks et al. |
| 2011/0302087 A1 | 12/2011 | Crooks |
| 2011/0302096 A1 | 12/2011 | Lowry |
| 2011/0307341 A1 | 12/2011 | Zohar et al. |
| 2011/0314557 A1 | 12/2011 | Marshall |
| 2012/0022883 A1 | 1/2012 | Morrison |

(56) References Cited

U.S. PATENT DOCUMENTS

| | | |
|---|---|---|
| 2012/0030083 A1 | 2/2012 | Newman et al. |
| 2012/0030757 A1 | 2/2012 | Baikalov et al. |
| 2012/0030771 A1 | 2/2012 | Pierson et al. |
| 2012/0036042 A1 | 2/2012 | Graylin et al. |
| 2012/0041841 A1 | 2/2012 | Hu et al. |
| 2012/0042361 A1 | 2/2012 | Wong et al. |
| 2012/0054136 A1 | 3/2012 | Maulik |
| 2012/0054847 A1 | 3/2012 | Schultz et al. |
| 2012/0059711 A1 | 3/2012 | Ramer et al. |
| 2012/0078708 A1 | 3/2012 | Taylor et al. |
| 2012/0084203 A1 | 4/2012 | Mehew et al. |
| 2012/0084860 A1 | 4/2012 | Cao et al. |
| 2012/0094639 A1 | 4/2012 | Carlson et al. |
| 2012/0096076 A1 | 4/2012 | Chan |
| 2012/0101939 A1 | 4/2012 | Kasower |
| 2012/0150742 A1 | 6/2012 | Poon et al. |
| 2012/0150750 A1 | 6/2012 | Law et al. |
| 2012/0157062 A1 | 6/2012 | Kim et al. |
| 2012/0158586 A1 | 6/2012 | Ganti et al. |
| 2012/0166533 A1 | 6/2012 | Rubinstein et al. |
| 2012/0173465 A1 | 7/2012 | Hore et al. |
| 2012/0179558 A1 | 7/2012 | Fischer |
| 2012/0197981 A1 | 8/2012 | Chan |
| 2012/0204262 A1 | 8/2012 | Thomas et al. |
| 2012/0215777 A1 | 8/2012 | Malik et al. |
| 2012/0215896 A1 | 8/2012 | Johannsen |
| 2012/0216282 A1 | 8/2012 | Pappu et al. |
| 2012/0221404 A1 | 8/2012 | Ahmed et al. |
| 2012/0221470 A1 | 8/2012 | Lyon |
| 2012/0222111 A1 | 8/2012 | Oliver et al. |
| 2012/0233640 A1 | 9/2012 | Odryna et al. |
| 2012/0233665 A1 | 9/2012 | Ranganathan et al. |
| 2012/0239553 A1 | 9/2012 | Gonen et al. |
| 2012/0239574 A1 | 9/2012 | Smith et al. |
| 2012/0239774 A1 | 9/2012 | Tola et al. |
| 2012/0254320 A1 | 10/2012 | Dove et al. |
| 2012/0278127 A1 | 11/2012 | Kirakosyan et al. |
| 2012/0278321 A1 | 11/2012 | Traub et al. |
| 2012/0295580 A1 | 11/2012 | Corner |
| 2012/0297380 A1* | 11/2012 | Colbert ................. G06F 9/5061 718/1 |
| 2012/0299925 A1 | 11/2012 | Najork et al. |
| 2012/0311162 A1 | 12/2012 | Paulsen et al. |
| 2012/0323788 A1 | 12/2012 | Keresman et al. |
| 2012/0323836 A1 | 12/2012 | Wright et al. |
| 2012/0324027 A1 | 12/2012 | Vaynblat et al. |
| 2012/0330787 A1 | 12/2012 | Hanson et al. |
| 2013/0005299 A1 | 1/2013 | Raleigh |
| 2013/0006743 A1 | 1/2013 | Moore et al. |
| 2013/0018789 A1 | 1/2013 | Kaufmann |
| 2013/0018791 A1 | 1/2013 | Mendicino et al. |
| 2013/0024300 A1 | 1/2013 | Choudhuri et al. |
| 2013/0036304 A1 | 2/2013 | Lin et al. |
| 2013/0040603 A1 | 2/2013 | Stahlberg et al. |
| 2013/0042298 A1 | 2/2013 | Plaza Fonseca et al. |
| 2013/0054433 A1 | 2/2013 | Giard et al. |
| 2013/0055388 A1 | 2/2013 | Thomas et al. |
| 2013/0073463 A1 | 3/2013 | Dimmick et al. |
| 2013/0073473 A1 | 3/2013 | Heath |
| 2013/0080327 A1 | 3/2013 | Baldrick et al. |
| 2013/0085841 A1 | 4/2013 | Singleton et al. |
| 2013/0097673 A1 | 4/2013 | Meehan et al. |
| 2013/0097701 A1 | 4/2013 | Moyle et al. |
| 2013/0103482 A1 | 4/2013 | Song et al. |
| 2013/0103629 A1 | 4/2013 | Vaiciulis et al. |
| 2013/0110623 A1 | 5/2013 | Kilroy et al. |
| 2013/0110637 A1 | 5/2013 | Bott |
| 2013/0111592 A1 | 5/2013 | Zhu et al. |
| 2013/0117832 A1 | 5/2013 | Gandhi |
| 2013/0124329 A1 | 5/2013 | Tengler |
| 2013/0124332 A1 | 5/2013 | Doughty et al. |
| 2013/0124333 A1 | 5/2013 | Doughty et al. |
| 2013/0144539 A1 | 6/2013 | Allen et al. |
| 2013/0148525 A1 | 6/2013 | Cuadra Sanchez et al. |
| 2013/0159192 A1 | 6/2013 | Partridge et al. |
| 2013/0159195 A1 | 6/2013 | Kirillin et al. |
| 2013/0185764 A1 | 7/2013 | Krstić et al. |
| 2013/0197998 A1 | 8/2013 | Buhrmann et al. |
| 2013/0198066 A1 | 8/2013 | Wall et al. |
| 2013/0204793 A1 | 8/2013 | Kerridge et al. |
| 2013/0226692 A1 | 8/2013 | Kouladjie et al. |
| 2013/0226717 A1 | 8/2013 | Ahluwalia et al. |
| 2013/0253965 A1 | 9/2013 | Joseph |
| 2013/0273879 A1 | 10/2013 | Eisen et al. |
| 2013/0290119 A1 | 10/2013 | Howe et al. |
| 2013/0325601 A1 | 12/2013 | Shekhawat et al. |
| 2013/0326007 A1 | 12/2013 | Turner et al. |
| 2013/0339186 A1 | 12/2013 | French |
| 2013/0339848 A1 | 12/2013 | Patil et al. |
| 2014/0019542 A1 | 1/2014 | Rao et al. |
| 2014/0032902 A1 | 1/2014 | Agrawal et al. |
| 2014/0095320 A1 | 4/2014 | Sivaramakrishnan et al. |
| 2014/0114821 A1 | 4/2014 | Yoshioka et al. |
| 2014/0120864 A1 | 5/2014 | Manolarakis et al. |
| 2014/0122343 A1 | 5/2014 | Einav et al. |
| 2014/0122697 A1 | 5/2014 | Liu et al. |
| 2014/0129322 A1 | 5/2014 | George et al. |
| 2014/0148197 A1 | 5/2014 | Shields |
| 2014/0180802 A1 | 6/2014 | Boal |
| 2014/0197950 A1 | 7/2014 | Shupp et al. |
| 2014/0258125 A1 | 9/2014 | Gerber et al. |
| 2014/0289867 A1 | 9/2014 | Bukai |
| 2014/0361926 A1 | 12/2014 | Eisen et al. |
| 2015/0026027 A1 | 1/2015 | Priess et al. |
| 2015/0039596 A1 | 2/2015 | Stewart |
| 2015/0046989 A1* | 2/2015 | Oberheide ............... G06F 21/44 726/6 |
| 2015/0088980 A1* | 3/2015 | Lakes ..................... H04L 67/02 709/203 |
| 2015/0106198 A1 | 4/2015 | Miller et al. |
| 2015/0106270 A1 | 4/2015 | Burrell et al. |
| 2015/0120717 A1 | 4/2015 | Kim et al. |
| 2015/0127825 A1 | 5/2015 | Johannsen |
| 2015/0142767 A1 | 5/2015 | Wu et al. |
| 2015/0161207 A1* | 6/2015 | Li ......................... G06F 16/951 707/747 |
| 2015/0186901 A1 | 7/2015 | Miltonberger |
| 2015/0188897 A1* | 7/2015 | Grigorovici ........... H04L 67/22 726/4 |
| 2015/0193769 A1 | 7/2015 | Barber |
| 2015/0193821 A1 | 7/2015 | Izumori et al. |
| 2015/0205978 A1 | 7/2015 | Eisen et al. |
| 2015/0242861 A9 | 8/2015 | Baldassano |
| 2015/0254658 A1 | 9/2015 | Bondesen et al. |
| 2015/0294316 A1 | 10/2015 | Eisen |
| 2015/0350856 A1 | 12/2015 | Circosta et al. |
| 2016/0019546 A1 | 1/2016 | Eisen |
| 2016/0021084 A1 | 1/2016 | Eisen |
| 2016/0034954 A1 | 2/2016 | Tollinger et al. |
| 2016/0036782 A1* | 2/2016 | Jeffrey ............. H04N 21/25875 726/28 |
| 2016/0125461 A1 | 5/2016 | Sivaramakrishnan et al. |
| 2016/0182657 A1 | 6/2016 | Mukherjee et al. |
| 2016/0203487 A1 | 7/2016 | Eisen |
| 2016/0246581 A1 | 8/2016 | Jimenez et al. |
| 2016/0321701 A1 | 11/2016 | Artman et al. |
| 2017/0039571 A1 | 2/2017 | Eisen |
| 2017/0142106 A1 | 5/2017 | Eisen et al. |
| 2018/0089459 A1 | 3/2018 | Eisen et al. |
| 2018/0101890 A1 | 4/2018 | Eisen |
| 2018/0108029 A1 | 4/2018 | Sinha et al. |
| 2018/0121915 A1 | 5/2018 | Britton et al. |
| 2018/0262478 A1 | 9/2018 | Eisen |
| 2018/0322500 A1 | 11/2018 | Eisen |
| 2019/0028472 A1 | 1/2019 | Eisen |
| 2019/0066192 A1 | 2/2019 | Eisen |
| 2019/0340642 A1 | 11/2019 | Barber |
| 2019/0356659 A1 | 11/2019 | Eisen et al. |
| 2019/0370859 A1 | 12/2019 | Traasdahl et al. |
| 2020/0005315 A1 | 1/2020 | Eisen |
| 2020/0013064 A1 | 1/2020 | Eisen |
| 2020/0034845 A1 | 1/2020 | Eisen |
| 2020/0092287 A1 | 3/2020 | Cano et al. |
| 2020/0218763 A1 | 7/2020 | Barber |

(56) References Cited

U.S. PATENT DOCUMENTS

| | | |
|---|---|---|
| 2020/0219173 A1 | 7/2020 | Eisen |
| 2020/0226186 A1 | 7/2020 | Liodden et al. |
| 2020/0294086 A1 | 9/2020 | Traasdahl et al. |
| 2020/0380162 A1 | 12/2020 | Eisen et al. |
| 2021/0224811 A1 | 7/2021 | Eisen |
| 2021/0226950 A1 | 7/2021 | Eisen |

FOREIGN PATENT DOCUMENTS

| | | |
|---|---|---|
| EP | 0 923 039 | 6/1999 |
| EP | 1 067 792 | 1/2001 |
| EP | 1 209 935 | 5/2002 |
| EP | 1 256 911 | 11/2002 |
| EP | 1 201 070 B1 | 6/2006 |
| EP | 1 703 382 | 9/2006 |
| EP | 1 197 032 B1 | 8/2007 |
| EP | 2 154 891 | 2/2010 |
| EP | 2 323 091 | 5/2011 |
| EP | 3 583 758 | 4/2021 |
| GB | 2 491 101 | 11/2012 |
| GB | 2 492 604 | 1/2013 |
| JP | 05-257602 | 10/1993 |
| JP | 2000-020467 | 1/2000 |
| JP | 2000-099250 | 4/2000 |
| JP | 2000-137755 | 5/2000 |
| JP | 2000-242582 | 9/2000 |
| JP | 2000-276281 | 10/2000 |
| JP | 2002-007697 | 1/2002 |
| JP | 2002-297869 | 10/2002 |
| JP | 2002-304568 | 10/2002 |
| JP | 2003-050910 | 2/2003 |
| JP | 2005-063216 | 3/2005 |
| JP | 2005-115644 | 4/2005 |
| JP | 2005-135431 | 5/2005 |
| JP | 2006-004333 | 1/2006 |
| JP | 2007-018446 | 1/2007 |
| JP | 2007-041642 | 2/2007 |
| JP | 2007-272520 | 10/2007 |
| JP | 2007-282249 | 10/2007 |
| JP | 2008-022298 | 1/2008 |
| JP | 2008-065363 | 3/2008 |
| JP | 2008-171315 | 7/2008 |
| JP | 2008-535062 | 8/2008 |
| JP | 2008-535124 | 8/2008 |
| JP | 2008-242805 | 10/2008 |
| JP | 2008-243008 | 10/2008 |
| JP | 2008-257434 | 10/2008 |
| JP | 2008-269229 | 11/2008 |
| JP | 4202314 | 12/2008 |
| JP | 2009-017298 | 1/2009 |
| JP | 2009-048538 | 3/2009 |
| JP | 2009-512940 | 3/2009 |
| JP | 2009-122880 | 6/2009 |
| JP | 2009-175984 | 8/2009 |
| JP | 2009-271661 | 11/2009 |
| JP | 2010-020728 | 1/2010 |
| JP | 2010-061254 | 3/2010 |
| JP | 2010-122955 | 6/2010 |
| JP | 2010-122956 | 6/2010 |
| JP | 2010-146153 | 7/2010 |
| JP | 2010-225040 | 10/2010 |
| JP | 2010-250664 | 11/2010 |
| JP | 2011-065531 | 3/2011 |
| JP | 2011-134252 | 7/2011 |
| JP | 2011-159264 | 8/2011 |
| JP | 2011-159307 | 8/2011 |
| JP | 2011-524560 | 9/2011 |
| JP | 2011-210263 | 10/2011 |
| JP | 2012-234503 | 11/2012 |
| JP | 5191376 | 5/2013 |
| JP | 5216932 | 6/2013 |
| JP | 2015-503148 | 1/2015 |
| KR | 10-1999-0015738 | 3/1999 |
| KR | 10-0645983 | 11/2006 |
| KR | 10-2008-0044558 | 5/2008 |
| KR | 10-2009-0051977 | 9/2009 |
| KR | 10-2010-0085888 | 7/2010 |
| WO | WO 96/041488 | 12/1996 |
| WO | WO 97/003410 | 1/1997 |
| WO | WO 99/050775 | 10/1999 |
| WO | WO 01/011450 | 2/2001 |
| WO | WO 01/033520 | 5/2001 |
| WO | WO 01/095550 | 12/2001 |
| WO | WO 01/097134 | 12/2001 |
| WO | WO 02/001462 | 1/2002 |
| WO | WO 02/071176 | 9/2002 |
| WO | WO 02/091226 | 11/2002 |
| WO | WO 03/017155 | 2/2003 |
| WO | WO 03/025868 | 3/2003 |
| WO | WO 03/075197 | 9/2003 |
| WO | WO 03/075197 A3 | 12/2003 |
| WO | WO 02/037219 A9 | 5/2004 |
| WO | WO 2004/038997 | 5/2004 |
| WO | WO 2005/038818 | 4/2005 |
| WO | WO 2005/099166 | 10/2005 |
| WO | WO 2006/135367 | 12/2006 |
| WO | WO 2007/001394 | 1/2007 |
| WO | WO 2007/045818 | 4/2007 |
| WO | WO 2007/072238 | 6/2007 |
| WO | WO 2007/075573 | 7/2007 |
| WO | WO 2008/029828 | 3/2008 |
| WO | WO 2008/054849 | 5/2008 |
| WO | WO 2009/132148 | 10/2009 |
| WO | WO 2011/081818 | 7/2011 |
| WO | WO 2011/104864 | 9/2011 |
| WO | WO 2012/054646 | 4/2012 |
| WO | WO 2012/061801 | 5/2012 |
| WO | WO 2012/142121 | 10/2012 |
| WO | WO 2012/142584 | 10/2012 |
| WO | WO 2013/006538 | 1/2013 |
| WO | WO 2013/070687 | 5/2013 |
| WO | WO 2013/074750 | 5/2013 |
| WO | WO 2013/142722 | 9/2013 |
| WO | WO 2014/022813 | 2/2014 |
| WO | WO 2014/078569 | 5/2014 |
| WO | WO 2017/040799 | 3/2017 |
| WO | WO 2018/129373 | 7/2018 |
| WO | WO 2018/151822 | 8/2018 |

OTHER PUBLICATIONS

U.S. Appl. No. 16/114,056, now U.S. Pat. No. 10,728,350, filed Aug. 27, 2018, Data Structures for Intelligently Resolving Deterministic and Probabilistic Device Identifiers to Device Profiles and/or Groups.

Banking Services Newsletter, "Keeping You Up-to-Date on Banking Developments Throughout the UC System", University of California, Office of the President, Banking Services Group, Newsletter 1, Dec. 2005, p. 1.

Bharosa, "Bharosa Authenticator", http://www.bharosa.com/authenticator.html, Jan. 18, 2007, pp. 3.

Bharosa, "Bharosa Announces Online Authentication Solution to Counter Check 21-Based Fraud", http://www.bharosa.com/news/PR-110705.html, Jan. 18, 2007, pp. 2.

Darlin, Damon, "Opening the Door on the Credit Report and Throwing Away the Lock", http://www.nytimes.eom/2006/03/18/business/yourmoney/18money.html, The New York Times, Saturday Mar. 18, 2006, pp. 2.

Derfler, Jr. et al., "How Networks Work", Millennium Edition, Que Corporation, Indianapolis, IN, Sep. 2000, pp. 230.

Gralla, Preston, "How The Internet Works", Millennium Edition, Que Corporation, Indianapolis, IN, Aug. 1999, pp. 329.

Gueye et al., "Constraint-Based Geolocation of Internet Hosts", ACM Internet Measurement Conference 2004, Oct. 25-27, 2004, Taormina, Sicily, Italy, vol. 14, No. 6, pp. 288-293.

"ISO 8583", Wikipedia, http://en.wikipedia.org/wiki/ISO_8583, dated Apr. 13, 2015 in 14 pages.

Kohno et al., "Remote Physical Device Fingerprinting", Proceedings of 2005 IEEE Symposium on Security and Privacy, May 8-11, 2005, Oakland, CA, pp. 211-225.

(56) References Cited

OTHER PUBLICATIONS

Manavoglu et al., "Probabilistic User Behavior Models", ICDM, Third IEEE International Conference on Data Mining, Nov. 19-22, 2003, pp. 203-210.
Techweb, "Wells Fargo Intros Anti-Theft Alerts", http://www.techweb.com/wire/166404177, Aug. 1, 2005, pp. 1.
The Knightmare, "Secrets of a Super Hacker", Loompanics Unlimited, Port Townsend, Washington, 1994, pp. 233.
"UPIC Marketing Guide—The Clearing House", http://www.upic.com/infofiles/UPIC_Marketing_Guide.pdf, as printed Dec. 19, 2006. pp. 1-16.
White, Ron, "How Computers Work", Millennium Edition, Que Corporation, Indianapolis, IN, Sep. 1999, pp. 284.
Darlin, Damon, "Opening the Door on the Credit Report and Throwing Away the Lock", http://www.nytimes.com/2006/03/18/business/yourmoney/18money.html, The New York Times, Saturday Mar. 18, 2006, pp. 2.
Official Communication in European Patent Application No. 05818903.6, dated Dec. 23, 2011.
Official Communication in European Patent Application No. 05818903.6, dated Mar. 18, 2014.
Official Communication in European Patent Application No. 05818903.6, dated Jul. 18, 2017.
International Search Report and Written Opinion for Application No. PCT/US2005/035532, dated Oct. 29, 2007.
International Preliminary Report on Patentability and Written Opinion for Application No. PCT/US2005/035532, dated Jan. 9, 2008.
Official Communication in European Patent Application No. 6845722.5, dated Mar. 13, 2009.
Official Communication in European Patent Application No. 19181057.1, dated Sep. 17, 2019.
Official Communication in European Patent Application No. 8159110.9, dated Oct. 27, 2008.
Official Communication in European Patent Application No. 8159110.9, dated Mar. 22, 2010.
International Search Report and Written Opinion for Application No. PCT/US2006/048251, dated Feb. 26, 2008.
International Preliminary Report on Patentability and Written Opinion for Application No. PCT/US2006/048251, dated Jun. 18, 2008.
International Search Report and Written Opinion for Application No. PCT/US2007/065776, dated Jul. 3, 2008.
International Preliminary Report on Patentability and Written Opinion for Application No. PCT/US2007/065776, dated Sep. 30, 2008.
International Search Report and Written Opinion received in PCT Application No. PCT/US2005/020750, dated Jun. 13, 2008.
International Preliminary Report on Patentability and Written Opinion received in PCT Application No. PCT/US2005/020750, dated Jul. 1, 2008.
Official Communication in European Patent Application No. 08165224.0, dated Nov. 15, 2010.
Supplementary European Search Report for Application No. EP09735653, dated Dec. 16, 2011.
Official Communication for Application No. EP09735653, dated Jan. 4, 2013.
Summons to Attend Oral Proceedings received in European Application No. EP09735653, dated Oct. 7, 2016.
International Search Report and Written Opinion for Application No. PCT/US2009/041462, dated Dec. 1, 2009.
International Preliminary Report on Patentability and Written Opinion for Application No. PCT/US2009/041462, dated Nov. 4, 2010.
International Search Report and Written Opinion for Application No. PCT/US2011/056948, dated Apr. 18, 2012.
International Preliminary Report on Patentability in Application No. PCT/US2011/056948, dated May 2, 2013.
International Search Report and Written Opinion for Application No. PCT/US2013/033357, dated Jul. 10, 2013.
International Preliminary Report on Patentability in Application No. PCT/US2013/033357, dated Sep. 23, 2014.
International Search Report and Written Opinion for Application No. PCT/US2013/053495, dated Nov. 22, 2013.
International Preliminary Report on Patentability in Application No. PCT/US2013/053495, dated Feb. 3, 2015.
International Search Report and Written Opinion for Application No. PCT/US2013/070146, dated Mar. 3, 2014.
International Preliminary Report on Patentability in Application No. PCT/US2013/070146, dated May 28, 2015.
U.S. Appl. No. 61/324,312, filed Apr. 15, 2010 in 15 pages.
Official Communication in European Patent Application No. 19189189.4, dated Jan. 21, 2020.
Official Communication in European Patent Application No. 19189189.4, dated Nov. 19, 2020.
Summons to Attend Oral Proceedings received in European Application No. EP08159110, dated Jul. 23, 2020.
Official Communication received in European Patent Application No. 16766741.9, dated Aug. 20, 2019.
Summons to Attend received in European Patent Application No. 16766741.9, dated Mar. 25, 2020.
Official Communication received in European Patent Application No. 21154719.5, dated Jun. 15, 2021.
International Search Report and Written Opinion for Application No. PCT/US2012/065220, dated Mar. 21, 2013.
International Preliminary Report on Patentability in Application No. PCT/US2012/065220, dated May 30, 2014.
International Search Report and Written Opinion for Application No. PCT/US2016/049930, dated Nov. 9, 2016.
Bourobou et al., "User Activity Recognition in Smart Homes Using Pattern Clustering Applied to Temporal ANN Algorithm", Sensors, May 21, 2015, vol. 15, pp. 11953-11971.
Elkhodr et al., "A Review of Mobile Location Privacy in the Internet of Things", 2012 Tenth International Conference on ICT and Knowledge Engineering, 2012, pp. 266-272.
Kisel et al., "Utilizing a Personalization-Enabled Access Node in Support of Converged Cross-Domain Scoring and Advertising", Bell Labs Technical Journal, 2010, vol. 15, No. 1, pp. 77-94.
Marshall, Jack, "Device Fingerprinting Could Be Cookie Killer", ClickZ. Mar. 2, 2011, pp. 7. http://www.clickz.com/clickz/news/2030243/device-fingerprinting-cookie-killer.
Quora, [No Author Listed], How does a tracking pixel work? by Quora, 2011.

\* cited by examiner

| | Priority | Rule name | Precondition | Precondition Value | Window Key Type | Window Key Threshold | Velocity Timeframe | Velocity Value | Attribute 1 | Attribute 1 - Match Tier | Attribute 2 | Attribute 2 - Match Tier | Attribute n | Attribute n - Match tier |
|---|---|---|---|---|---|---|---|---|---|---|---|---|---|---|
| 541 | 10 | SC | | | SessionCookie_MD5 | 3 | None | 0 | bcookieMd5_Exists | A(true) | | | | |
| 542 | 20 | L_ID UserAgent | | | Login_ID | 100 | None | 0 | L_ID | A(true) | Headers UserAgent | A(true) | | |
| 543 | 30 | I5302_A | Game Console | | Hours | 5 | Day | 1000 | I5302_EM_Hours | A(min=0, max=2) | | | | |
| 544 | 31 | I5302_B | Game Console | | Hours | 5 | Day | 1000 | I5302_EM_Hours | D(min=2, max=12) | | | | |
| 545 | 32 | I5302_C | Game Console | | Hours | 5 | Day | 1000 | I5302_EM_Hours | F(min=12, max=48) | | | | |
| 546 | 40 | I6101 | Desktop | | Exist_Hours | 5 | Day | 1000 | I6101_Exist_Hours | A(min=0, max=6) | | | | |
| 547 | 50 | IPUA | Tablet Type | ipad | IP4 ExistsHours | 5 | Day | 1000 | IP4_Exists_Hours | A(min=0, max=4) | Headers UserAgent | A(true) | | |
| 548 | 60 | IP4UA_A | Mobile Type | android | IP4 ExistsHours | 5 | Day | 1000 | IP4_ExistsHours | A(min=0, max=24) | Headers UserAgent | A(true) | | |
| 549 | 61 | IP4UA_B | Mobile Type | android | IP4 ExistsHours | 5 | Day | 1000 | IP4_ExistsHours | B(min=24, max=72) | Headers UserAgent | A(true) | | |

Device Identifier Mapping

Configuration

Identifiers
Rule Sets
Organization
Users

Identifiers [New Identifier]

| ID | Name | Code | Type | Comparison Function | Created By | | |
|----|------|------|------|---------------------|------------|---|---|
| 18 | IP1 | IP1 | IP1OCTET | EXACTMATCH | 1 | Edit | Delete |
| 17 | IP4 | IP4 | IP4OCTET | EXACTMATCH | 1 | Edit | Delete |
| 8 | Session Cookie | SC | SCOOKIE | EXACTMATCH | 1 | Edit | Delete |
| 20 | WebSrvcID | Y1 | 1STPARTYID | EXACTMATCH | 1 | Edit | Delete |
| 19 | ISOLATED_A_6 | I46 | ISOLATED | EXACTMATCH | 1 | Edit | Delete |
| 25 | CountryCodeAA | CC | CTRYCODE | EXACTMATCH | 1 | Edit | Delete |
| ... | ... | ... | ... | ... | ... | | |
| N | {Name} | {Code} | {Type} | {Function} | {Creator} | | |

FIG. 7

Device Identifier Mapping

Configuration

Identifiers
Rule Sets
Organization
Users

Edit / Add Identifier

| | |
|---|---|
| Name | IP4 |
| Code | SC |
| Description | Session Cookie |
| Type | Session Cookie |
| Comparison Function | EXACTMATCH |
| Save Identifier | ☑ |
| Index | ☑ |
| Expand | ☑ |

[Submit] [Delete] Cancel

Match Tiers  [Add Match Tier]

| Tier | Min Range Integer | Max Range Integer | Min Range Double Prec. | Max Range Double Prec. | Min Range String | Max Range String | Boolean Value | | |
|---|---|---|---|---|---|---|---|---|---|
| A | 0 | 0 | 0 | 0 | | | True | Edit | Delete |
| B | 0 | 120 | 0 | 0 | | | | Edit | Delete |
| ... | ... | ... | ... | ... | ... | ... | ... | | |

FIG. 8

Device Identifier Mapping

Configuration

Identifiers
Rule Sets
Organization
Users

Edit Identifier Expansion

| | |
|---|---|
| Name | IP4 |
| Code | SC |
| Description | Session Cookie |
| Type | Session Cookie |
| Comparison Function | EXACTMATCH |
| Save Identifier | ☑ |
| Index | ☑ |
| Expand | ☑ |
| Expansion Type | IP Octet |
| Child Identifiers | IP1<br>IP4<br>ISOLATED_4_6<br>CountryCodeAA  [Add Another] |
| Expansion Type | IP to Country |
| Child Identifiers | IP1<br>IP4<br>ISOLATED_4_6<br>CountryCodeAA  [Add Another] |

[Submit]  [Delete]  Cancel

DATA STRUCTURES FOR INTELLIGENTLY RESOLVING DETERMINISTIC AND PROBABILISTIC DEVICE IDENTIFIERS TO DEVICE PROFILES AND/OR GROUPS

This application is a continuation of U.S. application Ser. No. 16/114,056, filed on Aug. 27, 2018, which is a continuation of U.S. application Ser. No. 14/882,340, filed on Oct. 13, 2015, now U.S. Pat. No. 10,091,312, issued on Oct. 2, 2018, which claims the benefit of priority of U.S. Provisional Patent Application Ser. No. 62/063,567, filed on Oct. 14, 2014, where all such applications are hereby incorporated herein by reference in their entirety.

BACKGROUND

Internet based technology traditionally has relied on the use of cookies as one mechanism for tracking user preferences and other information. As one example, cookie identifiers generated and used by web browsers, mobile applications, and web service providers present a convenient approach to help identify devices and users for various purposes.

SUMMARY

Consumers are increasingly being represented in the digital world by their devices. This identification of a consumer by their device allows companies to tie together historical activities of digital consumers' from multiple device, and subsequently manage and optimize the consumer experience via better, more informed decisions. As devices and Internet access channels proliferate, the ability to identify consumer devices has significantly fragmented, making fraud detection, authentication processing, data measurement, and data collection substantially more difficult. While companies have relied on the HTTP browser cookie as the primary identification technique, cookies have been losing their efficacy. Techniques beyond the cookie, such as device Hardware IDs, Operating System IDs, and Statistical IDs, have all evolved over the past 5 years to make device identification very fragmented, complex, and expensive.

FIG. 1 illustrates an example of the various relationships that are possible between a user and the user's multiple devices and further between the multiple browsers and applications the user accesses on those multiples devices. Furthermore, grouping of users by households, or some other group of related users, can provide even further insight into behavior of each of the users within the household, as well as provide household level analysis that may be useful for various purposes, such as fraud risk detection, authentication, and targeted content. As shown, each of the consumer devices may be used by an individual via a multitude of media channels, including one or more applications ("Apps"), browsers, and/or other standalone software installed on the device. Each of these Apps or browsers may potentially utilize a different identification technique, which may generate different identifiers, which may in turn be associated with the same computing device. As different device identities are established for the same computing device, there may be a resulting high degree of fragmentation across different applications and other media contexts which, technically and literally, originate from a single computing device. As a result, service providers may end up developing and maintaining different device identities and/or associate those different device identities with multiple user accounts which technically may originate from a single individual using a single computing device. This can lead to fragmented and inefficient efforts to provide safe, relevant and/or targeted experiences and/or content to the individual, as a service provider may see many "distinct" devices or users which actually may correspond to a single computing device.

The challenges of resolving a user to a particular device and/or identifying the various relationships illustrated in FIG. 1 will likely persist and grow in the future in response to several factors, such as (a) connected devices continuing to proliferate in market, creating more touch-points with consumers; (b) identification of blind spots gradually increasing, emphasized by the continuous decline of the cookie; (c) identification becoming more fragmented with no viable future for an industry-wide adopted technology, resulting in more siloed data; and, (d) consumer privacy regulation becoming more heightened globally. Accordingly, there is a technological problem associated with resolving information received from a particular application (e.g., a mobile application) from a particular device (e.g., a user's tablet) to a particular device identifier, user, group of related user devices, and/or group of users associated with one or more of the user devices.

In one embodiment, a computing system comprises one or more hardware computer processors and a network interface providing data communication with (1) a first electronic data store configured to store a plurality of matching algorithms associated with a corresponding plurality of online requesting entities, said matching algorithms each including one or more deterministic matching rule and one or more probabilistic matching rule, and (2) a second electronic data store configured to store a plurality of device profiles. In one embodiment, each device profile is associated with a different electronic communication device and includes at least: a unique device identifier; and one or more identifiers associated with the electronic communication device, each of the identifiers associated with a respective identifier type of a plurality of identifier types. In one embodiment, the computing system further comprises a non-transitory storage device storing executable software instructions that when executed: receive online event data including a plurality of device identifiers associated with a first device that has interacted with a first online requesting entity; access, from the first electronic data store, a first matching algorithm associated with the first online requesting entity, the first matching algorithm including a plurality of matching rules; and until either a determination that a particular accessed device profile of the plurality of device profiles matches a selected matching rule of the matching algorithm, or until all of the matching rules of the matching algorithm are evaluated with reference to the online event data, in real-time: select a highest priority matching rule of the matching algorithm that has not yet been evaluated with reference to the online event data; determine a selected identifier type indicated in the selected matching rule; determining an identifier of the selected identifier type from the one or more device identifiers of the online event data; for each of the plurality of device profiles: accessing the device profile identifier of the selected first identifier type in the device profile; determine whether the device profile identifier matches the identifier of the selected identifier type from the online event data; in response to determination that the profile device identifier matches the identifier of the selected identifier type from the online event data, provide, to the requesting entity, a unique device identifier associated with the matched device profile in the second electronic data store; in response to determination that none of the matching rules of the matching algorithm match a device profile of the plurality of device profiles: generate a new device profile associated with a unique device identifier and at least some of the online event data; and provide, to the requesting entity, the unique device identifier associated with the new device profile, wherein the first matching algorithm is executed in real-time in response to receiving the online event data.

Digital Identification Resolution

Disclosed herein are digital identification resolution processes, which are processes of recognizing and linking disparate identification data elements from multiple sources and reconciling those data elements to correspond to a single device or group of devices. An ID Resolution System described herein performs a digital identification resolution process through the use of unique IDs (DPIDs) for each device and/or group of devices that can be reliably recognized when only anonymous data related to a device (e.g., from a browser request from the device) is known. In addition, the ID Resolution System may support client supplied attributes, such as by mapping DPIDs to client-specific one way hashed identifiers that are representative of personally identifiable information ("PII").

The ID Resolution System can use any available "identifiers," which is used throughout this specification to generally describe any attribute associated with a device, such as a device type identifier, a cookie identifier, a particular device ID (such as Apple™'s Identifier for Advertising ("IDFA") and Google™'s AndroidId or Advertising ID), first or third party identifiers, client supplied identifiers, contextual data (e.g., location data and/or network information), such as IP addresses, timestamps, time-differential linking ("TDL") data, Latitude/Longitude coordinates (either provided directly or indirectly via an IP address), and/or any other attribute associated with a device, even if later developed. Such identifiers may be received by the ID Resolution System described herein and used to determine, based on a combination of deterministic and/or probabilistic matching rules, a device profile identifier (a "DPID") and/or a group profile identifier (a "GPID"). Furthermore, these identifiers, the DPIDs, and/or the GPIDs may be translated by the ID Resolution System in various manners to provide the requesting entity with various information associated with the provided input data that have would not otherwise be available.

In various embodiments, the ID Resolution System provides numerous technical benefits in addition to the other benefits described herein. For example, the ID Resolution System may be configured to be provide high-performance and scalability to provide highly responsive, real-time, identifier-to-DPID mappings (e.g., 10 ms or less) for very high volume of device identifiers (e.g., for hundreds, thousands, or millions of devices). The ID Resolution System can also be configured to protect security and privacy, both of the requesting entity data that is shared with the ID Resolution System and of the underlying individual users of the devices, using one or more encryption techniques and by preserving user privacy choices (e.g., opt-out and/or opt-in choices) at the device profile level. For example, requesting entities may provide, to the ID Resolution System, privacy choice information with a set of device identifiers. The ID Resolution System can then store these privacy preferences with the DPID profile and return information to the requesting entity in accordance with these privacy preferences. The ID Resolution System may be configured to comply with any applicable privacy laws, rules, and regulations, including but not limited to COPPA, EU Data Privacy Directives, EU Cookie Laws, eDAA Principles, EU US Safe Harbor, DAA Code of Conduct (2013), and/or NAI Code of Conduct (2013).

An ID Resolution System such as the one described herein may provide a standalone, digital identity management platform focused to improve & enable identifying protection, fraud detection, marketing, and other technologies to better identify devices, related devices and users, and/or identifiers associates with those devices. As an example, the ID Resolution System may be used by or in conjunction with, among others, data management platforms, demand-side platforms, supply-side platforms, attribution solutions, re-targeters, measurement and attribution tools, ad servers, exchanges, ad networks, agency trading desks, and risk-based user authentication solutions.

The ID Resolution System provides a variety of benefits to help requesting entities improve targeting efforts. For example, using the unique DPIDs and/or other services provided by the ID Resolution System, requesting entities can retarget users or customers from mobile device applications (e.g., on a tablet, smartphone, or similar device) which do not rely on or implement third party cookies, and for which traditionally no connection between mobile device applications and third party cookies does not exist. In addition, cookies may not be persistent and are prone to being reset or deleted, which leads to "cookie churn" and/or potentially "losing" the customer due to the disappearance of the cookie. Cookie churn can lead to inaccurate conversion metrics and, ultimately, reduced customer spending. There is also an inability to compute accurate conversion metrics from in-application advertising to mobile web conversion. The unique DPID provided by the ID Resolution System may help overcome the issues of cookie churn and/or inaccurate conversion metrics by, for example, providing a DPID that persists whether the associated cookie is lost.

Another potential benefit provided by the ID Resolution System is an increased confidence level of uniquely identifying trusted devices (and/or, similarly, untrusted devices). Such identification may be used in many security applications, such as to improve authentication of users and/or devices (e.g., to reduce requirements of login processes from known trusted devices), provide privacy persistent assurances for a user, perhaps across multiple devices and applications of the particular user, provide fraud risk assessments (e.g., a fraud risk score associated with one or more received identifiers), and any other applications wherein device identification, group identification, and/or identity translation is advantageous.

In some embodiments, the ID Resolution System may help requesting entities improve attribution efforts. Attribution is the process of identifying a set of user actions ("events") that contribute in some manner to a desired outcome, and then assigning a value to each of these events. Attribution provides a level of understanding of what combination of events influence individuals to engage in a desired behavior, typically referred to as a conversion. The ID Resolution System improves attribution tracking by enabling improved tracking of user behavior across applications and/or devices. For example, the unique DPID and/or GPID may enable or improve the ability to track conversion from applications (e.g., a mobile app) to the web (e.g., a mobile web browser). Attribution windows may also be increased by extending the lifetime of sessions through the continued use of a unique DPID that persists even though underlying device identifiers may change or evolve over time (e.g., new device identifiers may replace old ones but still be mapped to the same unique DPID, new device identifier types may replace old types but still be mapped to the same unique DPID, etc.). The ID Resolution System also provides the ability to analyze "view-through" attribution without relying on third party cookies. In some embodiments, the ID Resolution System provides the ability to utilize device groupings or "households" and multi-screen, multi-device associations in order to enable cross-device attribution.

The ID Resolution System provides a variety of benefits that may help requesting entities improve audience building and maintenance efforts. For example, ID Resolution System can enable requesting entities to build or identify segments in the mobile web context that do not rely on third party cookies. Segments may also be built across multiple devices using the cross-device visibility provides by the GPIDs and related GPID profiles provided by the ID Resolution System. The ability to increase the overall lifetime and persistence of unique DPIDs also can contribute to improved maintenance of active profiles and segment quality. This can also further enable the ability to track customers across multiple websites in both mobile web and in applications to build segments based on multiple websites owned by a publisher or service provider.

Another potential benefit provided by the ID Resolution System may include enabling media buying platforms to increase reach to targetable audiences across multiple digital touch points with greater confidence and persistency for improved campaign performance (for example, by enabling targeting in instances where cookies are not available or may not work, such as in non-web browser applications that do not implement cookies; by enabling targeting across mobile applications and web browsers; by enhancing cross-screen and/or cross-device targeting; and so on).

A fragmented, complex and expensive identification landscape adversely impacts companies' ability to deliver relevant, personalized and safe experiences to their customers, degrading not only ROI, but also brand reputation. As example, marketers are inefficient in their advertising spend, since they are not able to reliably target individuals due to the proliferation of web access channels (e.g. multiple browsers, native apps) and devices. These inefficiencies can be due to factors such as poor conversion analytics, too-broadly targeted media, or not reaching a customer during their decision journey. Marketers often cannot identify their customers reliably for many reasons: identifiers ("IDs") typically exist in their own context (for example, each web browser has its own cookie space, mobile ID's may not be accessible in mobile web environments, etc.); there is no concept of an individual or device address; IDs can be transient and can be erased easily; IDs cannot be generated in all cases (for example, a third party may block cookie reading or writing); and in general, sharing IDs among partners (universality) can be complex and require significant resource overhead.

Another potential benefit provided by the ID Resolution System may include enabling brands and agencies to better track the performance of marketing programs holistically across multiple digital touch points, which can help contribute to a more meaningful, accurate measurement of marketing spend (for example, by improving conversion tracking from mobile applications to web browsers; by increasing attribution windows; by enabling or improving view through attribution and/or cross-device attribution; and so on).

Another potential benefit provided by the ID Resolution System may include enabling publishers and/or media selling partners to better define and extend targetable audiences across multiple digital touch points to maximize yield (for example, by enabling or improving tracking and segmentation in mobile applications; by enabling or improving tracking and segmentation across multiple devices and/or domains; by increasing the overall persistency and "lifetime" of users and associated profiles; and so on).

Another potential benefit provided by the ID Resolution System may include enabling data owners and data management platforms to better capture and rationalize audience data across multiple digital touch points to maximize the impact of audience insights (for example, by enabling or improving the ability to connect data across multiple devices and/or environments; by increasing the lifetime of a profile; by enabling or providing seamless data distribution that is not reliant on cookie synchronization; and so on).

The ID Resolution System described herein may be used by customers to augment other methods of identification (e.g. browser cookies, native device identifies, etc.), specifically by filling in identification gaps in environments/use cases where these other identification methods do not work or perform poorly, and to connect the activity of "unknown users." The systems and methods described herein may be used, directly and indirectly, by brands, web publishers, mobile app developers and marketing technology platforms, including ad tech, data management and analytics platforms. These companies can leverage the ID Resolution System to improving the efficacy and return on investment ("ROI") of their and/or their customers' marketing programs, by filling in identification gaps relating to their ad operations, audience data management and analytics, in a privacy and data secure manner. The ID Resolution System and features described herein may also be applicable to a variety of other online contexts, including but not limited to, ecommerce, session management, fraud detection, user management, web authentication, to name a few.

BRIEF DESCRIPTION OF THE DRAWINGS

FIG. 5B is a table illustrating an example matching algorithm including a plurality of matching rules.

FIG. 7 illustrates an example user interface that presents a list of identifiers and associated comparison functions available for identifier matching rules, as generated using one embodiment, such as the ID Resolution System of FIG. 13.

FIG. 8 illustrates an example user interface that presents editable configuration options for an identifier, as generated using one embodiment such as the ID Resolution System of FIG. 13.

FIG. 9 illustrates an example user interface that presents identifier expansion configuration options for an identifier, as generated using one embodiment, such as the ID Resolution System of FIG. 13.

FIG. 11 illustrates an example user interface that presents editable configuration options for a rule, as generated using one embodiment, such as the ID Resolution System of FIG. 13.

DETAILED DESCRIPTION

Figure 1:
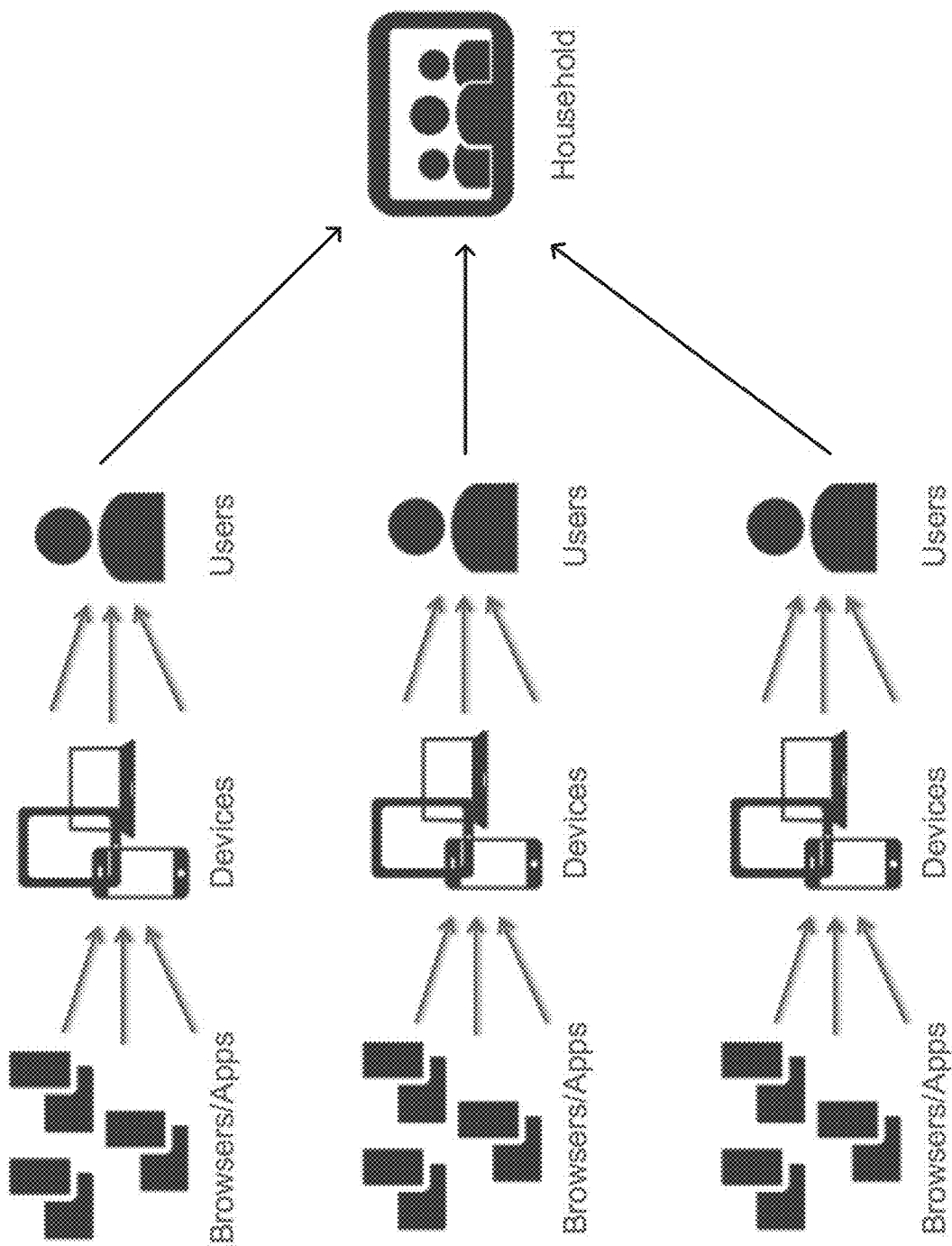
FIG. 1 is a block diagram illustrating various combinations of device identifiers that may be provided by various browsers, applications, or other software executing on one or more of the multiple devices that are associated with particular users, which may themselves be associated with a household.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

For purposes of this disclosure, certain aspects, advantages, and novel features of various embodiments are described herein. It is to be understood that not necessarily all such advantages may be achieved in accordance with any particular embodiment of the invention. Thus, for example, those skilled in the art will recognize that one embodiment may be carried out in a manner that achieves one advantage or group of advantages as taught herein without necessarily achieving other advantages as may be taught or suggested herein.

Overview

As discussed in further detail below, the ID Resolution System may leverage deterministic and/or probabilistic identifiers to provide a consistent and coherent view of a particular device. By using both types of identifiers, the system may better associate an identifier (or multiple identifiers) with a DPID and/or GPID. For example, in some embodiments use of multiple probabilistic identifiers may result in a near deterministic match to a DPID. As used herein, a deterministic ID of a device is unique to the device. If such a deterministic identifier is available, and it matches one that has been seen previously, the ID Resolution System can be confident that the event (from which the deterministic identifier was identified) originated from the same device. For example, a cookie that has been seen more than once can be deterministically associated with that same cookie that was previously seen (and the corresponding DPID of the browser), except perhaps in fraud use cases where, for example, cookie values may be hijacked by fraudsters (see further discussion below regarding such fraud use cases). When only probabilistic IDs are available for an online event, the ability to do this matching becomes more challenging. Probabilistic IDs, such as a device insight identifier (e.g., provided by $41^{st}$ Parameter) are more prone to collisions and divisions due to the probabilistic nature of the identifiers. Thus, general, device identifier mapping systems that analyze only probabilistic identifiers have problems with collisions, such as where multiple probabilistic identifiers are resolved to a same device, while deterministic systems have problems with device separation, such as when a device identifier changes and then has a new device identifier and also an old device identifier each associated with a same physical device.

The ID Resolution System disclosed herein improves this technical challenge of resolving device identifiers with better accuracy to particular devices. In some embodiments, the ID Resolution System measures performance of probabilistic IDs when used for real-time matching so that an understanding of statistical error inherent in probabilistic matching related to respective identifiers may be determined. Outcomes of this analysis can then be used to generate models for using probabilistic identifiers alongside deterministic identifiers so that a statistical device identification technology can be provided to a requesting entity with an expected and controlled error rate.

The systems and methods described below make use of both probabilistic and deterministic identifiers in order to provide a more coherent view of the device. Advantageously, the requesting entity can control the extent to which probabilistic and/or deterministic identifiers are used in determining a matching DPID and/or GPID, such as to set a confidence level that the requesting entity has in a set of identifiers.

WI The ID Resolution System may include a device profile data store wherein DPIDs and GPIDs are maintained and updated over time. The device profiles (e.g., associated with respective DPIDs) may include the unique DPID and a history of all device identifiers which have been associated or mapped to the unique DPID over time, including frequency of use and other statistical information which may be useful for auditing and improving resolution rules over time. For example, a device profile may also include any matching pattern used to link or map certain device identifiers and/or sessions to the DPID. In some embodiments, auditing information and reports may be generated by the ID Resolution System to provide a summary of the frequency of each match pattern being applied and corresponding mapping results. Such reports may be useful to the service provider who may use the auditing data to modify or further customize identifier mapping or matching rules to improve the efficacy of device identifier mappings. The device profile may further include any information that may be necessary to identify the device, including contextual data such as IP addresses, timestamps, TDL data, Latitude/Longitude coordinates, and/or privacy choice flags in order to preserve privacy choices associated with user(s) of the device. In some embodiments, the ID Resolution System can provide device profile merging capability (for example, identifying when two profiles are really the same). Thus, through the observation of IDs over time, device profiles can be merged through common attributes.

Example ID Resolution System Processes

In one embodiment, the ID Resolution System performs multiple functions that may be requested separately (or in combination) from requesting entities. For example, in one embodiment the ID Resolution System may perform a device matching process, a group matching process, and an identity translation process. In this embodiment, the device matching process receives one or more identifiers of an event associated with a device (e.g., information regarding an access request to a requesting entities website or database) and attempts to identify a DPID associated with the requesting device. The group matching process receives a DPID, or some other device identifier that can be used to resolve a DPID, and determines one or more GPIDs to which the device is associated. The identity translation process provides translations of various types of identifiers to other resolved data items (e.g., any data in an associated DPID and/or GPID). Each of these exemplary processes are described in further detail below. While described separately, the processes may be performed as part of a single data request from a requesting entity. For example, a cookie identifier may be provided by a request entity with a request to provide all available information, which may result in return of a DPID, one or more GPIDs, and various data from the device and/or group profiles associated with the identified IDs.

Definitions

In order to facilitate an understanding of the systems and methods discussed herein, a number of terms are defined below. The terms defined below, as well as other terms used herein, should be construed broadly to include the provided definitions, the ordinary and customary meaning of the terms, and/or any other implied meaning for the respective terms. Thus, the definitions below do not limit the meaning of these terms, but only provide exemplary definitions.

Requesting Entity, Service Provider, or Online Service Provider: an entity that requests data from the ID Resolution System, such as via an API through which the requesting entity can transmit online event data to the ID Resolution System. The requesting entity may be an entity that provides services directly to end users, e.g. via devices that communicate with a server (e.g., website, application, etc.) of the requesting entity or an entity that provides analysis of information regarding user devices (e.g., a fraud detection entity). Requesting entities may be clients of an entity that operates the ID Resolution System or may receive information from the ID Resolution System based on some other arrangement.

Online Event or Event: Any interaction by a user device with a server, website, database, and/or other online data owned by or under control of the requesting entity. Online events include access of webpages, submission of information via webpages, accessing a server via a standalone application (e.g., an application on a mobile device or desktop computer), or any other access protocols.

Event data: Attributes or any other information associated with one or more online events, such as an attribute that may be used to identify, possibly in combination with other identifiers, a particular electronic device.

Device Identifiers or Identifiers: Any attribute associated with a device or any activity of the device. Device identifiers may include event data, such as may be gathered in response to an online event initiated by a device. Device identifiers may include attributes of a device that are usable to identify the device with varying degrees of uniqueness—some identifiers may be deterministic (e.g., an identifier that is unique for a particular device), while some identifiers may be probabilistic (e.g., an identifier may not be unique for a particular device, but may in some cases be used to identify the particular device with a degree of probability, especially in association with other identifiers).

Without limiting the scope of this term, in various embodiments device identifiers may include, for example, one or more of a cookie, a device-specific identifier, an operating system generated identifier, an identifier generated and/or used in association with a particular application installed on the device (e.g., an "app ID"), an identifier generated and/or used in association with a particular web service accessed using the device (e.g., a "login ID"), an IP address (or portion thereof) used by the device to communicate with one or more networks, a MAC address, authentication credentials, browser information, time of day, week, year information, and/or any other identifier which may be associated with a device.

In some implementations, some device identifiers may be derived ("derived device identifiers") based on one or more device-related attributes and/or identifiers. For example, the ID Resolution System may deploy client side JavaScript code (also referred to as a JavaScript Collector, which may be included in a client's website or App, for example), for collecting various attributes and/or identifiers from a device, and provide the data collected to a server side identification system that executes an algorithm(s) on those identifiers to compute a derived device identifier, which may be used in the same manner as any other device identifier discussed herein, such as in application of device matching rules. In some embodiments, different algorithms (or "recipes"), e.g., applied to different device identifiers with different weightings, may be applied to the same event data in order to provide multiple derived device identifiers, each potentially usable with different levels of accuracy and longevity in uniquely identifying the device. In some embodiments, derived device identifiers do not use any personally identifiable information. In some embodiments, derived device identifiers do not rely on cookies and/or other deterministic identifiers. In some implementations, device identifiers may include one or more expanded identifiers, which are discuss further below.

Device Profile Identifier or DPID: An identifier that is unique to a device, such as to a particular mobile phone, smartphone, tablet, laptop, desktop, smart watch, smart glasses, gaming system, server computing system, or any other computing device. A DPID is associated with a device profile, which includes various information regarding, for example, the device, online events of the device, one or more users of the device, one or more groups associated with the device, and any other information about the device, such as any of the information discussed below.

Group Profile Identifier of GPID: An identifier that may be associated with more than one DPID, such as multiple DPIDs each determined to be part of a common household or multiple DPIDs that are each associated with a particular user. A GPID may be created initially with only a single DPID and then other DPIDs associated with the corresponding group may be later added. A GPID is associated with a group profile, which includes various information regarding, for example, the devices associated with the group, such as links to the DPIDs of those devices.

Matching Algorithm: logic that compares one or more identifiers, such as received from a requesting entity in association with an online event, in an attempt to determine a particular device associated with the one or more identifiers. A matching algorithm may be particular to a requesting entity, such as to optimize use of particular identifiers that are typically available to the requesting entity and/or to meet the desires match confidence level of the particular requesting entity. A matching algorithm may have multiple components, such as a deterministic matching algorithm and/or a probabilistic matching, which are discussed further below. A matching algorithm may include a series of rules that are executed in a prioritized order until a device is matched with a requisite confidence level or all of the rules have been executed. A rule may include one or more of the following components:

- Precondition: a condition that limits the device profiles processed by the remaining rules, such as based on an identifier that would typically exclude a large quantity of device profiles from further processing. For example, a precondition may identify a particular device type (e.g., desktop, mobile, etc.) and/or operating system (e.g., Apple iOS, android, Windows) required for device profiles to remain in the set of profiles processed by other rules.
- Window key type: A window key type is the identifier type (or idType) used to lookup candidate device profiles for purposes of matching. In general, the window key type may be used to further limit the quantity of candidate device profiles that are processed with reference to the comparison function.
- Window key size threshold: A quality threshold that determines the maximum number of device profiles that can be included in the candidate profile set.
- Velocity: A frequency limitations, such as hits per day, device count etc. that limits application of rules associated with identifiers that have been seen more than the defined limit. For example, if a velocity component of a rule is set to five per day and the particular identifier has been already been seeing five times that day, the comparison function for the rule may be skipped.
- Attribute: a device identifier or portion of a device identifier to be used in comparison with a set of candidate user profiles. An attribute may be derived from one or more identifiers of the device. For example, an attribute may include a device "fingerprint" that is derived based on one or more identifiers of the device.
- Comparison function: the mathematical relationship required between the indicated attribute of the rule and one or more values or value ranges. As discussed further below, such comparison functions may include exact match, exists, exists hours, difference, etc.
- Match tier: An acceptable value or range of values to be used with reference to the associated comparison function and attribute. For example, if the comparison function involves a time dimension, then the match tier may indicate a required timeframe for the attribute for the identifier to match the rule.

Example Probabilistic Identifier Modeling

As noted above, in cases where a deterministic identifier is known, a matching algorithm may determine whether there is a one to one match of the input identifier to any of the identifiers associated with DPIDs in the profile data store. In the case of a user-level identifier, such as email addresses or account IDs, the matching algorithm may apply analyze one or more additional identifiers to deterministically resolve the event to a DPIID. For example, a user id identifier (that deterministically identifies a user) may be analyzed in combination with a User-Agent string to match a particular device (DPID) and its corresponding device profile. For example, a matching algorithm for deterministic identifiers may include several rules each related to one type of deterministic ID using an "exact match" comparison logic, such as an exact match on cookie, exact match on email and User Agent, exact match on IDFA, and other related combinations.

When probabilistic IDs are used by a requesting entity, the ID Resolution System may initially examine behavior of these identifiers alongside deterministic identifiers to evaluate the extent to which statistical error of the probabilistic identifier causes wrong matches that adversely impact the quality of device resolution. In one embodiment, the ID Resolution System performs testing of a probabilistic matching algorithm, such as including multiple probabilistic matching rules, in order to train the matching algorithm. In one embodiment, the ID Resolution system executes an initial probabilistic matching algorithm alongside a deterministic matching algorithm on sets of event data including both deterministic and probabilistic identifiers, in order to benchmark how well rules and/or sets of rules, based on probabilistic identifiers match to DPIDs. The probabilistic matching algorithm may then be updated to test various combinations of probabilistic rules that may increase confidence levels in matching to unique devices.

In one embodiment, a benchmark matching algorithm is applied to incoming event data from a requesting entity while a test matching algorithm is also applied to the same incoming event data. The benchmark matching algorithm analyzes one or more deterministic identifiers so that deterministic matches are output, while the test matching algorithm includes rules associated with one or more probabilistic identifiers. In general, the outcome of the two matching algorithms is compared (for each set of event data that is analyzed) in order to determine which probabilistic rules improve confidence level of a match and which probabilistic rules do not. For example, if a set of identifiers associated with 1000 events are processed over a time period, the outcome from each of the benchmark and test matching algorithms may be compared to generate a score indicative of how well the test matching algorithm (and/or each individual test rule of the test matching algorithm) works in identifying corresponding devices. For example, if the benchmark matching algorithm (e.g., applying deterministic rules) matches a first device profile and a first test rule also matches that same first device profile, the score for the first test rule may increase. Correspondingly, if the benchmark matching algorithm matches a first device profile, but the first test rule matches a second device profile, the score for the first test rule may decrease. In one embodiment, if neither matching algorithm matches an existing device profile (e.g., such that a new device profile is created), the score for the test rule may not be impacted (e.g., this result does not necessarily indicate any increased or decreased matching capabilities of the test rule). In the example above where 1000 events are processed by both matching algorithms, if 700 events resulted in the same device profile match from the benchmark and first test rule, while 200 events resulted in different device profile matches and 100 events resulted in no profile matches, a score for that test rule may be calculated as 700/(700+200)=78%. Thus, this percentage indicates a confidence level that the first test rule would accurately match subsequent event data to devices, assuming the event data is of a similar type and quality. Similar analysis may be performed of other test rules of the test matching algorithm, either on the same set of event data (e.g., the example 1000 events discussed above) or other sets of event data (e.g., test rules may be analyzed sequentially two different sets of data) to determine confidence levels for additional test rules.

In one embodiment, an overall score for the test matching algorithm (e.g., comprising three different test rules each applied to 1000 set up event data) may be calculated based on the individual test rule accuracy scores weighted based on quantity of events that triggered the respective rule (e.g., number of events that outputted a "matching" device profile from the rule, whether or not the device profile matched the benchmark matching algorithm output). For example, if the first test rule at a 78% accuracy for a total of 900 triggered matches (700 of which were correct and 200 of which were incorrect), while a second test rule had a 95% accuracy for a total of 200 triggered matches and a third test rule had a 50% accuracy for a total of 600 triggered matches, the overall test matching algorithm accuracy may be calculated using the formula:

$$A = \frac{\sum_{1}^{n} RA \times T}{\sum_{1}^{n} T}$$

Where A is the matching accuracy, n is the number of rules, RA is rule accuracy for a particular rule, and T is a quantity of events for which the particular rule triggered. Using this formula and the example benchmark matching algorithm output discussed above results in: A=(0.78*900+0.95*200+0.5*600)/(900+200+600)=70%. Similarly, accuracy of a subset of test rules may be calculated, such as to increase an overall matching accuracy of a test matching algorithm. For example, the test rules having the highest matching accuracy in the example above would result in an overall matching accuracy of 81% (0.78*900+0.95*200)/(900+200)). Thus, these various matching accuracies (e.g., the rule specific and/or overall matching algorithm accuracies) may be provided to the requesting entity in order to determine the optimal test rules for production use in its probabilistic matching algorithm, perhaps in combination with a deterministic matching algorithm.

In other embodiments, accuracy of a test matching algorithm may be assessed and/or calculated in different manners. Advantageously, with a matching accuracy developed for the test matching algorithm, if the confidence level is not at the requisite level (a required matching level set by the requesting entity), parameters of the test matching algorithm may be adjusted (e.g., adjusting value ranges of match tiers for one or more identifiers and/or removing or adding additional attributes to the test matching rules) and retested in an attempt to increase the confidence level.

With a test matching algorithm accuracy of such as using the methodology discussed above, accuracy of an overall matching algorithm (e.g., that also includes deterministic matching algorithm) may be tested and, typically, expected to obtain an even higher matching accuracy in view of the addition of the deterministic matching algorithm that normally would be applied first on incoming event data. For example, matches output from each of one or more deterministic rules of the benchmark matching algorithm, as applied to the same event data (e.g., the set of 1000 event data sets discussed above) may be used in combination with the probabilistic accuracy levels of particular probabilistic rules in order to determine an overall Matching Algorithm Accuracy. In one embodiment, the proposed matching algorithm comprising one or more deterministic rules and one or more probabilistic roles may be reapplied to the set of event data and an overall accuracy calculated using the probabilistic rule accuracy levels determined previously. Because some events will be matched using deterministic rules, not giving probabilistic rules a chance to match, the overall ruleset accuracy is expected to increase. Below is an example matching algorithm including two deterministic rules (rules 1-2) and the two highest accuracy probabilistic rules from above (rules 3-4 below) that are applied in priority number until one rule matches, such that if rule one matches, 2-4 are not evaluated.

| Rule | Match Accuracy | Triggered Events |
| --- | --- | --- |
| 1. Cookie match | 100% | 500 |
| 2. Email & User Agent match | 100% | 300 |
| 3. First test rule | 78% | 100 |
| 4. Second test rule | 95% | 50 |

Thus, the overall matching algorithm accuracy has been increased to 97.4% ([(1*500)±(1*300)+(0.78*100)+(0.95*50)]/(500+300+100+50)) with an increase of 150 more events (out of 1000 total events) being matched to devices than would be possible using only the deterministic rules.

Example Device Matching

In one embodiment, an ID Resolution System may provide a unique and persistent DPID in response to receipt of one or more of various identifiers received from a requesting entity. Furthermore, the ID Resolution System may provide various other information associated with the provided identifiers, such as an indication of a particular user, other devices associated with the user, a household (or other group) of which the user or device is a member, and other related information. DPID resolution may be performed for various requesting entities, such as entities that analyze data associated with users and/or provide data to users. For example, a requesting entity may be a fraud detection entity, an authentication entity, a marketer, a website provider, an application provider, and/or a media buying and/or selling entity. Depending on the embodiment, the requesting entity (also referred to herein as a "service provider") may provide multiple services for users in conjunction with the device profile and/or other related resolution information associated with a DPID (e.g., discussed below with reference to translation processed) that may be determined.

Advantageously, the ID Resolution System provides a flexible and highly customizable and configurable architecture that enables requesting entities to configure matching algorithms to satisfy their own levels of tolerance for statistical error that may arise when resolving various identifiers associated with a device with varying degrees of uniqueness to a device profile. For example, some device identifiers may be unique and/or highly deterministic (e.g., unique for a particular device or user), while some device identifiers may be less unique and/or more generally probabilistic (e.g., the identifier may be reused for multiple devices, as may sometimes be the case for an IP address).

Below is an example "Match Device" request that may be received from a requesting entity.

Samples Match Device Request

POST: http://localhost:1111/service/matchdevice
{
"inputIds": {
"tpcookie": "bb8a2551-4eca-4006-8a55-a4",
"IP": "59.232.19.9"
},
"time": "1442252559", "verbose": "false",
"clientId": "client1",
"privacy":[
{"privacyType":"DNT", "value": "FALSE"}

]
}

In response to the above request, the ID Resolution System may return, such as by applying a matching algorithm developed for and/or by the requesting entity that includes both probabilistic and/or deterministic components, for example, the determined DPID in one of the below example formats:

---

VERBOSE RESPONSE SAMPLE

---

```
"id": "3fccc0a1-a296-437b-a5db-c8fc7312d144",
"Id": {
    "tpcookie": "bb8a2551-4eca-4006-8a55-a4",
    "email": "user@example.com",
    "IP": "59.232.19.9",
    "fpcookie": "1dedb5f7-50.58.243.144-14",
    "DIID530": "c570c1d9-8a0a-426c-b504-13c5"
},
"pr": {
    "DNT": {
        "cv": "FALSE",
        "au": {
            "1442252": "FALSE"
        }
    }
}
}
```

---

NON-VERBOSE RESPONSE SAMPLE

---

```
{
    "id": "3fccc0a1-a296-437b-a5db-c8fc7312d144",
    "pr": {
        "DNT": {
            "cv": "FALSE",
            "au": {
                "1442252": "FALSE"
            }
        }
    }
}
```

---

As discussed further below, the ID Resolution System implements a device matching technology that analyzes probabilistic and/or deterministic identifiers of a device. Such identifiers currently number in the hundreds or thousands, and are expected to change and increase over time. Advantageously, the ID Resolution System analyzes such identifiers from Internet-connected devices to match a DPID that can be used for tracking and targeting, similarly to other identifiers (e.g., cookies or native device IDs), but whereas other identifiers only work in certain environments/platforms/devices, a DPID may be determined for a device based on various different identifiers and/or combinations of identifiers that may be available from online events.

In various embodiments, the ID Resolution System creates and maintains profiles for each DPID that may be integrated, analyzed, linked, managed, translated and/or distributed in a wide array of different online and offline identifiers and other information, from different device/application/browser contexts. Such device profiles may further be associated with device groups created at the household level (e.g., association of multiple devices to one or more living unit or location) and/at the user level (e.g., association of multiple devices to a single user), as discussed below.

Example Group Matching

Figure 2:
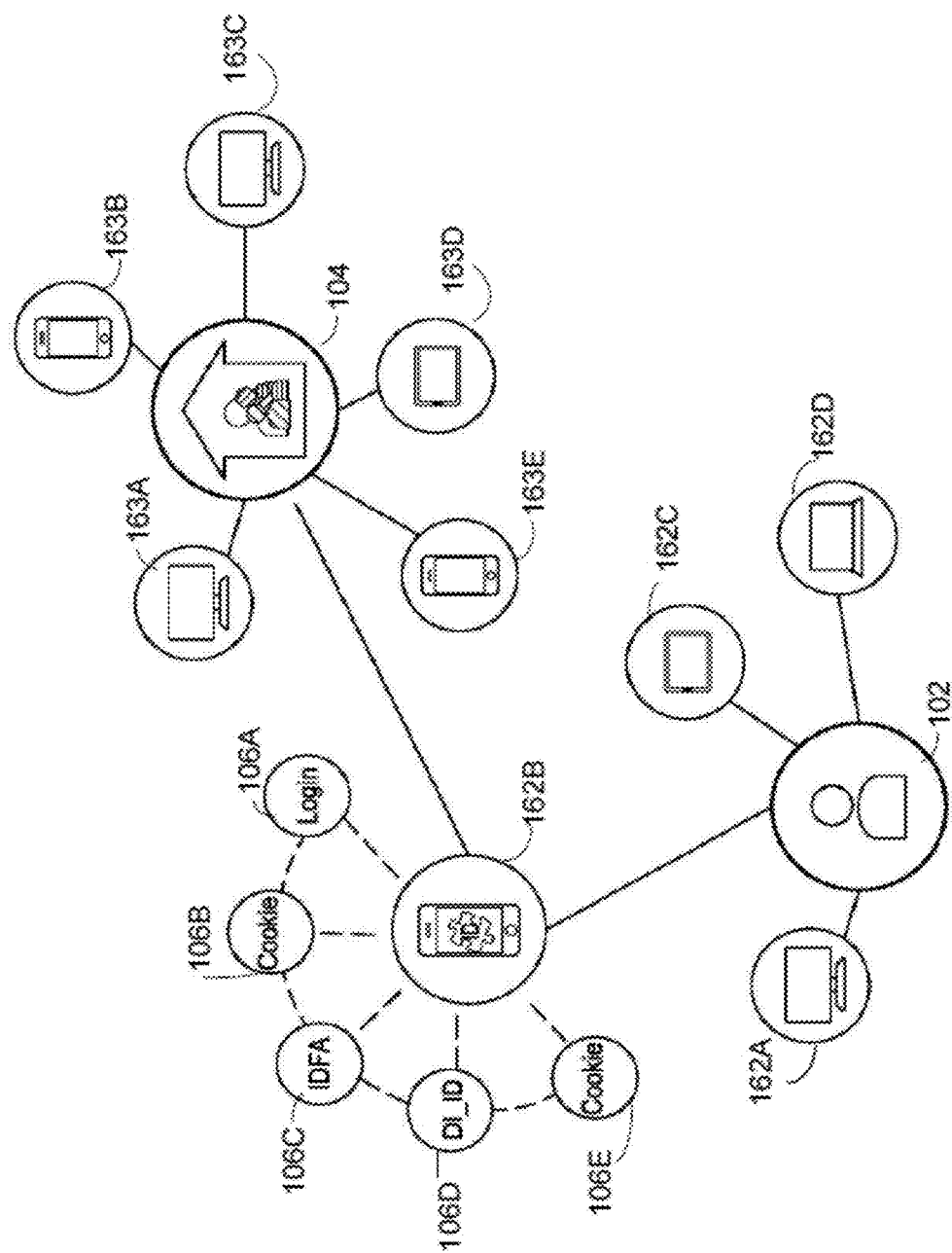
FIG. 2 is a block diagram which illustrates various logical connections which may be determined between various consumer devices, an individual, and members of the individual's household, according to one embodiment.

FIG. 2 illustrates, for example, a user 102 associated with multiple devices 162A, 162B, 162C, 162D (which are referred to herein collectively and/or individually as user devices 162). As shown, this particular user may regularly (or at very different frequencies) use each of these four different devices 162. As is also shown, user device 162B is also associated with the user's household 104. Thus, device 162B is not only a device of the user 102, but is also a device of the household 104. For example, the device 162B may be a tablet device that is used by multiple family members of the user 102.

In this example, the device 162B is also associated with multiple identifiers that may be transmitted by the device 162B to various requesting entities (e.g., websites, application providers, databases, storage devices, etc.). In this particular embodiment, the identifiers illustrated (which may be provided individually or in some combination to the ID Resolution System) include a login data element 106A, a cookie data element 106B, an IDFA data element 106C, a DI_ID data element 106D, and another cookie data element 106E. Many other identifiers, which may correspond to a particular browser, application, operating system, device hardware, device type, or various other properties of a device, may also be associated with the device 162B (and similarly with the other devices 162 associated with the user 102). Some identifiers are constant (e.g., never change for a particular device) while others are transient (e.g., may change each time the data element is transmitted). Some identifiers are more accurate than others, and some are available everywhere, regardless of platform or access point while others are platform, device, or channel specific. Accordingly, identity fragmentation results from this wide variety of identifiers from various devices in different contexts.

The ID Resolution System may provide the ability to identify or generate device groupings (e.g., "householding") by implementing one or more matching rules based on IP address, device types, and various patterns displayed by each. A GPID matching engine may also provide the capability to associate multiple devices with a single user to enable multi-screen marketing and targeted content efforts. For example, one-way hashed identifiers provided by a first party (for example, an encrypted or hashed login ID) may be utilized in conjunction with the unique device ID and/or device profile in order to link or associate multiple unique devices together as being likely associated with a single user. Thus, a GPID may be associated with a group of devices that are used by multiple users (e.g., a "household" GPID including multiple DPIDs of devices used within a household) and/or multiple devices used by a particular user (e.g., a "multiscreen" GPID).

In the example of FIG. 2, the devices 162A, 162B, 162C, and 162D may each be associated with a multiscreen GPID of the user 102. Thus, that GPID may include the DPID's of each of those devices. For example, commonly used login IDs, IP addresses or IP octets (e.g., IPv4), cookie identifiers (e.g., session or login cookies), native and/or device identifiers (e.g., IDFA, IDFV, Android_ID, DeviceUniqueID, ASHWID, ANID2, etc.), and the like may be mapped or associated with different and distinct computing devices used by the individual 102. For example, the individual 102 may use multiple computing devices at home to access email or websites. These interactions may track to different devices (e.g., a laptop, a tablet, a smartphone, etc.) but use the same IP address. The ID Resolution System may enable more intelligent linking of these different devices to a common individual, thus providing greater visibility to a requesting entity that might otherwise view each different device as corresponding to different individuals.

Furthermore, device 162B, as wells as the five other devices 163A-163E that are associated with the household 104 may be associated with a household GPID. This household grouping may provide greater visibility into connections between individuals associated with the user 102. For example, multiple members of a household may use one or more shared computing devices, such as device 162B, but have different and/or unique login IDs and other identifiers associated with their respective usage. In certain embodiments, device groupings implementing unique matching rules based on IP address, device types, and the patterns displayed by each may be implemented to generate a device-based view of a household. In this embodiment, a household GPID for the household 104 may be created and associated with multiple DPIDSs of computing devices, including device 162B and devices 163A-163E. In some implementations, certain devices may be included in multiple group profiles, including one or more multiscreen and/or household groups.

One example of householding is based primarily on an IP address of matching requests received from various service providers. For example, the ID Resolution System may receive an IP address (e.g., an IPv4 address) from a first requesting entity and determine a connection type of the IP address. In one embodiment, the connection type is determined by a third-party service, such as by using a geo-IP database to determine (or predict in some circumstances) whether the connection type is residential, commercial, and/or another type. If the received IP address is determined to be residential, the determined DPID (e.g., using the device matching process discussed herein) may be associated with a GPID that is representative of a household. When other DPIDs are later associated with the same IP address (e.g., through subsequent device matching processes performed for the same or other service providers), those other DPIDs are also associated with the GPID such that the devices of that household are then linked within the GPID.

Depending on the embodiment, the householding rules may include limitations on combining groups of DPIDs from an IP address into a GPID. For example, in one embodiment if more than a predetermined number of DPIDs are associated with the same IP address, those DPIDs are not associated with a GPID (or at least not a household GPID) since the large number of DPIDs from that IP address may indicate some larger organization than a household.

Below is an example "Group" request that may be received from a requesting entity.
Example Group Request
Get
http://localhost: 1111/service/group/identifier/email/value/user@example.co m/MS?noofdevices=2&verbose=true&translation=INDEX In response to the above request, the ID Resolution System may first perform a device matching process (e.g., such as by using a matching algorithm including probabilistic and deterministic matching rules) to identify a DPID and then identify a GPID associated with the DPID in the device profile. In other embodiments, the GPID profile information may be requested with a request that includes the DPID and/or the GPID. The identified GPID (or multiple GPIDs) may then be parsed, filtered, and/or organized in various manners (such as may be defined by the requesting entity) for return to the requesting entity. Below is an example response to the a GPID request in one particular example format:
Example Verbose Group Response Sample

```
{
    "groupDetails": {
        "email": {
            "user@example.com": [
                {
                    "dp": {
                        "id": "2f19994e-5876-4419-8ef2-41750b7c019c",
                        "ld": {
                            "tpcookie": "d7eb3654-a82e-4620-ba48-cb8d",
                            "email": "user@example.com",
                            "IP": "59.232.19.5"
                        },
                        "ih": {
                            "tpcookie": {
                                "cd": "tpcookie",
                                "it": "SESSIONCOOKIE",
                                "sz": 1,
                                "ls": {
                                    "d7eb3654-a82e-4620-ba48-cb8d": {
                                        "vl": "d7eb3654-a82e-4620-ba48-cb8d",
                                        "hc": 2,
                                        "fs": 1442252,
                                        "ls": 1442252
                                    }
                                }
                            },
                            "email": {
                                "cd": "email",
                                "it": "FIRSTPARTYID",
                                "sz": 1,
                                "ls": {
                                    "user@example.com": {
                                        "vl": "user@example.com",
                                        "hc": 2,
                                        "fs": 1442252,
                                        "ls": 1442252
                                    }
                                }
                            },
                            "IP": {
                                "cd": "IP",
                                "it": "IP4OCTET",
                                "sz": 1,
                                "ls": {
                                    "59.232.19.5": {
                                        "vl": "59.232.19.5",
                                        "hc": 2,
                                        "fs": 1442252,
                                        "ls": 1442252
                                    }
                                }
                            }
                        },
                        "pr": {
                            "DNT": {
                                "cv": "FALSE",
                                "au": {
                                    "1442252": "FALSE"
                                }
                            }
                        }
                    },
                    "lgid": "3a0d3383-bf28-456f-a147-df8807037d31"
                },
                {
                    "dp": {
                        "id": "3fccc0a1-a296-437b-a5db-c8fc7312d144",
                        "ld": {
                            "tpcookie": "bb8a2551-4eca-4006-8a55-a4",
                            "email": "user@example.com",
                            "IP": "59.232.19.9",
                            "fpcookie": "1dedb5f7-50.58.243.144-14",
                            "DIID530": "c570c1d9-8a0a-426c-b504-13c5"
                        },
                        "ih": {
```

```
"tpcookie": {
  "cd": "tpcookie",
  "it": "SESSIONCOOKIE",
  "sz": 1,
  "ls": {
    "bb8a2551-4eca-4006-8a55-a4": {
      "vl": "bb8a2551-4eca-4006-8a55-a4",
      "hc": 9,
      "fs": 1442252,
      "ls": 1442252
    }
  }
},
"email": {
  "cd": "email",
  "it": "FIRSTPARTYID",
  "sz": 1,
  "ls": {
    "user@example.com": {
      "vl": "user@example.com",
      "hc": 1,
      "fs": 1442252,
      "ls": 1442252
    }
  }
},
"IP": {
  "cd": "IP",
  "it": "IP4OCTET",
  "sz": 3,
  "ls": {
    "61.186.221.63": {
      "vl": "61.186.221.63",
      "hc": 1,
      "fs": 1442252,
      "ls": 1442252
    },
    "61.186.16.10": {
      "vl": "61.186.16.10",
      "hc": 2,
      "fs": 1442252,
      "ls": 1442252
    },
    "59.232.19.9": {
      "vl": "59.232.19.9",
      "hc": 8,
      "fs": 1442252,
      "ls": 1442252
    }
  }
},
"fpcookie": {
  "cd": "fpcookie",
  "it": "FIRSTPARTYID",
  "sz": 1,
  "ls": {
    "1dedb5f7-50.58.243.144-14": {
      "vl": "1dedb5f7-50.58.243.144-14",
      "hc": 2,
      "fs": 1442252,
      "ls": 1442252
    }
  }
},
"DIID530": {
  "cd": "DIID530",
  "it": "DIISOLATED",
  "sz": 1,
  "ls": {
    "c570c1d9-8a0a-426c-b504-13c5": {
      "vl": "c570c1d9-8a0a-426c-b504-13c5",
      "hc": 2,
      "fs": 1442252,
      "ls": 1442252
    }
  }
},
"pr": {
    "DNT": {
      "cv": "FALSE",
      "au": {
        "1442252": "FALSE"
      }
    }
  }
},
"lgid": "3a0d3383-bf28-456f-a147-df8807037d31"
        }
      ]
    }
  }
}
```

Example Non-Verbose Group Response Sample

```
{
  "groupDetails": {
    "email": {
      "user@example.com": [
        {
          "dp": {
            "id": "2f19994e-5876-4419-8ef2-41750b7c019c",
            "pr": {
              "DNT": {
                "cv": "FALSE",
                "au": {
                  "1442252": "FALSE"
                }
              }
            }
          },
          "lgid": "3a0d3383-bf28-456f-a147-df8807037d31"
        },
        {
          "dp": {
            "id": "3fccc0a1-a296-437b-a5db-c8fc7312d144",
            "pr": {
              "DNT": {
                "cv": "FALSE",
                "au": {
                  "1442252": "FALSE"
                }
              }
            }
          },
          "lgid": "3a0d3383-bf28-456f-a147-df8807037d31"
        }
      ]
    }
  }
}
```

Example Identity Translation Processes

In one embodiment, a requesting entity may provide one or more identifiers to the ID Resolution System (e.g., a device identifier, such as a DPID, device type identifier, etc.), and/or the identifiers may be extracted from the device by the ID Resolution System, with a request for specific resolution data items, wherein "resolution data" and "resolution data items" each generally refer to any information associated with received device identifier(s) that may be returned by the ID Resolution System, either in a raw, combined, or derivative format, such as any information included in a device profile and/or related group profiles. In other embodiments, the requesting entity may request all available resolution data (e.g., that the ID Resolution System can determine based on the provided identifiers). The ID Resolution System may then use the provided identifier(s) to determine and/or generate resolution data. For example, a requesting entity (e.g., a client of the ID Resolution System) may send into the service a browser cookie identifier {abc} and ask the service to return all other cookie values associated with the DPID or with a GPID the DPID is a member of. Another requesting entity (or the same requesting entity) may send the browser cookie identifier {abc} and ask the service to return all native device identifier values (e.g. IDFA) associated with the DPID or with a GPID the DPID is a member of.

Listed below are example resolution data items that may be returned in response to a request from a requesting entity. This resolution data may be returned in response to first determining a particular DPID based on one or more received identifiers. In other applications, the requesting entity provides a DPID in the initial request for resolution information, and that DPID is used to determine and provide one or more of the following resolution data items to the requesting entity.

- all identifiers last seen for the device, also referred to as a "last IDs array". For example, all of the identifiers that were received and/or identified in association with a DPID in the most recent online event in the device profile. As noted elsewhere, each online event may be stored, along with all of the associated identifiers (e.g., IDFA, cookie value, etc.) in the DPID profile. In one embodiment, the particular identifiers used to match the device to the DPID are flagged in the DPID profile and may be indicated in this requested data set.
- the last identifier seen for the device for a specified identifier type. For example, a translation request may seek the last seen identifier of the cookie type (or any other type of identifier) in the DPID profile.
- all identifiers seen for the device. For example, this request may return most or all of the DPID profile, which includes a historical list of identifiers associated with each online event.
- all identifiers seen for the device for a specified identifier type. For example, this request may return all identifiers associated with a DPID of a particular type, such as IDFA, IDFV, Android_ID, DeviceUniqueID, ASHWID, ANID2, etc.
- the last GPID (e.g., either household, multiscreen, or any other group type) associated with the device
- the last GPID associated with the device for a specified group type that is specified in the translation request, such as household, multiscreen, or any other available group type.
- all GPID(s) associated with the device (or other identifier provided)
- all GPID(s) associated with the device for a specified group type
- the last GPID associated with the device AND for each GPID the other DPIDs associated with the respective group
- the last GPID associated with the device for a specified group type, AND the other DPIDS associated with that group
- all GPID(s) associated with the device AND for each group the other DPID(s) associated with the respective group
- all GPID(s) associated with the device for a specified group type, AND for each group the other DPID(s) associated with the respective group.

Similarly, the ID Resolution System may provide resolution data in response to receiving a GPID from a requesting entity, or in response to determining a GPID based on other identifiers provided by a requesting entity. Such resolution data items may include:

- all DPIDs included in that GPID
- all DPIDs included in that GPID AND for each DPID the last identifiers seen for each respective device
- all DPIDs included in that GPID AND for each DPID the last identifiers seen for each respective device for a specified id type
- all identifiers included in that GPID for a specified identifier type
- all DPIDs included in that GPID and for each DPID and any other GPID(s) associated with the device Thus, various identifiers may be used to resolve and determine various resolution data, such as identifiers of particular devices, groups of devices, and any other profile information (e.g., profile data items associated with the DPID and/or GPIDs). The requesting entity may then use the resolution data to replace, supplement, or complement any other device, group, or user information the service provider may already have.

Provided below are three sample translation requests that might be received by the ID Resolution System, along with sample responses that may be returned. As noted elsewhere, these translations are only exemplary since there are a vast quantity of identifiers that may be received and resolved data items that may be returned in various embodiments.

| Sample Request transmitted from Requesting Entity | Sample Resolution Data returned to Requesting Entity |
|---|---|
| GET: http://LocalHost/ idtranslation/devices/ 3a0d3383-bf28-456f-a147- df8807037d31/client/ client1?filter= ALL&code=tpcookie | { "devices": { "2f19994e-5876-4419-8ef2-41750b7c019c": { "ld": { "tpcookie": "d7eb3654-a82e-4620-ba48-cb8d" }, "ih": { "tpcookie": { "cd": "tpcookie", "it": "SESSIONCOOKIE", "sz": 1, "ls": { "d7eb3654-a82e-4620-ba48-cb8d": { "vl": "d7eb3654-a82e-4620-ba48-cb8d", "hc": 2, "fs": 1442252, "ls": 1442252 } } } } |

| Sample Request transmitted from Requesting Entity | Sample Resolution Data returned to Requesting Entity |
|---|---|
| | ``` }     },     "3fccc0a1-a296-437b-a5db-c8fc7312d144": {       "Id": {         "tpcookie": "bb8a2551-4eca-4006-8a55-a4"       },       "ih" : {         "tpcookie": {           "cd": "tpcookie",           "it": "SESSIONCOOKIE",           "sz": 1,           "ls": {             "bb8a2551-4eca-4006-8a55-a4": {               "vl": "bb8a2551-4eca-4006-8a55-a4",               "hc": 9,               "fs": 1442252,               "ls": 1442252             }           }         }       }     }   } } ``` |
| GET: http:// LocalHost/ idtranslation/groupdetails/ 3fccc0a1-a296-437b-a5db-c8fc7312d144/client/ client1?grouptype=MS&includeotherdevices=true | ``` {   "gids": {     "MS": {       "lgid" : "3a0d3383-bf28-456f-a147-df8807037d31",       "devices": [         "2f19994e-5876-4419-8ef2-41750b7c019c"       ]     }   } } ``` |
| GET: http://LocalHost/ idtranslation/identifiers/ 3fccc0a1-a296-437b-a5db-c8fc7312d144/client/ client1?filter=Id | ``` {   "Id": {     "IP": "59.232.19.9",     "email": "user@example.com",     "fpcookie" : "1dedb5f7-50.58.243.144-14",     "DIID530": "c570c1d9-8a0a-426c-b504-13c5",     "tpcookie": "bb8a2551-4eca-4006-8a55-a4"   } } ``` |

Translation Between Service Providers

The ID Resolution System may further include an identifier translator to provide the ability for participating service providers to create segments within their own data systems and environments and seamlessly translate DPIDs into common or shared IDs which other third party partner entities may use. The identifier translator may also improve synchronization across multiple requesting entities by helping to ensure that each requesting entity stores a set of device attributes necessary to effectively bridge or link identifiers across platforms. In addition, service providers and partners may share common IDs, which can be device identifiers or traditional shared cookie IDs, which can be translated into DPIDs via the ID Resolution System. Further, in some embodiments where the ID Resolution System maintains a history of device identifiers mapped to a unique DPID, profiles between partners which have different sets of device identifiers may be matched to further enable linking among requesting entities. Thus, in some embodiments, the ID Resolution System may be configured to provide certain profile data to requesting entities that is obtained from profile data for the same device in other requesting entities profile data stores. For example, a sharing agreement may be developed by multiple requesting entities wherein each requesting entity maintains its own profile data store, but under certain conditions that profile data store may be accessed and information provided to other of the requesting entities.

Example Device Identifier Mapping Architecture

Figure 3:
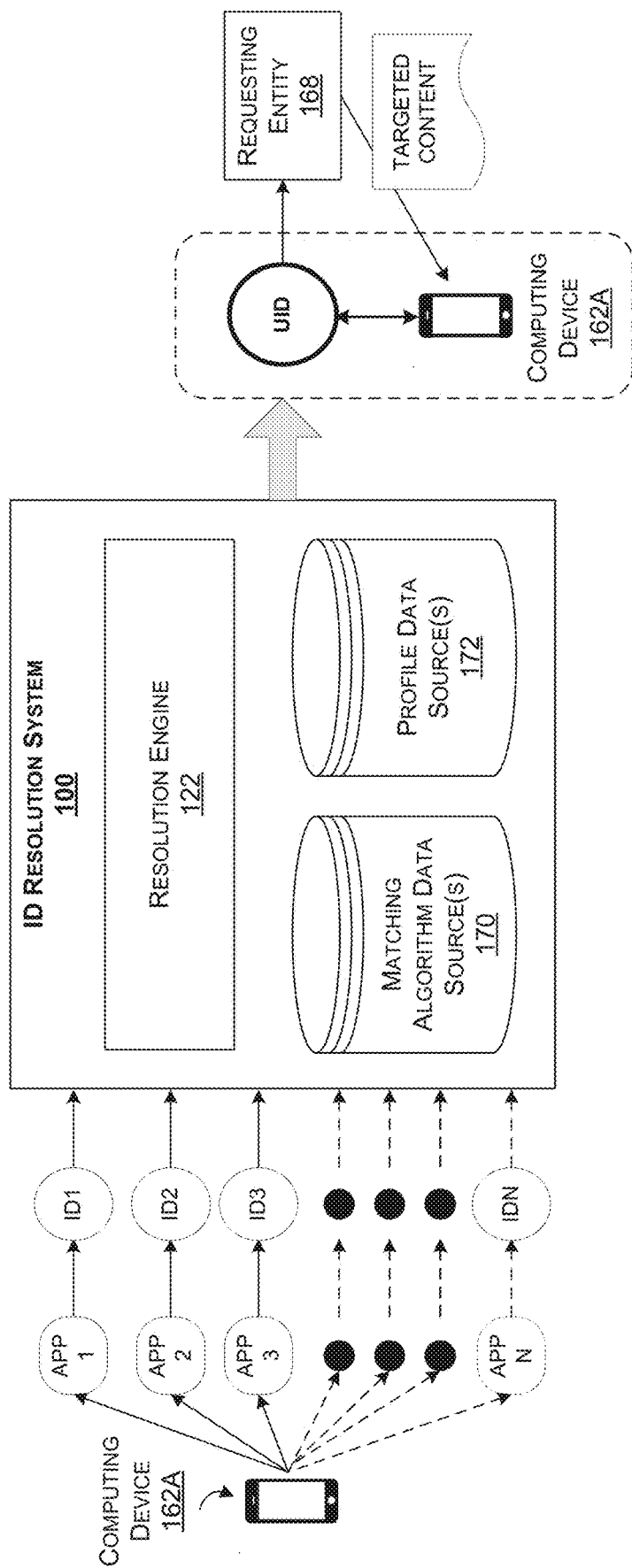
FIG. 3 is a block diagram which illustrates an exemplary device identifier data flow between a consumer device, an ID Resolution System, and a service provider, according to one embodiment.

FIG. 3 is a block diagram which illustrates an exemplary data flow between a computing device 162A, an ID Resolution System 100, and a requesting entity 168A, according to one embodiment. As shown, a user device 162A may be configured with multiple apps (App1 . . . AppN; or browser or other devices software that provides identifiers), each of which may potentially utilize a different respective identifier (ID1 . . . IDN) and/or set of identifiers. These different respective identifiers may be provided to the ID Resolution System 100, which is described in more detail with reference to FIG. 13.

The ID Resolution System 100 may implement a resolution engine 122 that may perform the various process discussed herein, including device matching, group matching, identifier translation, etc. In the example of FIG. 3, the resolution engine 122 implements a device matching process that receiving incoming device identifiers and applies a matching algorithm in order to map the device identifiers to a particular device profile (and corresponding DPID) associated with the computing device 162A. The DPID, device profile, group profile, and/or other resolution information, may then be provided to the requesting entity 168, which can then use the device profile to provide targeted or other content that is tailored to the computing device 162A, and/or to perform other operations based on the identified device. In one embodiment, the various identifiers of computing device 162A are provided to the ID Resolution System via the requesting entity 168, while in other embodiments the identifiers are transmitted directly to the ID resolution system 100 from the computing device 162A, such as via a script that is part of the requesting entity's App or website that transmits the device identifiers to the ID resolution system 100.

In the example of FIG. 3, the ID Resolution System 100 includes or has access to matching algorithm data source(s) 170, which stores matching algorithms (e.g., including multiple rules having one or more components discussed above) and profile data source(s) 172 which may store DPID profiles and/or GPID profiles associated with various computing devices. For example, each requesting entity may have its own matching algorithm and profile data store (which may include device and group profiles).

As discussed above, matching algorithms may be customized for or by the requesting entity 168 depending on the requesting entity 168's preferences. Device profiles may be generated, stored, and updated over time as new device identifiers and identifier types are provided to the ID Resolution System 100. Thus, a DPID for computing device 162A may over time be mapped to or associated with any type of device identifier (such as a later developed device identifier that did not exist when the DPID was assigned to computing device 162A) that the computing device 162A may use or be associated with. The requesting entity 168 may use the DPID instead of, or in conjunction with, pre-existing device identifiers ID1 . . . IDN, without the need to manage these different device identifiers and related identification techniques. Thus the ID Resolution System 100 provides a high degree of flexibility and customization for the requesting entity 168.

As introduced above, the ID Resolution System may apply a matching algorithm to determine whether device identifiers can be resolved to an existing device profile and, if not, create a new device profile. For example, an existing device (or "returning device") refers to one that the system determines it has already seen before and for which it already created a device profile with a DPID. A new device is one that the system has not seen before (e.g., the system does not identify a match to a particular DPID with the requisite confidence level) and for which it may create a new profile and corresponding unique DPID in the profile data source 172. As discussed above, the matching algorithm used with reference to a particular requesting entity may be customized to a high degree of complexity based on, among other things, a combination of probabilistic and/or deterministic matching rules, such as a quantity of identifiers to be evaluated by a matching rule, algorithms and comparison functions used to compare identifiers, and weightings to determine when identifiers match or do not match. In various embodiments, matching rules can be audited to determine why a particular device matched at any point in time.

Figure 4:
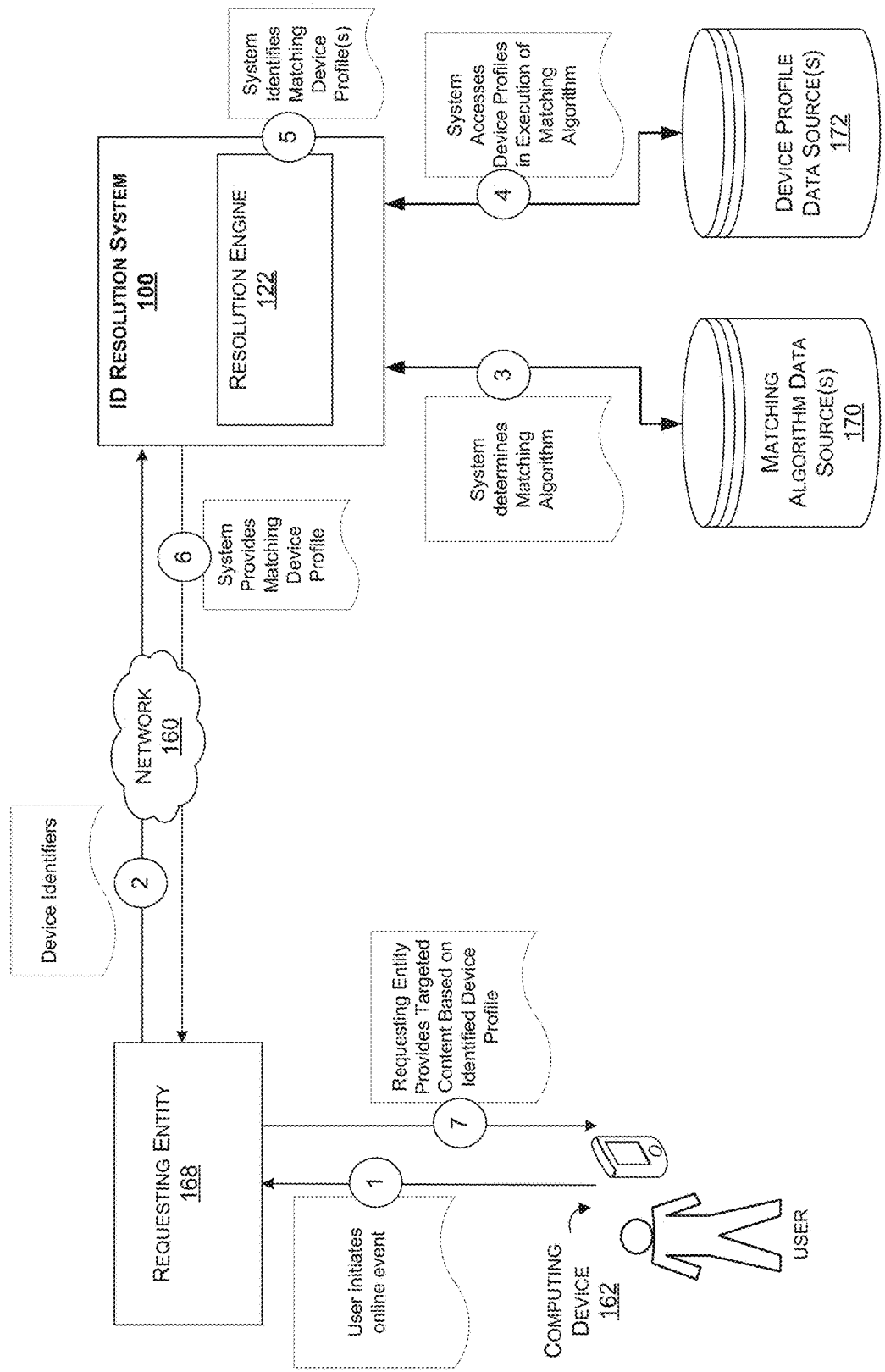
FIG. 4 is a block diagram which illustrates an exemplary data flow between a consumer device, a ID Resolution System, and a service provider, according to one embodiment.

FIG. 4 is a flow diagram which illustrates an exemplary data flow between a user device 162, a requesting entity 168, and the ID Resolution System 100, according to one embodiment. Depending on the embodiment, the method of FIG. 4 may include fewer or additional blocks and the blocks may be performed in an order that is different than illustrated.

At action (1) of FIG. 4, a user interacts with a requesting entity 168 via a computing device 162. For example, the user might access a website or use an application provided by the requesting entity 168. During the interaction the requesting entity 168 may collect or receive one or more device identifiers from or associated with the computing device 162. The device identifiers might include, for example, a cookie, an IP address, a native device identifier associated with the device, a device type identifier, an identifier associated with an application installed on the computing device 162 used by the user to interact with requesting entity 168, a timestamp, and/or any other identifiers. In one embodiment, one or more of the device identifiers are obtained by software code provided by the ID Resolution System 100, such as code that queries the computing device for device identifiers.

At action (2), the requesting entity 168 provides the device identifiers to the ID Resolution System 100. The device identifiers may be provided as part of a request for a DPID unique to the requesting device, a GPID, and/or any other resolution information that may be associated with the device. In some embodiments, the device identifiers may be provided as part of a request for additional consumer or market segment data that may be associated with the computing device 162, which the requesting entity 168 may use to generate custom or targeted content for the user. In some embodiments, the identifiers are not received by the requesting entity 168, but instead are transmitted from the computing device 162 to the ID resolution system 100.

At actions (3)-(5), the ID Resolution System 100 performs a device matching process. In one embodiment, the ID Resolution System 100 receives the device identifiers and applies a matching algorithm associated with the requesting entity (and/or a default matching algorithm, in some instances). The matching algorithm may be stored and accessed from the matching algorithm data source(s) 170 and may include prioritized deterministic and/or probabilistic matching rules that were previously configured by the requesting entity 168 (e.g., via the user interfaces described further herein).

At action (4), the resolution engine 122 applies the matching algorithm by accessing device profiles of the requesting entity. Example processes of applying the matching algorithm and determining whether any device profiles match is described in more detail with reference to FIGS. 5 and 6 herein.

At action (5), the resolution engine 122 identifies any matching device profiles found after applying at least one of the matching rules of the matching algorithm (e.g., the first matching rule that was satisfied). In some embodiments, actions (4) and (5) described above may be repeated or performed in parallel depending on the particular configuration for the matching algorithm being applied until a matching device profile is found or all matching rules are executed.

If no matches were identified after application of all applicable matching rules, the ID Resolution System may generate a new device profile associated with a new unique DPID. The ID Resolution System 100 can then store the device profile in the device profile data source(s) 172 for later access and subsequent device profile match requests.

If a matching device profile is found, or if a new device profile is created, at action (6) the ID Resolution System 100 provides the matching device profile (and/or other requested information) to the requesting entity 168. In some embodiments, the ID Resolution System 100 may access and provide additional data which may be associated with a device profile, such as consumer or other market segment data accessed from a consumer data store 174 (illustrated and described with reference to FIG. 13 herein). For example, a DPID or identifier included in the device's profile may be associated with a particular individual or market segment (e.g., an IP address, a country code, or other identifier which may be associated with or used to access market segment data for that IP address, country code, or other identifier). Thus, in addition to providing a DPID or device profile to the requesting entity, the ID Resolution System 100 may access and provide additional consumer or segment data.

In another embodiment, the unique DPID and/or associated device profile may be utilized to identify, determine, and/or cross-reference many other types of user data, such as resolution information discussed above and/or other information associated with the DPID and or one or more of various identifiers in the DPID profile from multiple disparate data sources that otherwise may not be linked or associated. Thus, for example, a requesting entity may use a DPID and/or associated device profile information to cross reference to an internal data source of devices and/or consumer activity, and determine that a particular device has been used to access both a mobile application and a website (either in the same session or in different sessions). In some embodiments this information may also be determined by the ID Resolution System 100 and provided as part of the device profile. In either scenario the requesting entity gains the knowledge that a same particular device is used to interact with the requesting entity in multiple, often disjoint ways, which can help reduce the device identity fragmentation and improve the customer relationship, as discussed above.

At action (7), the requesting entity can use the received device profile and/or additional consumer or market segment to authenticate a user login, approve a transaction, gather statistical data for analytics, generate a fraud risk score, and/or generate and/or provide targeted content, such as targeted advertising, marketing, special offers, and the like, to the computing device 162.

Examples Device Matching Processes

Figure 5A:
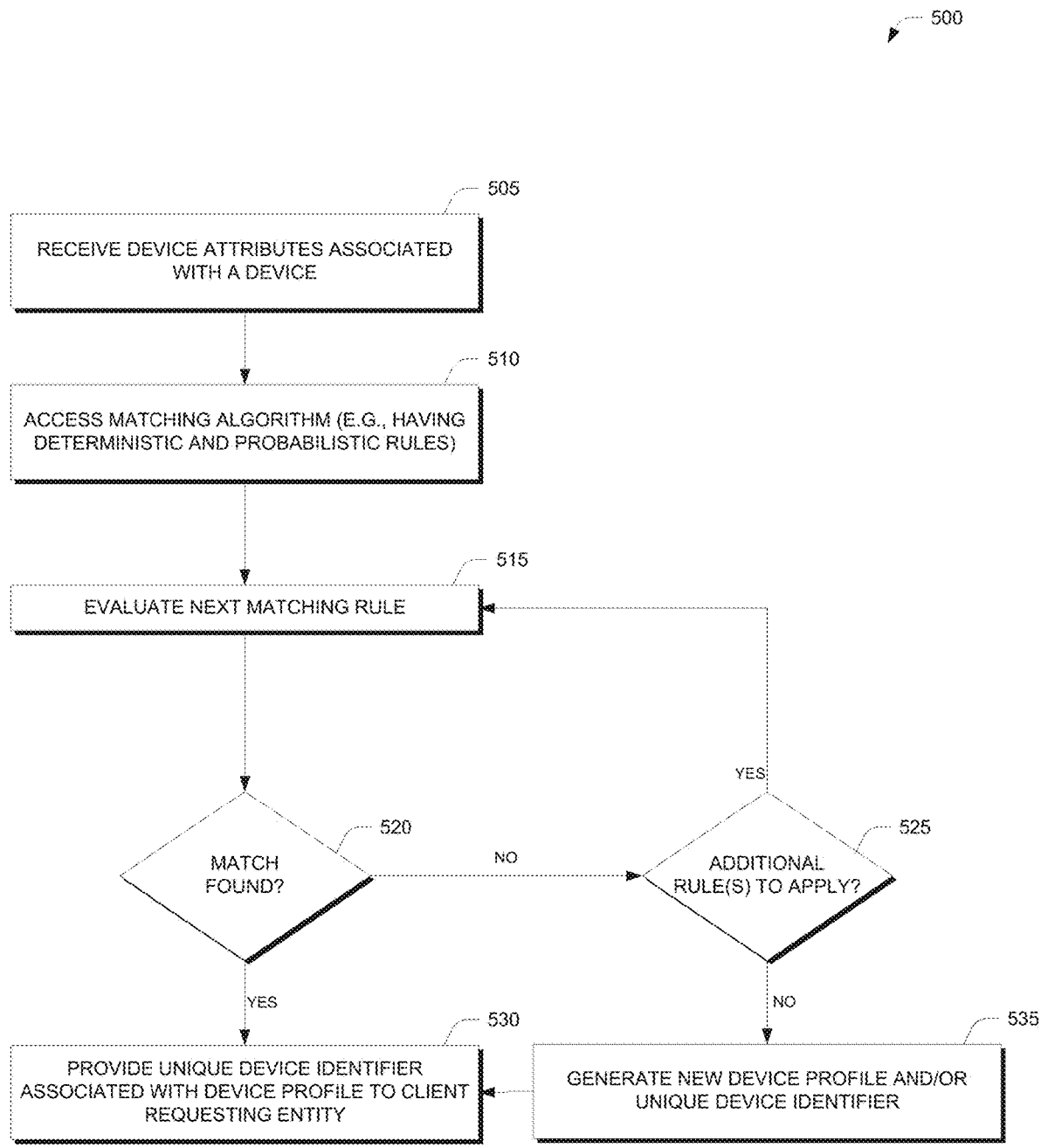
FIG. 5A is a flowchart for one embodiment of an example process for applying a device matching algorithm.
Figure 6:
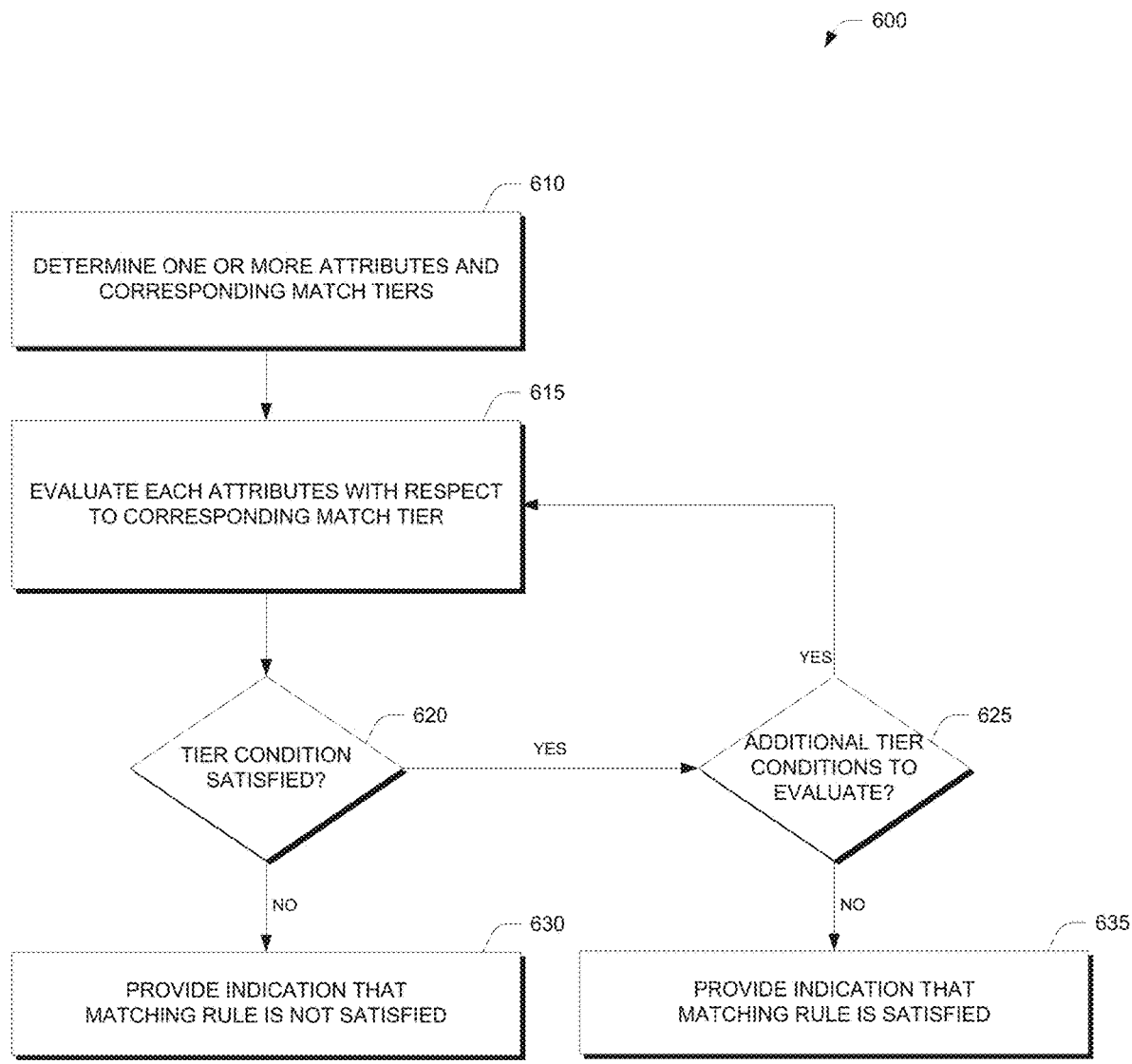
FIG. 6 is a flowchart for one embodiment of an example process for applying one or more attribute comparison functions of a matching rule.

FIGS. 5 and 6 are flowcharts illustrating various embodiments of ID Resolution System processes. In some implementations, the processes are performed by embodiments of the ID Resolution System 100, such as the resolution engine 122. For ease of explanation, the following describes the services as performed by the ID Resolution System 100. The example scenarios are intended to illustrate, but not to limit, various aspects of the ID Resolution System 100. In one embodiment, the processes can be dynamic, with some procedures omitted and others added.

Determining a DPID

Figure 13:
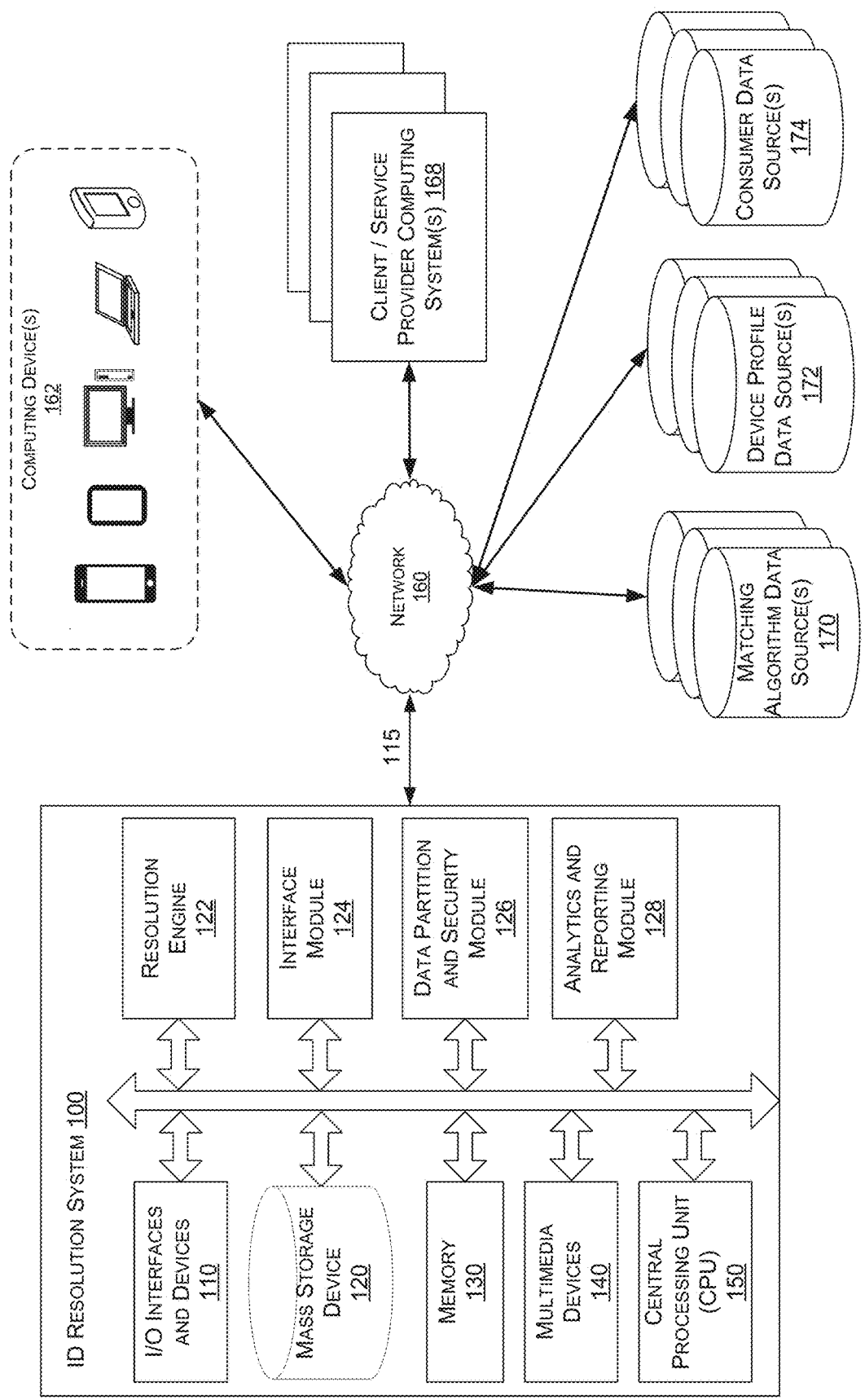
FIG. 13 is a block diagram of an implementation of an illustrative ID Resolution System.

FIG. 5A is a flowchart illustrating one embodiment of a process 500 for determining a DPID, as used in one embodiment of the ID Resolution System 100 of FIG. 13. The process 500 may be performed by the ID Resolution System 100 separately or in conjunction with, for example, the process 600 of FIG. 6. For ease of explanation certain portions of the description below describe the process with respect to one or more device identifiers associated with a particular device. However the process may also be applied similarly to a plurality of devices separately and/or in parallel, such as in batch processing of multiple thousands or millions of devices and/or device identifiers.

The process 500 begins at block 505, where the ID Resolution System 100 (for example, via the matching algorithm analysis module 122 of FIG. 13) receives one or more device identifiers associated with a device. The device identifiers may be received, for example, from a client requesting entity such as a requesting entity 168. The device identifiers may be received, for example, as part of a request for a DPID for the device, a device profile for the device, a GPID, a GPID profile, and/or any other resolution information. The device identifiers may include one or more identifiers usable to identify the device with varying degrees of uniqueness—some identifiers may be deterministic (e.g., an identifier that is unique for a particular device), while some identifiers may be probabilistic (e.g., an identifier may not be unique for a particular device, but may in some cases be used to identify the particular device with a degree of probability, especially in association with other data that similarly non-uniquely identifies devices). As discussed herein, the device identifiers may include one or more of a cookie, a device-specific identifier, an operating system generated identifier, an identifier generated and/or used in association with a particular application installed on the device (e.g., an "app ID"), an identifier generated and/or used in association with a particular web service accessed using the device (e.g., a "login ID"), an IP address (or portion thereof) used by the device to communicate with one or more networks, a MAC address, and/or any other identifier which may be associated with the device. In various embodiments, one or more of the device identifiers may be encrypted to ensure privacy and compliance with applicable privacy rules and regulations.

In some embodiments, expansion of one or more device identifiers is performed as part of the matching process. Example expansion processes are described further with reference to FIG. 9. In general, the ID Resolution system may use the received identifier(s) to determine one or more additional types of identifiers, such as a geographic identifier that is determined based on an IP address of the device. Expansion may be performed by the ID resolution system and/or one or more third party entities, such as GeoIP databases and device description repositories. For example, expansion may be used to derive additional information from the provided input identifiers by connecting to third party data sources, such as GeoIP databases and device description repositories. The derived and/or obtained information may then be considered device identifiers that can be used in the device matching process and/or stored with a matching device profile to further enrich the device profile. In another example, an expanded device identifier may be determined by providing a user agent string to a user agent (UA) detector in order to determine a device type, or domain info may be used to determining a name of an organization, ISP, and/or other related information. As noted above, expansion identifiers can be used to enrich the corresponding device profile and can be used in the DPID and/or GPIP matching process, such as to determine household group membership (GPID profile) based on common domain information.

At block 510, the ID Resolution System 100 accesses a matching algorithm, which may comprise a rule set including multiple prioritized matching rules to be applied to the received device identifiers. The device profile matching rules may be accessed, for example, from the matching algorithm data source 170. As noted above, in one embodiment the device matching algorithm may be customized for, or by, the client requesting entity. For example, the user interfaces illustrated and described herein with respect to FIGS. 7-12 enable the client requesting entity to configure, define, and/or specify one or more device identifiers, match tiers, rule sets, matching rules, and/or other criteria delineating how particular device identifiers may be analyzed, evaluated, and/or mapped to a DPIDs, GPIDs and/or related profiles. The ID Resolution System 100 may store the client or custom matching rules in the matching algorithm data source(s) 170 for later access and retrieval during subsequent mapping processes, such as the processes 500 and 600.

In some embodiments, a matching algorithm may include one or more default matching rules, such as may be provided by the ID Resolution System 100. For example, default matching rules may be predetermined or generated over time by the ID Resolution System 100 based on observed device identifier patterns, common or recurring matching scenarios, best practices, or other criteria. In some embodiments, default matching rules may be provided (e.g., displayed via the user interfaces described herein) for the client requesting entity to select and/or customize.

FIG. 5B is a table illustrating an example matching algorithm in the form of a prioritized ruleset that includes rules 541-549. In this example, rules 541 and 542 are deterministic rules, while rules 543-549 are probabilistic rules. As discussed above, the probabilistic rules may be generated and/or modified using a testing process against a baseline matching algorithm to identify rules that provide the necessary match accuracy. Similarly, the order of the rules may be based on the determined match accuracy of the rules, such that higher priority probabilistic rules have a higher match confidence level than the lower priority probabilistic rules. In one embodiment, the rules are evaluated in a "fire and stop" manner, such that once a single rule fires (e.g., the attribute criteria are matched), the identified device profile is returned as the matching device. In other embodiments, the rules are executed in a "fire and continue" manner so that all rules are evaluated and, if multiple rules fire, an appropriate DPID to return is determined. For example, if multiple rules fire, but each identified the same DPID, that single DPID is returned. However, if multiple rules fire and identify multiple DPIDs, the multiple DPIDs may be returned to the requesting entity, such as along with confidence levels associated with the match rules used to identify respective DPIDs. In some embodiments, if multiple rules identify a first DPID, while another rule identifies another DPID, a confidence level associated with the first DPID may be increased based on a combined confidence level of each rule that identified that first DPID.

In some embodiments, deterministic identifiers may be considered after probabilistic identifiers, or not at all. For example, in a fraud use case, the system may first analyze probabilistic identifiers, since a fraudster could spoof the deterministic identifiers of a device. Thus, matching on the deterministic identifiers would incorrectly indicate that the fraudster's device is the user's device. By looking at probabilistic identifiers in this use case, the system may not associate the receive identifiers with the user's device and may even associated the received identifiers with a DPID that is associated with other fraudulent activities.

The example matching algorithm of FIG. 5B includes various of the components discussed above in the definition section. In other embodiments, fewer or additional rule components may be included as part of a matching algorithm. For example, a matching algorithm may not include a precondition, window key, and/or velocity filter for a ruleset.

Next, at block 515, the ID Resolution System 100 applies each respective matching rule to the received device identifiers. In embodiments where matching rules are applied in a priority order (discussed further below), the ID Resolution System 100 may only apply matching rules in order until a match is found (e.g., subsequent matching rules in the priority order need not be applied or evaluated). For example, device profiles that match the received device identifiers according to the matching rule may be accessed from the device profile data source(s) 172.

Matching rules may be applied in a particular order of priority, for example as specified by the client requesting entity or as specified by a default matching order. For example, matching rules may be applied in an order to first check for matches on deterministic identifiers, and then sequentially check for matches on probabilistic identifiers in gradually decreasing degrees of probability that a matching device profile may be identified. In another embodiment, the matching rules may be applied in any order (equal priority) or in parallel. In another embodiment, the ordering of the matching rules may be based on a likelihood that the particular ordering will help improve or optimize performance, such as based on machine learning that is applied to deterministic matches in order to identify probabilistic identifiers that are most likely to result in matches in future matching processes.

In the example of FIG. 5B, certain of the rule components are configured to quickly determine whether respective rules needs to be further evaluated with reference to the corresponding rule attribute (which is an identifier itself as the term is used herein) against a corresponding match tier. In particular, certain rules of the ruleset include a precondition and/or a precondition value. For example, a precondition may specify that the corresponding rule is only applied on event data including an identifier matching the precondition and any precondition value. Thus, for a device type precondition, all event data including identifiers not matching the device type precondition are not evaluated further by that rule. For example, rule 543 includes a precondition of "game console", which causes any event data associated with a different device type to no longer be evaluated by rule 543, skipping to rule 544. Similarly, rule 547 includes a precondition and value indicating that any event data not including an identifier(s) indicating that the device is a "tablet type" device, and also that the table type device is an "ipad", will not be further evaluated by rule 547. Accordingly, such preconditions may greatly reduce the quantity of rules that are fully evaluated on particular device matching processes.

Additionally, some of the rules in the example of FIG. 5B include a window key, which includes a window key type and a window key value (or threshold). Use of windows keys may enable faster or more efficient look up of device profiles by reducing full evaluation of certain rules. In general, the window key indicates a maximum number of profiles that can include a particular identifier in order for the rule to continue evaluation. For example, with reference to rule 541, the window key indicates that a maximum of 3 profiles can match the SessionCookie_MD5 identifier in the received event data for the rule to continue evaluation. If more than 3 profiles include the SessionCookie_MD5 identifier in the received event data, the process moves onto the next rule 542. With reference to rules 542, the window key indicates that only event data including a login_ID matching 100 or less profiles will result in further evaluation of rule 542.

The velocity filter used in certain rules of the matching algorithm in FIG. 5B may be used to further optimize execution of the matching algorithm by foregoing full evaluation of certain rules not matching the velocity requirement. For example, rule 543 includes a velocity timeframe of a "day", which could be a calendar day or a 24 hour period in different embodiments, and a value of 1000. Thus, this velocity filter will halt evaluation of rule 543 if the identifier (15302 EM_Hours) has been used to match profiles more than 1000 times that day.

For those event data not excluded by a precondition, key requirement, or velocity requirement, one or more attribute qualifications of the rules are then applied. In general, each identifier attribute is associated with a corresponding match tier. If each attributes of a particular rule match the corresponding match tier for the attribute, the rule is matched (or "fired"). The description below with reference to FIG. 6 includes further details regarding these comparison functions.

At block 520, the ID Resolution System 100 determines whether a matching device profile was found at block 515. In response to determining that no matching device profile was found, the process 500 may proceed to block 525. In response to determining that a matching device profile was found, the process 500 may proceed to block 530. In determining whether a matching device profile was found, a score indicating a degree, probability, likelihood, or other indication of a confidence level of the match may be generated and evaluated. For example, the match confidence level for a probabilistic rule that fired on a particular event data may be provided to the requesting entity to indicate the related degree of confidence that the returned device profile is associated with the device that initiated the online event. In other embodiments, the score may be a binary value (for example, yes or no, true or false), a letter score, a range or range of values, a percentage, and so on. The score may also be determined based in part on weightings associated with a degree of match for one or more device identifiers (e.g., in a fire and continue matching algorithm).

In a matching profile is not identified by the matching rule, the process 500 proceeds to block 525 to determine whether additional matching rules are available, such as a next lower priority matching rule. In response to determining that are no additional matching rules to apply, the process 500 may proceed to block 535. In response to determining there is at least one additional matching rule to apply, the process 500 may return to block 515 to apply the next matching rule. Thus, the process 500 may repeat blocks 515 through 525 an indeterminate number of times until a matching device profile is identified, or until all rules are evaluated in a fire and continue matching algorithm.

At block 530, in response identifying a matching device profile, the ID Resolution System 100 provides the DPID associated with the matching device profile (and/or other information associated with the device), to the client requesting entity. For example, some or all of the matching device profile may be provided along with or in association with the DPID. The client requesting entity may then use the DPID and/or device profile for various purposes, such as those discuss herein (e.g., user/device authentication, determining targeted content to provide to the device, etc.).

In some embodiments, additional data may be associated with a device profile, such as consumer or other market segment data accessed from the consumer data store 174. For example, a DPID may be associated with a particular individual or market segment (e.g., the DPID may be associated with an IP address, a country code, or other identifier which may be associated with or used to access market segment data for that IP address, country code, or other identifier). Thus, in addition to providing a DPID and/or device profile to the client requesting entity, the ID Resolution System 100 may access and provide additional consumer or segment data which the client requesting entity can use to further refine its authentication, security, targeted advertising, marketing, audience building, and/or other uses of the requested device information.

At block 535, in response to the matching algorithm not identifying any matching profiles, ID Resolution System 100 generates a new device profile and DPID to be associated with the received event data (e.g., multiple device identifiers). The new device profile and DPID mapping may then be stored, for example, in the device profile data source(s) 172 for later access, retrieval, and subsequent device profile matching in response to further requests from the requesting entities 168. The process 500 may then proceed to block 530 where the ID Resolution System 100 provides the DPID associated with the new device profile to the client requesting entity, as described above.

Example Device Identifiers

Without limiting the scope of the possible format and content of a device profile, below are provided two examples of device profiles that may be stored by the ID Resolution System 100 and/or one or more requesting entities that interact with the associated device and/or user.

Example DPID Profile 1:

```
{
"id": "3fccc0a1-a296-437b-a5db-c8fc7312d144",
"hc": 12,
"sfs": 1442944098800,
"sls": 1442962854363,
"fs": 1442252,
"ls": 1442252,
"ld": {
   "IP": "59.232.19.9",
   "email": "user@example.com",
   "fpcookie": "1dedb5f7-50.58.243.144-14",
   "DIID530": "c570c1d9-8a0a-426c-b504-13c5",
   "tpcookie": "bb8a2551-4eca-4006-8a55-a4"
},
"ih": {
  "IP": {
    "cd": "IP",
    "it": "IP4OCTET",
    "sz": 3,
    "ls": {
      "61.186.221.63": {
        "vl": "61.186.221.63",
        "hc": 1,
        "fs": 1442252,
        "ls": 1442252,
        "tdl": 0,
        "tl": 0
      },
      "61.186.16.10": {
        "vl": "61.186.16.10",
        "hc": 2,
        "fs": 1442252,
        "ls": 1442252,
        "tdl": 0,
        "tl": 0
      },
      "59.232.19.9": {
        "vl": "59.232.19.9",
        "hc": 8,
        "fs": 1442252,
        "ls": 1442252,
        "tdl": 0,
        "tl": 0
      }
    }
  },
  "email": {
    "cd": "email",
    "it": "FIRSTPARTYID",
    "sz": 1,
    "ls": {
```

-continued

```
        "user@example.com": {
            "vl": "user@example.com",
            "hc": 1,
            "fs": 1442252,
            "ls": 1442252,
            "tdl": 0,
            "tl": 0
        }
    }
},
"fpcookie": {
    "cd": "fpcookie",
    "it": "FIRSTPARTYID",
    "sz": 1,
    "ls": {
        "1dedb5f7-50.58.243.144-14": {
            "vl": "1dedb5f7-50.58.243.144-14",
            "hc": 2,
            "fs": 1442252,
            "ls": 1442252,
            "tdl": 0,
            "tl": 0
        }
    }
},
"DIID530": {
    "cd": "DIID530",
    "it": "DIISOLATED",
    "sz": 1,
    "ls": {
        "c570c1d9-8a0a-426c-b504-13c5": {
            "vl": "c570c1d9-8a0a-426c-b504-13c5",
            "hc": 2,
            "fs": 1442252,
            "ls": 1442252,
            "tdl": 0,
            "tl": 0
        }
    }
},
"tpcookie": {
    "cd": "tpcookie",
    "it": "SESSIONCOOKIE",
    "sz": 1,
    "ls": {
        "bb8a2551-4eca-4006-8a55-a4": {
            "vl": "bb8a2551-4eca-4006-8a55-a4",
            "hc": 10,
            "fs": 1442252,
            "ls": 1442252,
            "tdl": 0,
            "tl": 0
        }
    }
}
},
"pr": {
    "DNT": {
        "cv": "FALSE",
        "au": {
            "1442252": "FALSE"
        }
    }
},
"gids": {
    "MS": {
        "lgid": "3a0d3383-bf28-456f-a147-df8807037d31"
    },
    "HH": {
        "lgid": "293109a3-bfc5-4b70-a8c7-43c53d5b7495",
        "gidhl": [
            "5919b5ef-84c4-49a8-81c2-87f725267e1e",
            "83d4125d-0eaf-422a-826a-4cf319f72826"
        ]
    }
}
}
```

Example DPID Profile 2

```
{
    "id": "2f19994e-5876-4419-8ef2-41750b7c019c",
    "hc": 3,
    "sfs": 1442956860533,
    "sls": 1442962795508,
    "fs": 1442252,
    "ls": 1442252,
    "ld": {
        "tpcookie": "d7eb3654-a82e-4620-ba48-cb8d",
        "IP": "59.232.19.5",
        "email": "user@example.com"
    },
    "ih": {
        "tpcookie": {
            "cd": "tpcookie",
            "it": "SESSIONCOOKIE",
            "sz": 1,
            "ls": {
                "d7eb3654-a82e-4620-ba48-cb8d": {
                    "vl": "d7eb3654-a82e-4620-ba48-cb8d",
                    "hc": 3,
                    "fs": 1442252,
                    "ls": 1442252,
                    "tdl": 0,
                    "tl": 0
                }
            }
        },
        "IP": {
            "cd": "IP",
            "it": "IP4OCTET",
            "sz": 1,
            "ls": {
                "59.232.19.5": {
                    "vl": "59.232.19.5",
                    "hc": 3,
                    "fs": 1442252,
                    "ls": 1442252,
                    "tdl": 0,
                    "tl": 0
                }
            }
        },
        "email": {
            "cd": "email",
            "it": "FIRSTPARTYID",
            "sz": 1,
            "ls": {
                "user@example.com": {
                    "vl": "user@example.com",
                    "hc": 3,
                    "fs": 1442252,
                    "ls": 1442252,
                    "tdl": 0,
                    "tl": 0
                }
            }
        }
    },
    "pr": {
        "DNT": {
            "cv": "FALSE",
            "au": {
                "1442252": "FALSE"
            }
        }
    },
    "gids": {
        "MS": {
            "lgid": "3a0d3383-bf28-456f-a147-df8807037d31"
        },
        "HH": {
            "lgid": "49ade540-1411-48aa-8806-da437df1c303"
        }
    }
}
```

Applying Matching Rules and Match Tiers

FIG. 6 is a flowchart illustrating one embodiment of an example process 600 for applying matching logic of a matching rule, such as might be performed for rules that are evaluated in block 515 of FIG. 5A that are not exclude from further evaluation based on precondition, key, velocity, or other requirement. Thus, the process of FIG. 6 may be performed for multiple rules of a matching algorithm.

Beginning at block 610, the ID Resolution System 100 evaluates one or more tier conditions, each including an identifier and an associated match tier, associated with the matching rule. Each tier condition may indicate a comparison function (e.g., "true", less than, greater than, within range, etc.) that must be met by the associated attribute for the condition to be matched. If a rule includes multiple tier conditions, all of the attributes must meet the corresponding match tiers for the rule to be matched.

At block 615, the ID Resolution System 100 applies or evaluates a tier condition based on the received event data. In the example of FIG. 5B, the first tier condition indicates that the bcookieMd5 identifier must exist in the matching device profile, and the match tier indicates that the comparison function is Boolean and the result must be "true". Thus, if the bcookieMd5 identifier in the event data does not exist in a device profile, that device profile is not a match. With reference to rule 542, two tier conditions are included and must both be match for the rule to fire. In this example rule, both a login ID (e.g., provided by the user) must match a login ID in a particular profile and the user agent string must match a user agent string in the particular profile for the rule to be satisfied and identify that particular profile as a deterministic match. With reference to rule 542, the first tier condition provides matching to a user level (based on the login ID), while the second tier condition further focuses the matching to a device level (based on user agent string) so that the corresponding device profile can be identified as a deterministic match.

A non-limiting list of example identifier comparison functions which may be implemented are further described below. The identifier comparison function used may vary depending on the type of identifier being evaluated for a potential match. In one instance, integer-based device identifiers may be evaluated using, for example, an EXACTMATCH function or a DIFFERENCE function, among others. In another instance, a string-based device identifier may be evaluated using, for example, an EXACTMATCH function or an EXISTS function, among others. The identifier comparison function used for a particular identifier may be selected or customized by the requesting entity, for example via the identifier configuration user interface(s) illustrated and described with reference to FIG. 8 herein At block 620, the ID Resolution System 100 determines whether the respective match tier was satisfied at block 615. In response to determining that the respective tier condition was not satisfied, the process 600 may proceed to block 630. In response to determining that the respective tier condition was satisfied, the process 600 may proceed to block 625.

At block 625, the ID Resolution System 100 determines whether there are any additional tier conditions to evaluate with reference to the match rule. In response to determining that no additional match tiers remain to evaluate, the process 600 may proceed to block 635. In response to determining there is at least one additional tier condition to evaluate, the process 600 may return to block 615 to apply the next tier condition. Thus, the process 600 may repeat blocks 615 through 625 an indeterminate number of times until all tier conditions are matched with reference to a particular profile and the method continues to block 630, or until one of the tier conditions is not matched and the method continues to block 635.

At block 630, the ID Resolution System 100 provides an indication that the device profile matching rule is not satisfied.

At block 635, in response to determining that each tier condition was satisfied, the ID Resolution System 100 provides an indication that the matching rule is satisfied.

Example Identifier Comparison Functions

The following provides a non-exhaustive sample listing of some identifier comparison functions which may be associated with particular matching rules and/or match tiers and implemented by the ID Resolution System 100 in one or more embodiments. In some embodiments, more or less additional identifier comparison functions may be implemented.

Identifier Exact Match (EXACTMATCH): This function performs a case-sensitive comparison of an input identifier (e.g., one of the device identifiers received from a requesting entity) to an identifier in a profile (e.g., a DPID or GDID), such as in a last ID array (e.g., including the last identifier(s) associated with the profile), which may be stored as part of the device profile in one embodiment. If the input identifier is exactly equal to the identifier in the indicated profile, the function returns true.

Integer Difference (DIFFERENCE): This function returns the absolute value difference between the integer value of the input identifier and the value of that identifier in the Last IDs array (if found).

Exists (EXISTS): This function compares the input identifier to an Identifier in the ID History array, which may be stored as part of the device profile in one embodiment in a Device Profile and returns true if the value exists in the input array.

Exists Hours (EXISTS_HOURS): This function compares the input identifier to the ID history array in the device profile. If the identifier is found in the ID history array, the lastSeen date is accessed. The function then computes the delta between the lastSeen date and the input date/time and compares that result to the match tiers. If not found, then no comparison to the match tiers is done and the comparison fails. The result is compared to the max and min integer fields on Match Tiers.

Exists Hours—Device Profile (EXISTS_HOURS_DP): Similar functionality to EXISTS_HOURS except that the date/time returned is the last seen of the Device Profile instead of the lastSeen of the Identifier.

Exact Match Hours (EXACTMATCH_HOURS): This function performs a case sensitive comparison of the input identifier to the identifier in the Last IDS array. If a match is found, the lastSeenDate of the DeviceProfile is accessed. The function then computes the delta between the devices lastSeen date and the input date/time and compares that result to the match tiers. If not found, then no comparison to the match tiers is done and the comparison fails. The result is compared to the max and min integer fields on Match Tiers.

Exact Match w/Expected Device Count (EXACTMATCH_DEVICES): This function performs a case sensitive comparison of the input identifier to the identifier in the Last IDs array. If a match is found, then for that Id, compares it to a histogram for that Id that predicts the number of devices that exist for that ID. The predicted number of devices will then be returned from the function which will then be compared to the Match Tiers. If the hits per day of the input identifier exceeds the max then this match function will be dependent on a histogram per Identifier type in the following format:

"Header", Max=100,000, Predicted Device Count at Max and Greater=450,000

Example User Interfaces

In one embodiment, one or more dashboard user interfaces may be provided by the ID Resolution System in order to provide requesting entities, such as fraud analysts, content providers, online marketers, and/or other requesting entities, with the ability to manage various aspects of device matching, group matching, ID translations, partner translation, etc., that might be performed by the ID Resolution System. The dashboard user interfaces may enable clients to, for example: manage and configure identifiers and identifier mapping rules; perform testing of matching rules to assess their effectiveness and accuracy; perform device profile lookups; access analytic reports related to the efficacy of device level IDs and matching rules; view or receive monitoring status updates, notifications, and/or alarms; and perform other administrative functions.

FIGS. 7-12 illustrate example user interfaces displaying various device identifier mapping rule configuration options for a requesting entity, as used in one or more embodiments of the ID Resolution System. The sample user interfaces may be displayed, for example, via a web browser (e.g., as a web page), a mobile application, or a standalone application. However, in some embodiments, the sample user interfaces shown in FIGS. 7-12 may also be displayed on any suitable computer device, such as a cell/smart phone, tablet, portable/mobile computing device, desktop, laptop, or personal computer, and are not limited to the samples as described herein. The user interfaces include examples of only certain features that a ID Resolution System may provide. In other embodiments, additional features may be provided, and they may be provided using various different user interfaces and software code. Depending on the embodiment, the user interfaces and functionality described with reference to FIGS. 7-12 may be provided by software executing on the individual's computing device, by a ID Resolution System located remotely that is in communication with the computing device via one or more networks, and/or some combination of software executing on the computing device and the ID Resolution System. In other embodiments, analogous interfaces may be presented using audio or other forms of communication. In an embodiment, the interfaces shown in FIGS. 7-12 are configured to be interactive and respond to various user interactions. Such user interactions may include clicks with a mouse, typing with a keyboard, touches and/or gestures on a touch screen, voice commands, physical gestures made within a proximity of a user interface, and/or the like.

FIG. 7 illustrates an example user interface 700 that presents a list of identifiers and associated comparison functions available for identifier matching rules, as generated using one embodiment, such as the ID Resolution System of FIG. 13. The list of Identifiers presented in user interface 700 provides an overview of various Identifiers which have been configured or setup for identifier mapping, according to one requesting entity's preferences. The example list of Identifiers includes, for each Identifier listed, an Id (e.g., to uniquely identify the Identifier in the list, not for the device attribute to be evaluated); a name (e.g., a name for the Identifier); a type (e.g., a data type of the Identifier, such as a session cookie, an IP address, an IP octet, or other type of device identifier); a comparison function (e.g., an identifier comparison function to be applied when comparing a received device identifier to a device identifier associated with a device profile); a created by indicator (e.g., to indicate which user may have created or configured the identifier); and user-selectable options to Edit or Delete the respective identifiers and comparison functions. These are only a sample of the Identifier fields which may be presented for display; additional or fewer fields may optionally be displayed depending on the embodiment. For example, additional Identifier fields shown in FIG. 8, which presents a user interface to add a New Identifier or to Edit an existing Identifier, may be included in the list presented in user interface 700. The user interface 700 also includes an option to add a New Identifier. In response to a user selection to add a New Identifier or to Edit an Identifier in the list, the example user interface 800 illustrated and described with respect to FIG. 8 may be presented.

The sample list of Identifiers show in user interface 700 may represent identifiers which are available for use in various matching rules and rule sets as further discussed below. Thus, in one embodiment, at least one Identifier must first be created, for example via the user interface 700, before a match rule can be configured based on that Identifier.

FIG. 8 illustrates an example user interface 800 that presents editable configuration options for an identifier, as generated using one embodiment such as the ID Resolution System of FIG. 13. The user interface 800 may be presented, for example, in response to a request to add a New Identifier or to Edit an existing Identifier, such as shown and described with reference to FIG. 7. User interface 800 presents a number of user-editable Identifier fields, including for example: a name; a code (e.g., a code for the Identifier; here, SC is a code for "session cookie"); a description for the Identifier; a type (e.g., a data type of the Identifier, such as a session cookie, an IP address, an IP octet, or other type of device identifier); a comparison function (e.g., an identifier comparison function to be applied when comparing a received device identifier to a device identifier associated with a device profile); various selectable options to Save the Identifier, Index the Identifier, and Expand the Identifier (discussed further herein with reference to FIG. 9). If the Index the Identifier option is enabled or set to true, this may for example enable the Identifier to be used in or associated with a window key lookup. If the Index the Identifier option is not enabled or set to false, the Identifier may not be used in or associated with a window key lookup. The type field and the comparison function field are illustrated as user-selectable dropdown menus which may be pre-populated with respective lists of available types and available comparison functions, options for both of which are described throughout this disclosure.

The user interface 800 may also provide a list of configurable tier conditions and settings associated with the Identifier. The user may add as many match tiers as desired by selecting the Add Match Tier option, which may present additional user interface options for the user to specify match settings for the new match tier. Match tier settings may include, for example, a minimum range integer value, a maximum range integer value, a minimum range double precision value, a maximum range double precision value, a minimum range string value, a maximum range string value, and/or a Boolean value. Depending on the type of the Identifier, some of the match tier settings may not be available. For example, max and min range integer values may not be applicable for string-based types of identifiers.

Each match tier may include user-selectable options to Edit or Delete the respective match tier.

Once one or more tier conditions have been configured and saved for the Identifier, the tier conditions will be available for use in configuring respective matching rules, further discussed with reference to FIGS. 11 and 12.

FIG. 9 illustrates an example user interface 900 that presents identifier expansion configuration options for an identifier, as generated using one embodiment, such as the ID Resolution System of FIG. 13. User interface 900, and in particular the expansion options described here, may be displayed in response to a user selection of the "Expand" checkbox shown in user interface 800 of FIG. 8. Expansion of an Identifier provides the additional capability to translate or transform the Identifier from one type to one or more additional types.

Using one or more expansion techniques, even if only the Identifier of a first type is received in a set of device identifiers for evaluation, the Identifier may be translated and evaluated for further matching with respect to the one or more additional types. As an example, an IP address may be eligible for translation into one, two, or three octets of the IP address. This may be of benefit to a requesting entity which may prefer to configure a matching rule based only on a portion of the IP address (e.g., one or more octets) and not the IP address as a whole (e.g., a matching rule configured to match only on a single octet may produce a higher number of match results than a matching rule configured to match on the entire IP address). In another example, an IP address may be eligible to be translated to a country code. Depending on the particular Identifier, other translations may be available, such as for other identifiers which may represent a combination of information which may be parsed and evaluated separately.

User interface 900 illustrates two example expansions available for translation; more or less expansions may be available depending on the type of Identifier. For example, one expansion is for an "IP Octet" type and a second expansion is for an "IP to Country" type, each with a corresponding list of child Identifiers to be used for the respective expansion. Child Identifiers may be selected from the list of previously configured Identifiers (e.g., the list of identifiers illustrated in FIG. 7) or from a list of default Identifiers which may be available. Once one or more child Identifiers are added to the list and saved, the ID Resolution System 100 may then use the Identifier configuration settings to evaluate first the parent Identifier when present in a set of received device identifiers, and then proceed to translate the parent Identifier according to the expansion settings and evaluate child Identifiers automatically. Thus, the expansion settings provide a high degree of complex customization for the requesting entity, depending on how the requesting entity desires Identifiers to be evaluated, potentially matched, and mapped.

Figure 10:
FIG. 10 illustrates an example user interface that presents a matching rule set and associated configuration options, as generated using one embodiment such as the ID Resolution System of FIG. 13.

FIG. 10 illustrates an example user interface that presents matching algorithms and associated configuration options, as generated using one embodiment such as the ID Resolution System of FIG. 13. The list of matching algorithms presented in user interface 1000 provides an overview of various matching algorithms which have been configured or setup for identifier mapping, according to the requesting entity's preferences. The user interface 1000 also includes an option to add a New Rule Set. In response to a user selection to add a New Rule Set or to Edit an existing Rule Set in the list, the example user interface 1100 illustrated and described with respect to FIG. 11 may be presented.

Figure 11:
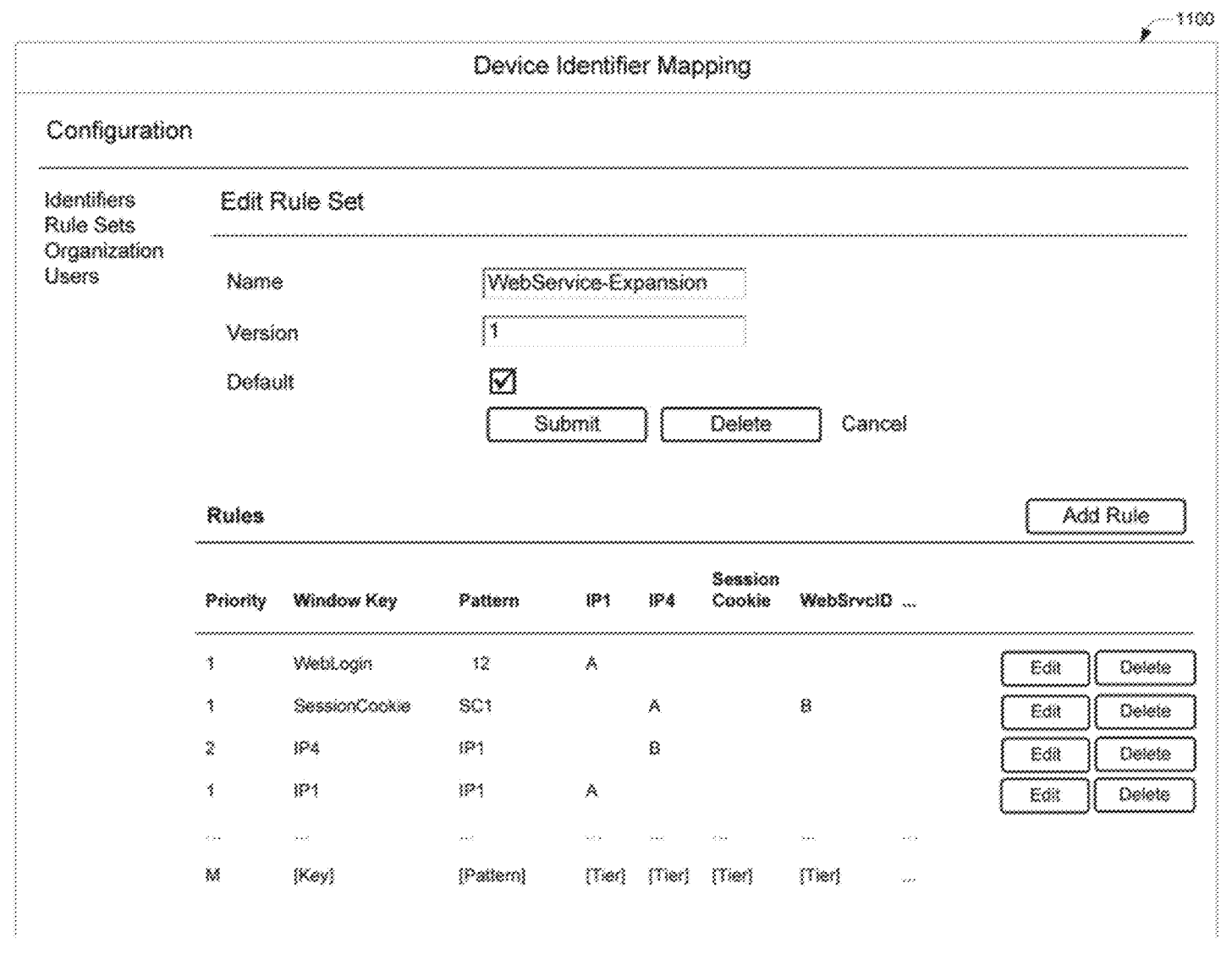

FIG. 11 illustrates an example user interface with editable configuration options for a matching algorithm, as generated using one embodiment, such as the ID Resolution System of FIG. 13. The user interface 1100 may be presented, for example, in response to a request to add a New matching algorithm or to Edit an existing matching algorithm, such as shown and described with reference to FIG. 10. User interface 1100 presents a number of user-editable Rule Set fields, including for example: a name (e.g., a name for the Rule Set); a version number (e.g., to support version tracking for Rule Sets over time); and an option to make the displayed Rule Set a default rule set (e.g., the default rule set to be applied when a request to map device identifiers is received by the ID Resolution System 100). User interface 1100 also presents a list of Rules of the matching algorithm. The example list of rules includes, for each rule listed: a priority (e.g., to indicate a priority order by which the Rules are to be applied, for example as discussed with reference to FIG. 5 herein); a window key (e.g., as associated with one or more window configuration settings as described above); a rule name; one or more Identifiers which have been configured for evaluation against a tier condition; and user-selectable options to Edit or Delete the respective Rule. Each Rule in the Rule Set may be configured to evaluate one or more tier conditions. The user interface 1100 also includes an option to add a New Rule. In response to a user selection to add a New Rule or to Edit a Rule in the list, the example user interface 1200 illustrated and described with respect to FIG. 12 may be presented.

Figure 12:
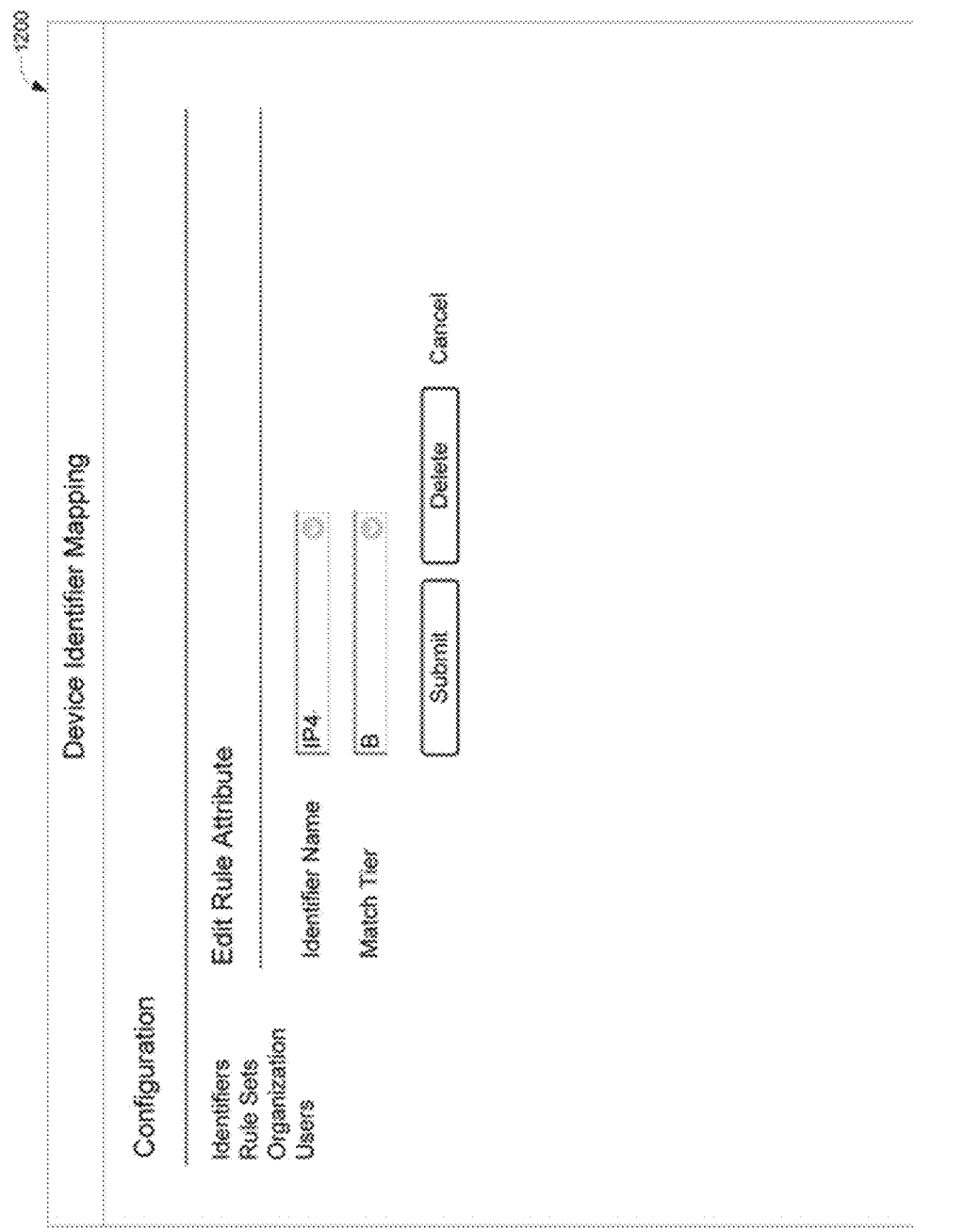
FIG. 12 illustrates an example user interface that editable configuration options for a rule, as generated using one embodiment, such as the ID Resolution System of FIG. 13.

FIG. 12 illustrates an example user interface that editable configuration options for a rule, as generated using one embodiment, such as the ID Resolution System of FIG. 13. The user interface 1200 may be presented, for example, in response to a request to add a New Rule or to Edit an existing Rule, such as shown and described with reference to FIG. 11. The user interface 1200 presents options to select an Identifier to be evaluated with the Rule, and a corresponding Match Tier for the Identifier. The Identifier selection option may be a pre-populated list of available Identifiers, such as the list of Identifiers (e.g., the list of identifiers illustrated in FIG. 7). Once an Identifier is selected, the Match Tier selection option may be populated with a list of available Match Tiers which have been configured for the selected Identifier, such as described herein with reference to FIG. 8.

Example System Implementation and Architecture

FIG. 13 is a block diagram of one embodiment of a ID Resolution System 100 in communication with a network 160 and various systems, such as client computing systems(s) 168, matching algorithm data source(s) 170, and/or device profile data source(s) 172. The ID Resolution System 100 may be used to implement systems and methods described herein, including but not limited to the processes 500 and 600 of FIGS. 5 and 6 respectively.

In the embodiment of FIG. 13, the ID Resolution System 100 includes the resolution engine 122 and a user interface module 124 that may be stored in the mass storage device 120 as executable software codes that are executed by the CPU 150. These and other modules (which is synonymous with "engine" herein) include software that is executed by a computer processor. For example, the modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 13, the ID Resolution System 100 is configured to execute the modules recited above to perform the various methods and/or processes for device identifier mapping analysis and determination as described herein (such as the processes described with respect to FIGS. 5 and 6 herein).

The resolution engine 122 provides capabilities related to device identifier mapping and resolution determination processes described herein, including the processes described for example, with reference to FIGS. 5 and 6 herein. For example, the resolution engine 122 may be configured to determine a unified device identifier and/or device profile associated with particular event data.

The interface module 124 provides capabilities related to interfacing between the ID Resolution System 100, the requesting entity computing systems 168, and various data sources 170, 172, and 174. For example, the interface module 124 may be configured to provide, to the requesting entity, various client-side scripts configured to collect device identifier information, which may in turn be installed as part of a web service provided by the requesting entity. The interface module 124 may further be configured to receive data via the client-side scripts for further processing by the various other modules described herein. The interface module 124 may further be configured to generate and provide various console configuration options and user interfaces, including but not limited to the user interfaces illustrated and described with reference to FIGS. 7-12 herein.

The data partition and security module 126 provides capabilities related to ensuring that device identifier accessed or received from various client/requesting entity systems 168 and/or data sources 170, 172 and 174 are strictly separated or partitioned to maintain data privacy for each respective requesting entity.

The analytics and reporting module 128 provides capabilities related to generating and providing various analytics and reports related to the device identifier mapping processes described herein. For example, matching rules may be analyzed to assess their efficacy, calculate statistical data related to the number and frequency by which device identifiers are mapped to unique device IDs, and other information which may be useful to requesting entities (e.g., for auditing and making improvements identifier mapping rules over time). Some or all of the data to be analyzed and reported on may be stored in any of the data sources 170, 172, and/or 174 described further below.

The ID Resolution System 100 includes, for example, a server, workstation, or other computing device. In one embodiment, the exemplary ID Resolution System 100 includes one or more central processing units ("CPU") 150, which may each include a conventional or proprietary microprocessor. The ID Resolution System 100 further includes one or more memories 130, such as random access memory ("RAM") for temporary storage of information, one or more read only memories ("ROM") for permanent storage of information, and one or more mass storage device 120, such as a hard drive, diskette, solid state drive, or optical media storage device. Typically, the modules of the ID Resolution System 100 are connected to the computer using a standard based bus system. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided in the components and modules of ID Resolution System 100 may be combined into fewer components and modules or further separated into additional components and modules. Each of the devices discussed herein, such as the user computing devices 168 may include any combination of the components discussed herein with reference to the ID Resolution System 100.

The ID Resolution System 100 is generally controlled and coordinated by operating system software, such as Windows XP, Windows Vista, Windows 7, Windows 8, Windows Server, Unix, Linux, SunOS, Solaris, iOS, Blackberry OS, or other compatible operating systems. In Macintosh systems, the operating system may be any available operating system, such as MAC OS X. In other embodiments, the ID Resolution System 100 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary ID Resolution System 100 may include one or more commonly available input/output (I/O) devices and interfaces 110, such as a keyboard, mouse, touchpad, and printer. In one embodiment, the I/O devices and interfaces 110 include one or more display devices, such as a monitor, that allows the visual presentation of data to a user. More particularly, a display device provides for the presentation of GUIs, application software data, and multimedia analytics, for example. The ID Resolution System 100 may also include one or more multimedia devices 140, such as speakers, video cards, graphics accelerators, and microphones, for example.

Network

In the embodiment of FIG. 13, the I/O devices and interfaces 110 provide a communication interface to various external devices. In the embodiment of FIG. 13, the ID Resolution System 100 is electronically coupled to a network 160, which comprises one or more of a LAN, WAN, and/or the Internet, for example, via a wired, wireless, or combination of wired and wireless, communication link. The network 160 communicates with various computing devices and/or other electronic devices via wired or wireless communication links.

According to FIG. 13, in some embodiments information may be provided to or accessed by the ID Resolution System 100 over the network 160 from one or more matching algorithm data source(s) 170, and/or device profile data source(s) 172. The identifier rules data source(s) 170, and/or device profile data source(s) 172 may include one or more internal and/or external data sources. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

Matching Algorithm Data Sources

The matching algorithm data source(s) 170 may store, for example, identifier and/or device profile matching rules. Matching rules may be customized by the client requesting entity according to, for example, the client requesting entity's business, marketing preferences, and/or tolerances for allowing matching of probabilistic identifiers that are more or less unique. One example rule configuration user interface for configuring a rule set and one or more matching rules is illustrated and described with reference to FIGS. 10 and 11 herein.

Device Profile Data Sources

The device profile data source(s) 172 may store, for example, device profiles associated with multiple devices, as well as group profiles in some implementations. The device profiles stored in device profile data source(s) 172 may, for example, include the unique device identifier and a history of all device identifiers which have been associated or mapped to the unique device identifier over time, including frequency of use and other statistical information which may be useful for auditing and improvements identifier mapping rules over time. For example, the device profile may also include any matching pattern used to link or map device identifiers and/or sessions to the unique device identifier. In some embodiments, auditing information and reports may be generated by the ID Resolution System to provide a summary of the frequency of each match pattern being applied and corresponding mapping results. Device profiles may also include privacy choices (e.g., opt-out and/or opt-in choices) associated with respective devices and/or user(s) of the respective devices.

The device profiles may be stored in any type of suitable data structure or data format.

Consumer Data Sources

The consumer data sources 174 may store, for example, credit bureau data (for example, credit bureau data from File One$^{SM}$) and/or other consumer data. Consumer data sources 166B may also store demographic and consumer segment data that include one or more models, such as models that identify lifestyle and/or socio-economic attributes (e.g., MOSAIC® segmentation and/or codes) and/or behavioral/attitudinal/psychographic attributes (e.g., TrueTouch$^{SM}$ Touch Points segmentation), some or all of which may be associated with a geographic location, IP address information or ranges, and other types of attributes.

Additional Benefits and Advantages

In addition to the benefits and advantages described above, additional advantages of various embodiments described herein may be achieved, including but not limited to:

- Extended reach to targeted audiences through improved device identification coverage, accuracy and persistency
- Improved marketing measurement and optimization through consistent, holistic tracking of a program's performance across all digital touch points and more accurate attribution of marketing spend
- Maximized supply side yield through better definition, segmentation and extension of audiences across all digital touch points
- More impactful audience insights through better capturing and rationalization of audience data across all digital touch points
- Future proofing identification with the ability to seamlessly leverage any new IDs as they come to market (i.e. new native IDs) and eliminate the need to change systems to implement those IDs
- Improved privacy opt-out management through increased device identification coverage, accuracy and persistency
- Targeting—Enhanced reach to targeted audiences at scale on both desktop and mobile
- Tracking—Improved mobile and web analytics
- Mobile bridging—Mobile app to web bridging enables enhanced behavioral targeting, remarketing, campaign measurement and optimization (including, frequency capping, performance tracking and attribution) by connecting the user activity on mobile across all touch points
- Universality—Unique Device IDs can be universal, which means any two or more customers using ID Resolution System with respect to the same device, at a point in time, may see the same unique device ID for that single device. This can enable seamless selling and buying of media with a common "currency," eliminating the complexities associated with cookie syncing etc.
- Privacy—privacy compliant identification technology that can be used in conjunction with TRUSTe and other privacy opt out management solutions
- Data protection—Unique device IDs can be deployed on premise, which means no data leaves the customer's environment Other Embodiments Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the ID Resolution System 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the ID Resolution System 100 and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A method for mapping device identifiers to a group, the method comprising:
    receiving, from a requesting entity, online event data comprising a first device identifier and a first non-unique attribute associated with a first device;
    accessing, from a first electronic data storage device, a first matching algorithm comprising a plurality of tier conditions, wherein a first tier condition of the plurality of tier conditions is: (1) associated with a first identifier type or a first attribute type and (2) comprising a first comparison function, and wherein a second tier condition of the plurality of tier conditions is: (1) associated with a second identifier type or a second attribute type and (2) comprises a second comparison function;
    accessing, from a second electronic data storage device, a plurality of device profiles, wherein a first device profile of the plurality of device profiles is associated with the first matching algorithm;
    determining, based at least in part on the first comparison function, whether the first device identifier or the first non-unique attribute satisfies the first tier condition;
    in response to a determination that the first tier condition is satisfied, associating the first device profile with the first device, wherein the first device identifier of the first device is associated with the first identifier type of the first tier condition and the first non-unique attribute of the first device is associated with the first attribute type of the first tier condition;

receiving, from the requesting entity, online event data comprising a second device identifier and a second non-unique attribute associated with a second device;

determining, based at least in part on the second comparison function, whether the second device identifier or the second non-unique attribute satisfies the second comparison function of the second tier condition;

in response to a determination that the second comparison function is satisfied, associating the first device profile with the second device; and generating a device group comprising the first device identifier and the second device identifier, wherein the first tier condition and the second tier condition are identified based at least in part on a benchmark matching algorithm and a test matching algorithm, and wherein outcomes of the benchmark matching algorithm and the test matching algorithm are used to determine a preconfigured match accuracy.

2. The method of claim 1, further comprising:
generating a group identifier associated with the device group.

3. The method of claim 2, wherein the group identifier comprises information associated with the first device and the second device.

4. The method of claim 1, wherein:
the first electronic data storage device is configured to store the preconfigured match accuracy.

5. The method of claim 1, wherein the device grouping associates the first device identifier and the second device identifier to a single computing device.

6. The method of claim 1, wherein the device grouping is generated at a household level such that the first device and the second device are associated to a location or a living unit.

7. The method of claim 1, wherein the first attribute type is geographical location such that the first device and the second device are associated with the same geographical location.

8. The method of claim 1, wherein the first attribute type is IP address such that the first device and the second device are associated with the same IP address.

9. The method of claim 1 further comprising:
transmitting the first device profile to the requesting entity, wherein the requesting entity uses the first device profile to generate and/or provide targeted content.

10. The method of claim 1 further comprising:
transmitting the first device profile to the requesting entity, wherein the requesting entity uses the first device profile to authenticate a user login or approve an online transaction.

11. The method of claim 1, wherein the plurality of tier conditions of the first matching algorithm comprises one or more of probabilistic rules and/or one or more of deterministic rules.

12. The method of claim 1, wherein plurality of tier conditions are prioritized.

13. The method of claim 12, wherein the plurality of prioritized matching rules are ordered based at least in part on determined match accuracy of associated with each rule of the plurality of prioritized matching rules.

14. The method of claim 1, wherein the plurality of tier conditions of the first matching algorithm are customizable by the requesting entity.

15. The method of claim 1, wherein the plurality of tier conditions of the first matching algorithm comprises default tier conditions generated over time based at least in part on observed common or recurring matching scenarios.

16. The method of claim 1, wherein the first device and/or the second device may be included in one or more different device groups.

17. The method of claim 1, wherein each of the plurality of tier conditions is associated with a confidence level indicating the likelihood that the first device identifier satisfies a given tier condition.

18. The method of claim 17, wherein adjustment of one or more parameters associated with a tier condition of the plurality of tier conditions results in a change of a corresponding confidence level of the tier condition.

19. A non-transitory computer storage having stored thereon a computer program, the computer program including executable instructions that instruct a computer system to at least:

receive, from a requesting entity, online event data comprising a first device identifier and a first non-unique attribute associated with a first device;

access, from a first electronic data storage device, a first matching algorithm comprising a plurality of tier conditions, wherein a first tier condition of the plurality of tier conditions is: (1) associated with a first identifier type or a first attribute type and (2) comprises a first comparison function, and wherein a second tier condition of the plurality of tier conditions is: (1) associated with a second identifier type or a second attribute type and (2) comprises a second comparison function;

access, from a second electronic data storage device, a plurality of device profiles, wherein a first device profile of the plurality of device profiles is associated with the first matching algorithm;

determine, based at least in part on the first comparison function, whether the first device identifier or the first non-unique attribute satisfies the first tier condition;

in response to a determination that the first tier condition is satisfied, associate a first device profile with the first device, wherein the first device identifier of the first device is associated with the first identifier type of the first tier condition and the first non-unique attribute of the first device is associated with the first attribute type of the first tier condition;

receive, from the requesting entity, online event data comprising a second device identifier and a second non-unique attribute associated with a second device;

determine, based at least in part on the second comparison function, whether the second device identifier or the second non-unique attribute satisfies the second comparison function of the second tier condition;

in response to a determination that the second comparison function is satisfied, associate the first device profile with the second device; and generate a device group comprising the first device identifier and the second device identifier, wherein the first tier condition and the second tier condition are identified based at least in part on a benchmark matching algorithm and a test matching algorithm, and wherein outcomes of the benchmark matching algorithm and the test matching algorithm are used to determine a preconfigured match accuracy.

20. A computing system for mapping device identifiers to a group, the computing system comprising:

a data storage device configured to store computer-executable instructions; and one or more hardware computer processors in communication with the data storage device, wherein the one or more hardware processors, when executing the computer-executable instructions, are configured to:

receive, from a requesting entity, online event data comprising a first device identifier and a first non-unique attribute associated with a first device;

access, from a first electronic data storage device, a first matching algorithm comprising a plurality of tier conditions, wherein a first tier condition of the plurality of tier conditions is: (1) associated with a first identifier type or a first attribute type and (2) comprising a first comparison function, and wherein a second tier condition of the plurality of tier conditions is: (1) associated with a second identifier type or a second attribute type and (2) comprising a second comparison function;

access, from a second electronic data storage device, a plurality of device profiles, wherein a first device profile of the plurality of device profiles is associated with the first matching algorithm;

determine, based at least in part on the first comparison function, whether the first device identifier or the first non-unique attribute satisfies the first tier condition;

in response to a determination that the first tier condition is satisfied, associate a first device profile with the first device, wherein the first device identifier of the first device is associated with the first identifier type of the first tier condition and the first non-unique attribute of the first device is associated with the first attribute type of the first tier condition;

receive, from the requesting entity, online event data comprising a second device identifier and a second non-unique attribute associated with a second device;

determine, based at least in part on the second comparison function, whether the second device identifier or the second non-unique attribute satisfies the second comparison function of the second tier condition;

in response to a determination that the second comparison function is satisfied, associate the first device profile with the second device; and generate a device group comprising the first device identifier and the second device identifier, wherein the first tier condition and the second tier condition are identified based at least in part on a benchmark matching algorithm and a test matching algorithm, and wherein outcomes of the benchmark matching algorithm and the test matching algorithm are used to determine a preconfigured match accuracy.

* * * * *